(12) United States Patent
Nakagishi

(10) Patent No.: US 6,424,068 B2
(45) Date of Patent: Jul. 23, 2002

(54) GALVANO MIRROR UNIT

(75) Inventor: Toshio Nakagishi, Saitama-ken (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/785,173

(22) Filed: Feb. 20, 2001

Related U.S. Application Data

(62) Division of application No. 09/493,676, filed on Jan. 28, 2000, which is a continuation of application No. 09/102,273, filed on Jun. 22, 1998, now abandoned.

(30) Foreign Application Priority Data

| Jun. 27, 1997 | (JP) | 9-172059 |
| Jun. 27, 1997 | (JP) | 9-172061 |
| Jun. 27, 1997 | (JP) | 9-172062 |
| Oct. 30, 1997 | (JP) | 9-314336 |
| Oct. 31, 1997 | (JP) | 9-316081 |
| Oct. 31, 1997 | (JP) | 9-316082 |
| Nov. 8, 1997 | (JP) | 9-322126 |
| Nov. 8, 1997 | (JP) | 9-322127 |
| Nov. 12, 1997 | (JP) | 9-326938 |
| Nov. 12, 1997 | (JP) | 9-326939 |
| Apr. 14, 1998 | (JP) | 10-120122 |
| Apr. 14, 1998 | (JP) | 10-120123 |

(51) Int. Cl.$^7$ ............................................. H02K 7/09
(52) U.S. Cl. ...................... 310/90.5; 359/198; 384/246
(58) Field of Search ............... 310/90, 90.5; 359/198, 359/200; 384/107, 110, 193, 226, 227, 238, 246, 192, 201, 205, 243, 244, 245

(56) References Cited

U.S. PATENT DOCUMENTS

| 2,750,461 A | 6/1956 | Bunch | 200/61.13 |
| 2,856,239 A | * 10/1958 | Dacus | 310/90.5 |
| 3,244,917 A | 4/1966 | Gute | 310/154 |
| 3,354,833 A | 11/1967 | Laing | 103/87 |
| 3,512,851 A | * 5/1970 | Love | 310/90.5 |

(List continued on next page.)

FOREIGN PATENT DOCUMENTS

| EP | 0084727 | 8/1983 |
| EP | 0084728 | 8/1983 |
| EP | 0448362 | 9/1991 |
| EP | 0790512 | 8/1997 |
| EP | 0907163 | 4/1999 |

(List continued on next page.)

OTHER PUBLICATIONS

Patent Abstracts of Japan, vol. 012, No. 140 (p–696), dated Apr. 18, 1988.*

Patent Abstracts of Japan, vol. 017, No. 505 (p–1611), dated Sep. 10, 1993.*

An article entitled "Optical Magnetic Disk Device Of U.S. TeraStor Succeeds Tracking Control—Track Pitch Of 0.34 $\mu$m Realized Using Two–Stage Servo", which appeared at pp. 13 and 14 of the Japanese language magazine *Nikkei Electronics*, Sep. 22, 1997 (No. 699).

An article entitled "Trillions Of Bytes", by Eric Nee, which appeared in the Mar. 24, 1997 issue of Forbes magazine.

(List continued on next page.)

*Primary Examiner*—Karl Tamai
*Assistant Examiner*—Dang Dinh Le
(74) *Attorney, Agent, or Firm*—Greenblum & Bernstein, P.L.C.

(57) ABSTRACT

A galvano mirror unit includes a galvano mirror, a rotor to which the galvano mirror is mounted, a stator that rotatably supports the rotor about a rotation axis, a pair of center pins provided to the stator, and a pair of receive members provided to the rotor. The receive members respectively receive the center pins. The rotor is pivoted by the engagement of the center pin and the receive member.

26 Claims, 46 Drawing Sheets

U.S. PATENT DOCUMENTS

| | | | |
|---|---|---|---|
| 4,088,914 A | 5/1978 | Aoki | 310/264 |
| 4,126,796 A | 11/1978 | Ito | 310/40 MN |
| 4,206,379 A | 6/1980 | Owda | 310/156 |
| 4,285,566 A | 8/1981 | Yamamoto | 350/6.6 |
| 4,297,713 A | 10/1981 | Ichikawa et al. | 346/108 |
| 4,351,596 A | 9/1982 | Ohniwa et al. | 354/234 |
| 4,466,088 A | 8/1984 | Trethewey | 369/46 |
| 4,613,778 A | 9/1986 | Wrobel et al. | 310/90 |
| 4,700,251 A | 10/1987 | Fuke et al. | 360/106 |
| 4,891,998 A | 1/1990 | Tourville | 74/48 |
| 4,893,891 A | 1/1990 | Fujita et al. | 385/16 |
| 4,959,824 A | 9/1990 | Ueda | 369/44.14 |
| 4,968,876 A | 11/1990 | Iima | 250/216 |
| 5,125,750 A | 6/1992 | Corle et al. | 359/819 |
| 5,126,899 A | 6/1992 | Kanazawa | 360/99.01 |
| 5,136,559 A | 8/1992 | Nakayama | 369/32 |
| 5,151,890 A | 9/1992 | Yonekubo | 369/44.11 |
| 5,173,797 A | 12/1992 | Zedekar et al. | 310/90.5 |
| 5,220,550 A | 6/1993 | Nakayama | 369/44.14 |
| 5,254,893 A | 10/1993 | Ide | 310/90 |
| 5,321,329 A * | 6/1994 | Hovorka | 310/90.5 |
| 5,365,504 A | 11/1994 | Noguchi | 369/44.41 |
| 5,420,848 A | 5/1995 | Date et al. | 369/112 |
| 5,422,872 A | 6/1995 | Hsu et al. | 369/97 |
| 5,444,683 A | 8/1995 | Ishikawa | 369/44.28 |
| 5,461,498 A | 10/1995 | Iwao | 359/200 |
| 5,506,459 A * | 4/1996 | Ritts | 310/90.5 |
| 5,517,474 A | 5/1996 | Takamine | 369/44.32 |
| 5,532,480 A | 7/1996 | Scofield | 250/235 |
| 5,564,585 A | 10/1996 | Saitoh | 220/241 |
| 5,596,446 A | 1/1997 | Plesko | 359/214 |
| 5,608,280 A | 3/1997 | Tamemoto et al. | 310/239 |
| 5,610,752 A | 3/1997 | Hayakawa | 359/198 |
| 5,625,244 A | 4/1997 | Bradfield | 310/232 |
| 5,684,762 A | 11/1997 | Kubo | 369/13 |
| 5,705,868 A | 1/1998 | Cox et al. | 310/71 |
| 5,719,834 A | 2/1998 | Futagawa et al. | 369/44.14 |
| 5,764,613 A | 6/1998 | Yamamoto | 369/112 |
| 5,768,241 A | 6/1998 | Kanazawa et al. | 369/77.2 |
| 5,811,902 A | 9/1998 | Sato | 310/90 |
| 5,811,903 A | 9/1998 | Ueno et al. | 310/90 |
| 5,844,676 A | 12/1998 | Southam et al. | 356/237 |
| 5,886,438 A | 3/1999 | Kawanishi | 310/90 |
| 5,920,140 A | 7/1999 | Nakagishi et al. | 310/219 |
| 6,166,889 A | 12/2000 | Aoki | 360/267.7 |

FOREIGN PATENT DOCUMENTS

| | | |
|---|---|---|
| GB | 378922 | 8/1932 |
| GB | 1314002 | 4/1973 |
| GB | 1457995 | 12/1976 |
| GB | 2000604 | 1/1979 |
| GB | 2086092 | 5/1982 |
| GB | 2193341 | 2/1988 |
| JP | 62262017 | 11/1987 |
| JP | 64-2015 | 1/1989 |
| JP | 5128561 | 5/1993 |
| JP | 8315404 | 11/1996 |
| WO | 90/0863 | 7/1990 |
| WO | 98/06095 | 2/1998 |
| WO | 98/49675 | 11/1998 |
| WO | 98/49684 | 11/1998 |

OTHER PUBLICATIONS

A screen capture of a page from TeraStor's website (dated Mar. 19, 1997) entitled "Architecture of TeraStor's Near–Field Technology".

An article entitled "In 1998, 10 GB Per Inch$^2$ Is Realized Using New Optical Recording Technology", appeared at pp. 148–151 of the Sep., 1997 Japanese language edition of Nikkei Byte magazine.

An article by B.D. Terris et al., entitled "Near–Field Optical Data Storage", Applied Physics Letters, vol. 68, pp. 141–143, Jan. 8, 1996.

* cited by examiner

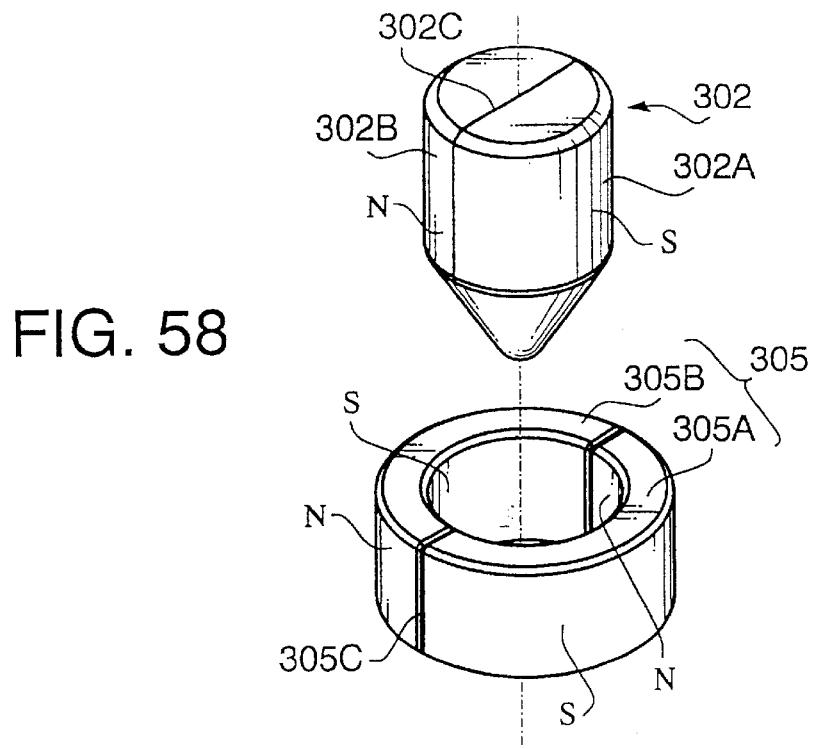
FIG. 58
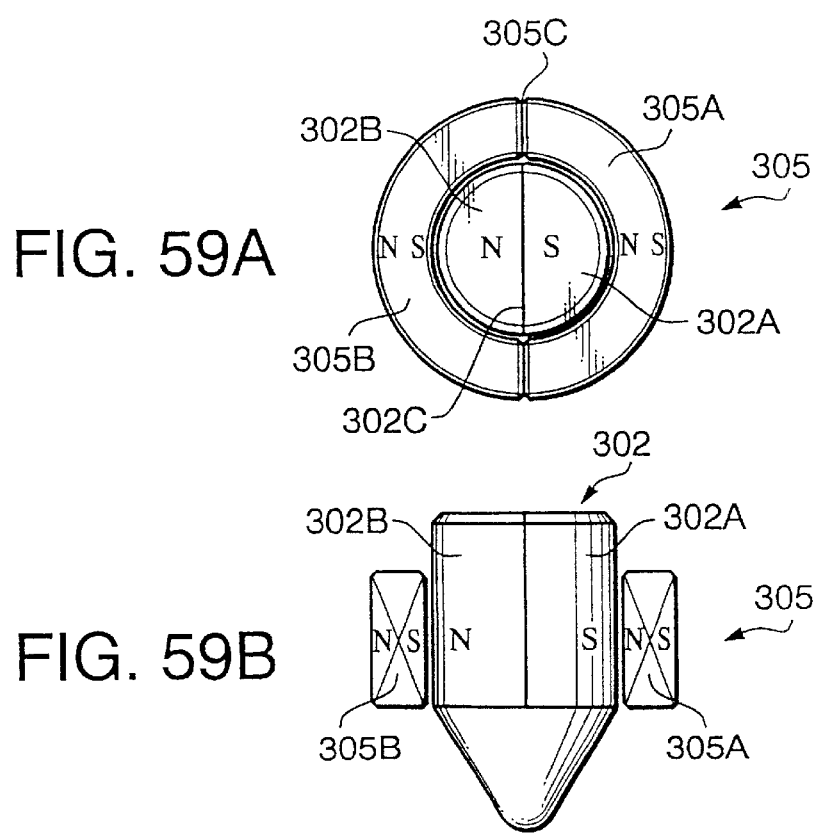
FIG. 59A
FIG. 59B

GALVANO MIRROR UNIT

This is a division of U.S. patent application No. 09/493,676, filed Jan. 28, 2000, which is a continuation of application Ser. No. 09/102,273, filed Jun. 22, 1998, now abandoned, the contents of which are expressly incorporated by reference herin in its entirety.

BACKGROUND OF THE INVENTION

This invention relates to an optical disk drive.

Generally, an optical disk drive writes and reads data on an optical disk by means of a laser beam. The optical disk drive includes a light source module that emits the laser beam and an optical head carrying an object lens that converges the laser beam on a small light spot on the optical disk.

The tracking operation of the optical disk drive includes (1) a rough tracking operation and (2) a fine tracking operation. The rough tracking operation is accomplished by moving the optical head crossing the tracks of the optical disk. The fine tracking operation is accomplished by minutely moving the light spot on the optical disk. For this purpose, a galvano mirror is provided in a light path between the light source module and the object lens. By rotating the galvano mirror; the angle of incidence of the laser beam incident on the object lens is changed, so that the light spot on the optical disk is moved.

FIG. 1 is a perspective view of a conventional galvano mirror unit disclosed in Japanese Patent Laid-Open Publication No. 64-2105. The galvano mirror 41 is supported by a pair of elongated plate springs 42. The plate springs 42 are extended from opposing side ends of the galvano mirror 41 in such a manner that center lines of the plate springs 42 are aligned with each other. Distal ends of the plate springs 42 are fixed to a base 43. The plate springs 42 is deformable, so that the plate springs 42 can be twisted about an axis 42A defined by the center lines of the plate springs 42. Due to the twist (elastic deformation) of the plate springs 42, the rotation of the galvano mirror 41 about an axis 42A is enabled.

In order to actuate the galvano mirror 41, coils 45 and 46 are fixed to the galvano mirror 41. Further, a yoke 44 is provided on the base 43, which has a pair of magnets (not shown) generating a magnetic field in which the coils 45 and 46 are positioned. The galvano mirror 41 is rotated by the electromagnetic induction caused by the current flow in the coils 45 and 46 and the magnetic field caused by the magnets of the yoke 44.

However, since the rotation of the galvano mirror 41 is caused by the elastic deformation of the plate springs 42, there exists a primary resonance frequency that causes an unstable rotation of the galvano mirror 41.

In order to lower the primary resonance frequency, it is necessary to increase deformability of the plate springs 42. For that purpose, it is necessary to increase the axial length of the plate springs 42, which may increase the total size of the galvano mirror unit. Thus, a compact galvano mirror unit that enables a stable tracking operation is desired.

SUMMARY OF THE INVENTION

It is therefore an object of the present invention to provide a compact galvano mirror unit that enables a stable tracking operation.

According to one aspect of the present invention, there is provided a galvano mirror unit including a galvano mirror, a rotor to which the galvano mirror is mounted, a stator that rotatably supports the rotor about a rotation axis, a pair of center pins provided to one of the rotor and the stator, and a pair of receive members provided to the other of the rotor and the stator. The receiving members respectively receive the center pins. The rotor is pivoted by the engagement of the center pin and the receive member.

Since the rotor is pivoted by the center pins and the receive members, there is no primary resonance frequency (which generates in a conventional galvano mirror) that causes an unstable rotation of the galvano mirror. Thus, it is possible to obtain a stable tracking operation.

In the conventional spring-supported galvano mirror, it is necessary to lengthen the spring member in order to lower the primary resonance frequency. However, according to the above-described arrangement, it is not necessary to increase the size of the galvano mirror unit (since there is no primary resonance frequency). Accordingly, the size of the galvano mirror unit can be compact.

In a particular arrangement, the galvano mirror unit further includes a pair of driving coils provided to one of the rotor and the stator, and a pair of driving magnets provided to the other of the rotor and the stator. By allowing current to flow in the driving coils, the rotor can be rotated about the rotation axis.

It is preferable that the center pins have curved projections. In such case, the receive members have conical surfaces. Further, the conical surfaces of the receive members respectively contact the curved projections of the center pins.

According to another aspect of the present invention, there is provided a galvano mirror unit including a galvano mirror, a rotor to which the galvano mirror is mounted, a stator that rotatably supports the rotor about a rotation axis, first and second center pins provided to the stator, first and second receive members (which respectively receive the first and second center pins) provided to the rotor, and a biasing member provided to the stator. The biasing member is arranged to bias the first center pin to the first receive member.

As constructed above, due to the biasing member, it is possible to eliminate the backlash between the first center pin and the first receive member and between the second center pin and the second receive member.

In a particular arrangement, the biasing member includes a plate spring. Further, the first center pin and the plate spring are mechanically coupled with each other. With such an arrangement, the inclination of the upper center pin is prevented. Therefore, the rotation of the galvano mirror is stabilized.

According to further aspect of the present invention, there is provided a galvano, mirror unit including a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, and an offset member provided to the stator. The first center pin is provided in a hole of the stator so that the first center pin is movable in the direction of the rotation axis. The offset member urges the first center pin so that the center pin is inclined in a predetermined direction in the hole.

With such an arrangement, since the first center pin is inclined in a predetermined direction, the deviation of the inclination of the first center pin is prevented. Therefore, the rotation of the galvano mirror is stabilized.

According to other aspect of the present invention, there is provided a galvano mirror unit including a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, and a plate spring provided to the stator. The plate spring biases the first center pin to the first receive member. The first center pin is fixed to the plate spring.

With such an arrangement, since the first center pin is fixed to the plate spring, the inclination of the rotation axis of the rotor is prevented. Therefore, the rotation of the galvano mirror is stabilized.

According to still further aspect of the present invention, there is provided a galvano mirror unit including a galvano mirror, a rotor to which the galvano mirror is mounted, a stator that rotatably supports the rotor about a rotation axis, a pair of center pins provided to one of the rotor and the stator, a pair of receive members (respectively receiving the center pins) provided to the other of the rotor and the stator, a pair of driving magnets provided at opposing ends of the rotor, and a pair of driving coils provided to the stator. The driving coils are faced with the driving magnets respectively.

With such an arrangement, since the driving coils are not provided to the rotor but provided to the stator, the arrangement for electrical connection (for supplying electricity to the driving coils) becomes simple.

According to still yet further aspect of the present invention, there is provided a galvano mirror unit including a galvano mirror, a rotor to which the galvano mirror is mounted, a stator that rotatably supports the rotor about a rotation axis, a pair of center pins provided to one of the rotor and the stator, a pair of receive members (respectively receiving the center pins) provided to the other of the rotor and the stator, and first and second driving coils provided to the stator. The rotor has first and second sides that are respectively faced with the first and second coils. The first and second sides being magnetized.

With such an arrangement, since it is not necessary to provide separate driving magnets to the rotor, the structure of the mirror holder can be simplified.

According to yet further aspect of the present invention, there is provided a galvano mirror unit including a galvano mirror block having a mirror surface, a stator that rotatably supports the galvano mirror block about a rotation axis, first and second center pins provided to the stator, and first and second receive portions provided to the galvano mirror block. The first and second receive portions respectively receive the first and second center pins.

With such an arrangement, since it is not necessary to provide a mirror holder or the like for holding the galvano mirror, the structure of the galvano mirror unit can be simplified.

According to still other aspect of the present invention, there is provided a galvano mirror unit including a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, a biasing magnet provided to the stator so that the biasing magnet is located around the first center pin, and a magnetic chip provided to a predetermined portion of the first center pin. Due to the magnetic force generated by the biasing magnet and the magnetic chip, the first center pin is biased to the first receive member.

With such an arrangement, since the biasing force can be obtained by the biasing magnet and the magnet chip, it is not necessary to provide a separate spring member for biasing the first center pin. Thus, the structure of the galvano mirror unit can be simplified.

According to still another aspect of the present invention, there is provided a galvano mirror unit including a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, a biasing coil provided to the stator, and a magnetic chip provided to a predetermined portion of the first center pin. By allowing current to flow in the biasing coil, the first center pin is biased to the first receive member.

With such an arrangement, since the biasing force can be obtained by the biasing coil and the first center pin, it is not necessary to provide a separate spring member for biasing the upper center pin. Thus, the structure of the galvano mirror unit can be simplified. Further, since the biasing force can be adjusted by varying the current flow in the biasing coil, the friction produced when the mirror holder is rotated can be adjusted.

According to still another aspect of the present invention, there is provided a galvano mirror unit including a galvano mirror, a rotor to which the galvano mirror is mounted, a stator that rotatably supports the rotor about a rotation axis, first and second center pins provided to the stator. The first center pin is made of a magnetized member. The first center pin is provided in a hole of the stator so that the first center pin is movable in the direction of the rotation axis. The galvano mirror unit further includes first and second receive members (respectively receiving the first and second center pins) provided to the rotor, and an offset magnet provided to the stator. The offset magnet attracts the first center pin in a predetermined direction, thereby to prevent the deviation of the inclination of the first center pin in the hole.

With such an arrangement, since the offset magnet urges the first center pin in a predetermined direction, the deviation of the inclination of the first center pin is prevented. Thus, the rotation of the galvano mirror is stabilized.

According to still another aspect of the present invention, there is provided a galvano mirror unit including a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, first positioning magnet provided to the rotor, and second positioning magnet provided to the stator. Each of the first and second positioning magnets including a portion of N-pole and a portion of S-pole. A neutral position of the rotor is obtained by the attraction of the first and second positioning magnets.

With such an arrangement, the galvano mirror is urged to its rotational neutral position without providing a separate spring member.

According to still another aspect of the present invention, there is a galvano mirror unit comprising, a galvano mirror, a rotor to which the galvano mirror is mounted, a stator that rotatably supports the rotor about a rotation axis, first and second center pins provided to the stator, first and second receive members (respectively receiving the first and second center pins) provided to the rotor, and positioning magnet provided to the stator. The first center pin includes a portion of N-pole and a portion of S-pole. The positioning magnet includes a portion of N-pole and a portion of S-pole. A neutral position of the rotor is obtained by the attraction of the first center pin and the positioning magnet.

With such an arrangement, the galvano mirror is urged to its rotational neutral position without providing a separate spring member.

BRIEF DESCRIPTION OF THE DRAWINGS

FIG. 58 is a perspective view of a center pin and a magnet ring of the galvano mirror unit of FIG. 57;

FIGS. 59A and 59B are a plan view and a sectional view of the center pin and the magnet ring of FIG. 58;

DESCRIPTION OF THE PREFERRED EMBODIMENT

First, an optical disk drive to which the first to fourteenth embodiments of the present invention are embodied is described.

Figure 2:
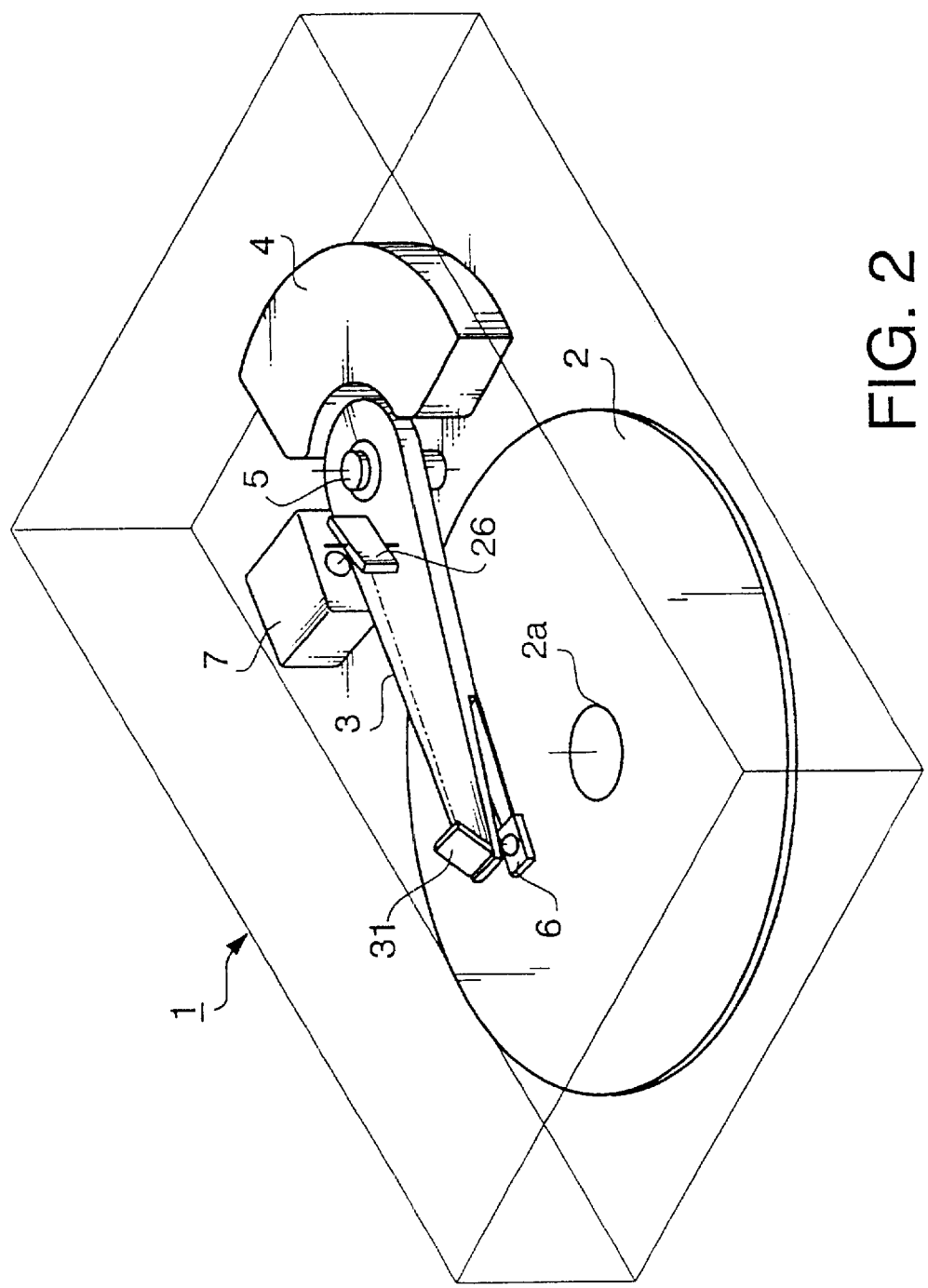
FIG. 2 is a perspective view of an optical disk drive to which the embodiments of the present invention is embodied.

FIG. 2 is a perspective view of the optical disk drive (hereinafter, the disk drive 1). The disk drive 1 is arranged to write and read data on an optical disk 2 by means of a so-called Near Field Recording (NFR) technology.

In the disk drive 1, the optical disk 2 is mounted to a rotating shaft 2a of a not-shown spindle motor. The disk drive 1 includes a rotary arm 3 extending in parallel to a surface of the optical disk 2, and is rotatably supported by a shaft 5. A floating head 6 that carries an optical lens (described later) is provided to a tip of the rotary arm 3. When the rotary arm 3 is rotated, the floating head 6 moves across tracks formed on the optical disk 2. The rotary arm 3 is further provided with a light source module 7 in the vicinity of the shaft 5.

Figure 3:
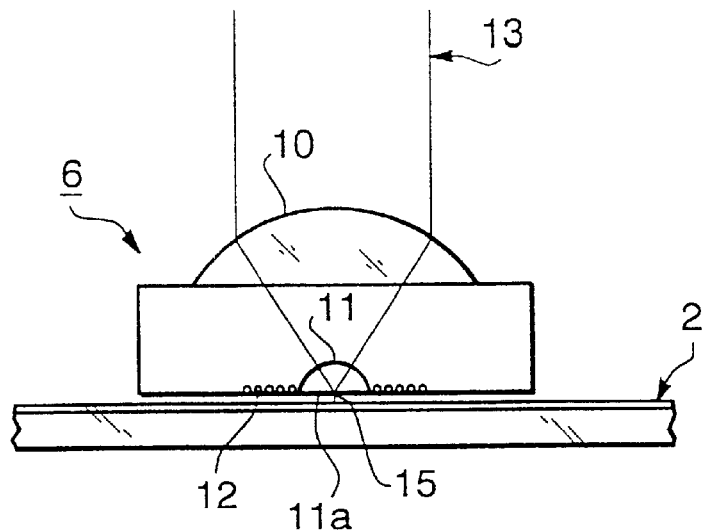
FIG. 3 is an enlarged view of a floating head of the optical disk of FIG. 2.
Figure 4:
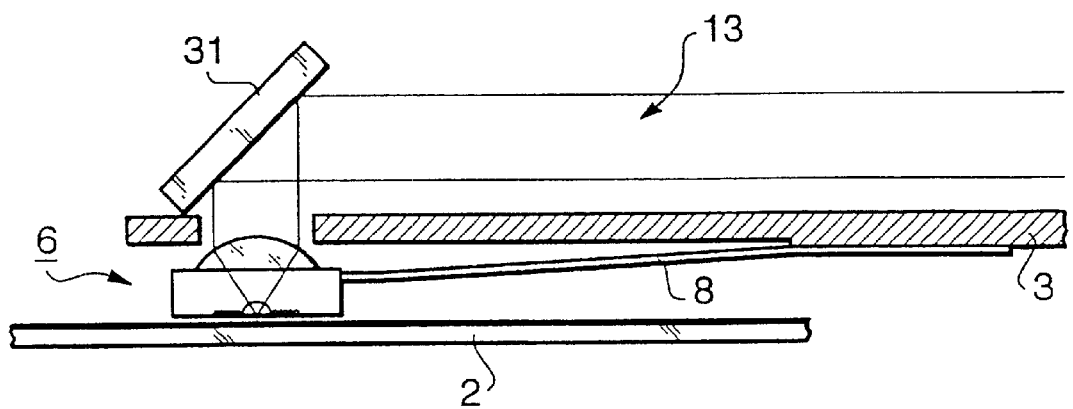
FIG. 4 is an enlarged view of the tip of the rotary arm of the optical disk of FIG. 2.

FIG. 3 is an enlarged view of the floating head 6. FIG. 4 is an enlarged view of the tip of the rotary arm 3. As shown in FIG. 4, the floating head 6 is mounted to the rotary arm 3 via a flexure beam 8. One end of the flexure beam 8 is fixed to the bottom of the rotary arm 3, while the floating head 6 is fixed to the other end of the flexure beam 8. When the optical disk 2 rotates, the floating head 6 is lifted upward by air flow generated between the optical disk 2 and the floating head 6. When the floating head 6 is lifted upward, the flexure beam 8 is elastically deformed, which urges the floating head 6 downward. With this, the floating amount of the floating head 6 is kept constant, due to the balance of the upward force (caused by the air flow) and the downward force (caused by the deformation of the flexure beam 8).

As shown in FIG. 3, the floating head 6 includes an object lens 10 and a solid immersion lens (SIL) 11. A reflecting mirror 31 is provided to the rotary arm 3, which reflects the laser beam 13 emitted from the light source module 7 (FIG. 4) to the object lens 10. The object lens 10 converges the laser beam 13. The solid immersion lens 11 is a half-spherical lens and the plane surface thereof is faced with the optical disk 2. Further, the focal point of the object lens 10 is positioned on the plane surface of the solid immersion lens 11. That is, the laser beam 13 is converged on the plane surface 11a of the solid immersion lens 11. Since the clearance of the optical disk and the plane surface 11a of the solid immersion lens 11 is less than 1 µm, the converged laser beam is converted to a so-called evanescent beam (which propagates across a small gap between closely disposed surfaces) and reaches the optical disk 2. Since the beam diameter of the evanescent beam is smaller than the converged laser beam, a data storage capacity can be remarkably increased.

In order to apply magnetic field on the surface of the optical disk 2, a coil 12 is provided around the solid immersion lens 11. A current follow in the coil 12 generates a magnetic field in which the optical disk 2 is positioned. Data writing is performed by the evanescent beam from the solid immersion lens 11 and the magnetic field generated by the coil 12.

Figure 5:
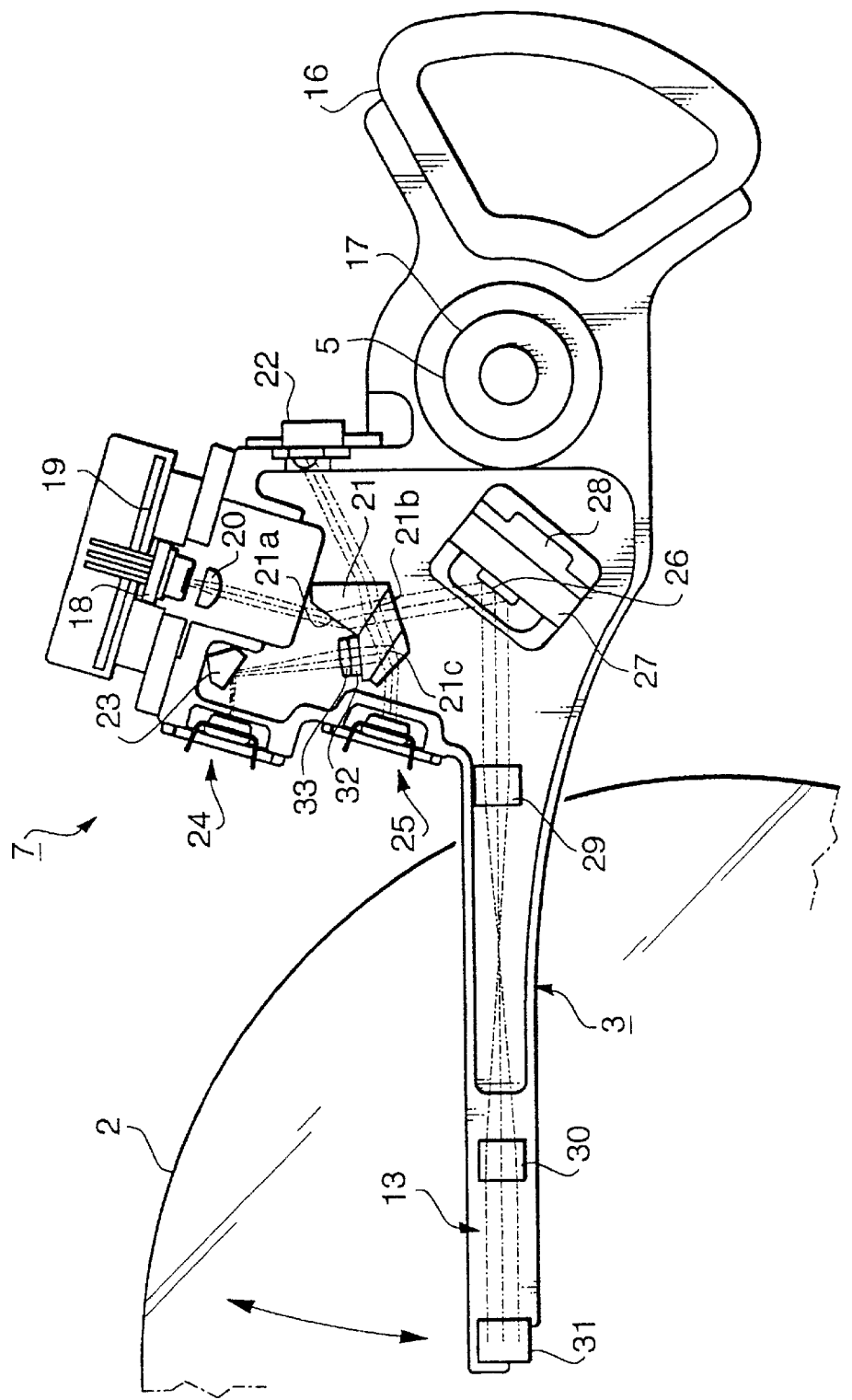
FIG. 5 is a top view of the rotary arm of the optical disk of FIG. 2.
Figure 6:
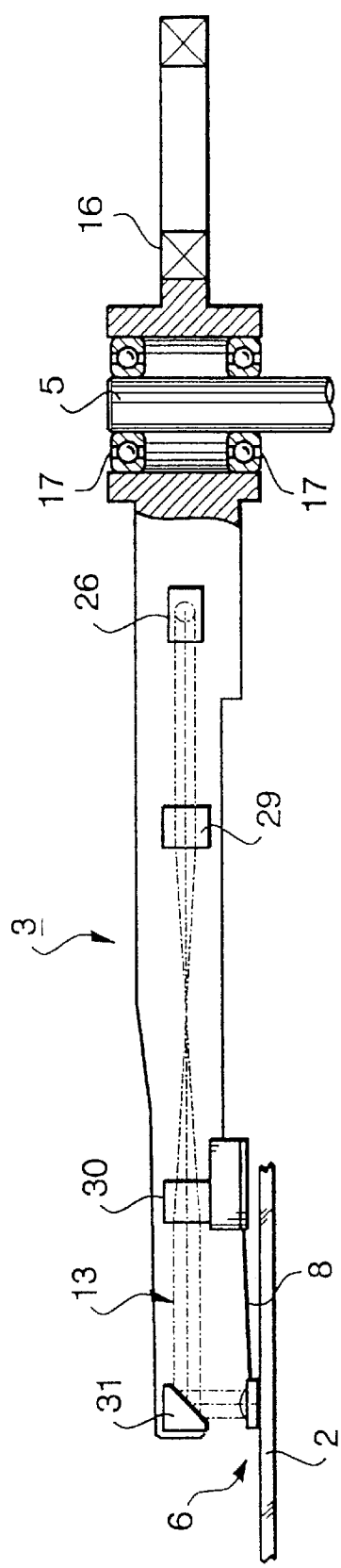
FIG. 6 is a longitudinal sectional view of the rotary arm of the optical disk of FIG. 2.

FIGS. 5 and 6 are a plan view and a sectional view of the rotary arm 3. As shown in FIGS. 5 and 6, the rotary arm 3 is provided with a driving coil 16 at the opposite end to the floating head 6. The driving coil 16 is inserted into a not shown magnetic circuit. The driving coil 16 and the magnetic circuit constitute a voice coil motor 4 (FIG. 2). The rotary arm 3 is supported by the shaft 5 via bearings 17. When current flows in the driving coil 16, the rotary arm 3 is rotated about the axis 5, due to the electromagnetic induction.

As shown in FIGS. 5 and 6, the light source module 7 includes a semiconductor laser 18, a laser drive circuit 19, a collimator lens 20 and a composite prism assembly 21. Further, the light source module 7 includes a laser power monitor sensor 22, a reflection prism 23, a data sensor 24 and a tracking detection sensor 25. A divergent laser beam emitted from the semiconductor laser 18 is converted to a parallel laser beam by the collimator lens 20. Due to the characteristics of the semiconductor laser 18, the sectional shape of the laser beam is elongated. In order to correct the sectional shape of the laser beam, an incident surface 21a of the composite prism assembly 21 is inclined with respect to the incident laser beam. When the laser beam is refracted by the incident surface 21a of the composite prism assembly 21, the sectional shape of the laser beam becomes a circle. The laser beam enters a first half mirror surface 21b. By the first half mirror surface 21b, the laser beam is partially lead to the laser power monitor sensor 22. The laser power monitor sensor 22 detects the intensity of the incident laser beam. The output from the laser power monitor sensor 22 is sent to a power control circuit (not shown) so as to stabilize the power of the semiconductor laser 18.

The tracking operation includes two steps: (1) a rough tracking and (2) a fine tracking. The rough tracking is accomplished by the rotation of the rotary arm 3. The fine tracking operation is accomplished by minutely moving the light spot on the optical disk 2. For this purpose, a galvano mirror 26 is provided in a light path between the light source module 7 and the object lens 10. In particular, the galvano mirror 26 is locate so that the laser beam 13 emitted from the laser source module 7 directly enters. The laser beam 13 reflected by the galvano mirror 26 proceeds to the reflection mirror 31 and is reflected (by the reflection mirror 31) to the floating head 6. Then, the laser beam 13 is converged and incident on the optical disk 2. By rotating the galvano mirror 26, the incident angle of the laser beam 13 incident on the object lens 10 is changed, so that the light spot on the optical disk 2 is moved. The rotating angle of the galvano mirror 26 is detected by a galvano mirror positioning sensor 28 located in the vicinity of the galvano mirror 26.

When the galvano mirror 26 rotates to change the incident angle of the laser beam 13 incident on the object lens 10, there is a possibility that the laser beam 13 partially fails to enter the object lens 10. In order to solve this problem, first and second relay lenses 29 and 30 are provided between the galvano mirror 26 and the reflection lens 31 to obtain the conjugate relationship between a principal plane of the object lens 10 and the center of the mirror surface of the galvano mirror 26 (in the vicinity of the rotation axis thereof). With this, the laser beam 13 reflected by the galvano mirror 26 is surely enter the objective lens 10 irrespective of the rotation of the galvano mirror 26.

The laser beam 13 that has returned from the surface of the optical disk 2 travels through the floating head 6, the relay lenses 30 and 29 and the galvano mirror 26. Then, the laser beam 13 enters the composite prism assembly 21 and is reflected by the first half mirror surface 21b to the second half mirror surface 21c. The laser beam that transmits the second half mirror surface 21c is directed to the tracking detection sensor 25. The tracking detection sensor 25 outputs a track error signal based on the incident laser beam. The laser beam that has reflected by the second half mirror surface 21c is polarized by a Wollaston polarizing prism 32, generating two polarized beams. The polarized beams are converged (by a converging lens 33) on the data detection sensor 24. The data detection sensor 24 has two light receiving portions which respectively receives two polarized beams. With this, the data detection sensor 24 reads data recorded on the optical disk 2. In particular, the data signal from the tracking detection sensor 25 and data detection sensor 24 are generated by a not-shown amplifier circuit and sent to a not-shown control circuit.

First Embodiment

Figure 7:
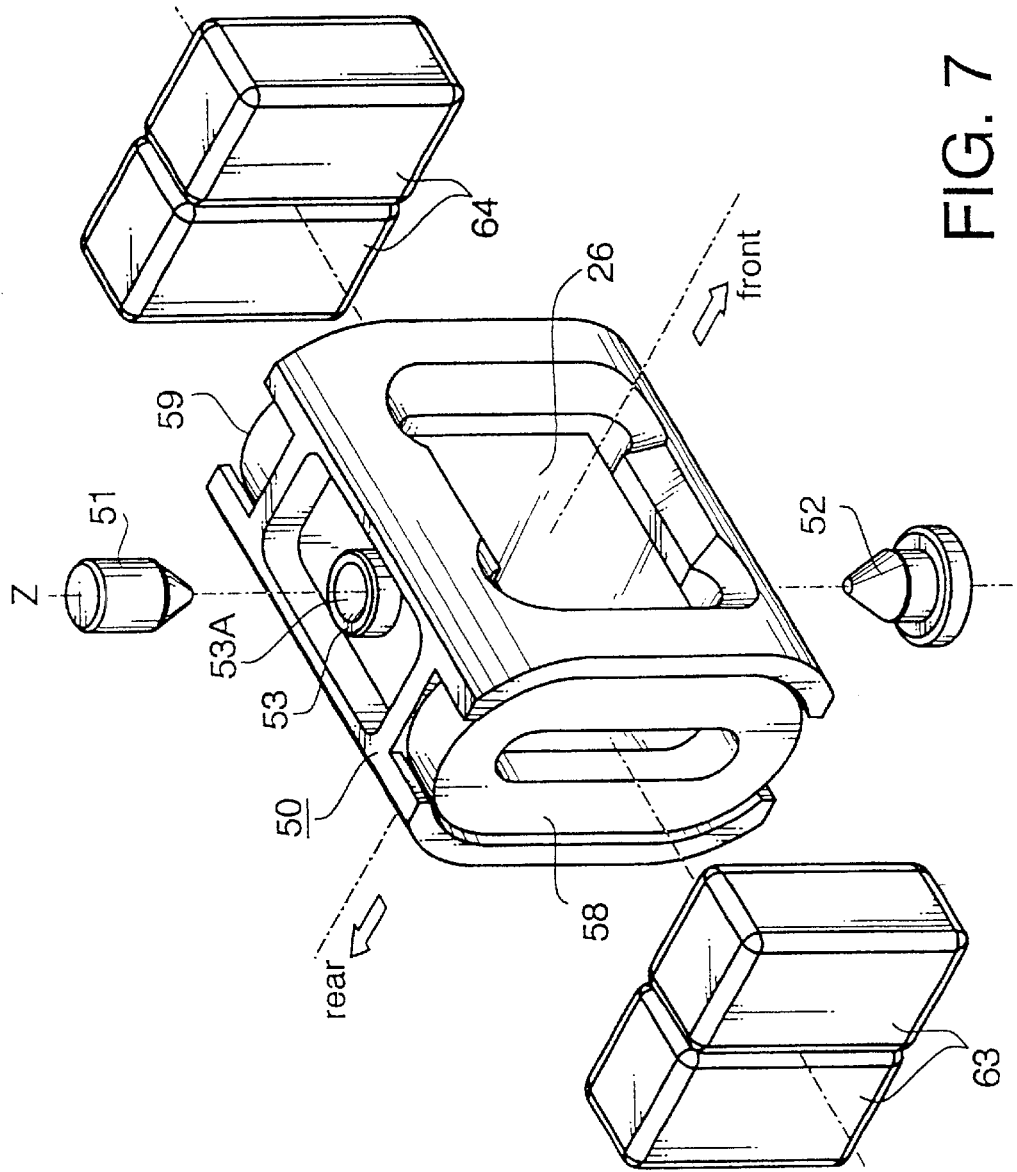
FIG. 7 is an exploded perspective view of a galvano mirror unit according to the first embodiment.

FIG. 7 is an exploded perspective view of a galvano mirror unit including the galvano mirror 26 according to the first embodiment. The galvano mirror 26 is mounted to a mirror holder (rotor) 50 that is supported by a stator 60 (FIG. 9) so that the mirror holder 50 is rotatable about a rotation axis Z. Hereinafter, the direction in parallel to the rotation axis Z is referred to as a vertical direction. Further, a plane that is perpendicular to the rotation axis Z is referred to as a horizontal plane. Further, the galvano mirror 26 side of the mirror holder 50 is referred to as 'front', while the opposite side of the mirror holder 50 is referred to as 'rear'.

Figure 8:
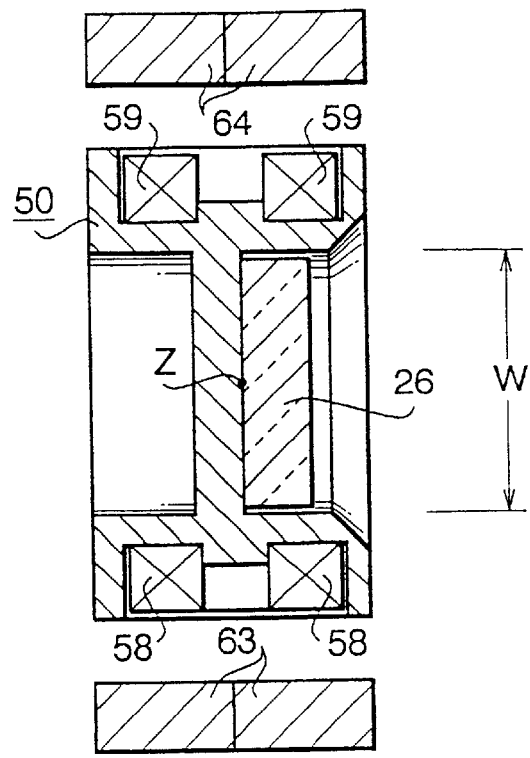
FIG. 8 is a horizontal sectional view of a galvano mirror unit of the first embodiment.
Figure 9:
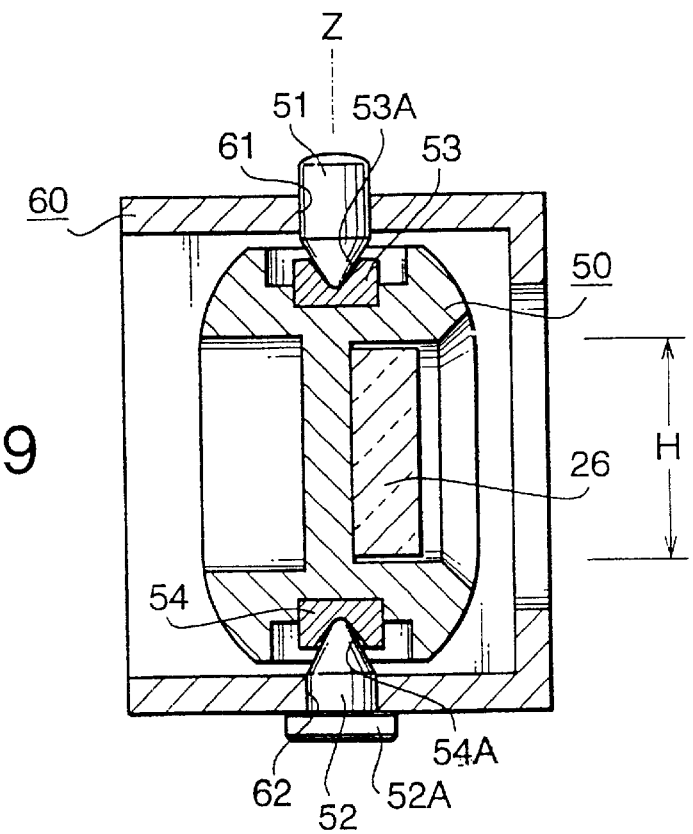
FIG. 9 is a longitudinal sectional view of the galvano mirror unit of the first embodiment of FIG. 7.

FIGS. 8 and 9 are a horizontal sectional view and a longitudinal sectional view of the galvano mirror unit of FIG. 7. The galvano mirror 26 is rectangular shaped and has a certain width W and a height H. The rotation axis Z of the galvano mirror 26 is in parallel to the height H of the galvano mirror 26. Further, the rotation axis Z is at the center of the width W of the galvano mirror 26.

As shown in FIG. 8, a pair of driving coils 58 and 59 are provided to lateral side ends of the mirror holder 50. Further, a pair of driving magnets 63 and 64 are provided to the stator 60 (FIG. 9) so that the driving magnets 63 and 64 are faced with the driving coils 58 and 59, respectively. The driving magnets 63 and 64 generates a magnetic field in which the driving coils 58 and 59 are positioned. The driving coils 58 and 59 are connected to lead wires (not shown) for supplying electricity to the driving coils 58 and 59. When current flows in driving coils 58 and 59, the mirror holder 50 is rotated about the rotation axis Z due to the electromagnetic induction caused by the current and the magnetic field. With such an arrangement, the galvano mirror 26 can be rotated thereby to change the direction of the laser beam reflected by the galvano mirror 26.

As shown in FIG. 9, in order to rotatably support the mirror holder 50, a pair of center pins 51 and 52 are provided to the stator 60 so that the center pins 51 and 52 vertically sandwich the mirror holder 50. The center pins 51 and 52 are aligned on a line defining the rotation axis Z of the mirror holder 50. A pair of receive members 53 and 54 are provided at the top and the bottom of the mirror holder 50, which receive the center pins 51 and 52, respectively.

Figure 10:
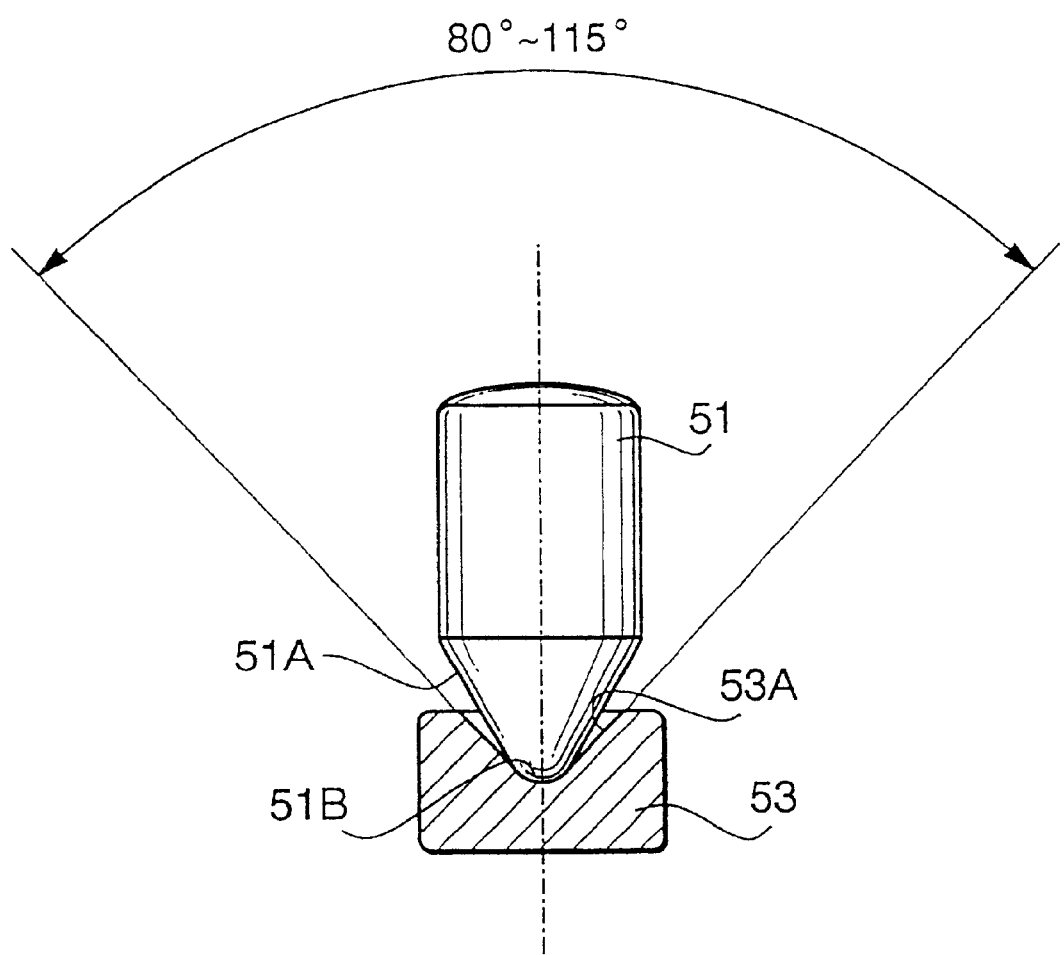
FIG. 10 is an enlarged view illustrating a center pin and a receive member of the first embodiment.

FIG. 10 is an enlarged view illustrating the upper center pin 51 and the upper receive member 53. The upper center pin 51 has a conical bottom portion 51A and a rounded top portion. The apex 51B of the conical bottom portion 51A is rounded. The receiving member 53 has a recess 53A having a conical surface. The rounded apex 51B of the upper center pin 51 contacts the conical surface of the recess 53A. With this, the upper center pin 51 is received by the receive member 53 so that the receive member 53 is rotatable with respective to the upper center pin 51. Preferably, the apex angle of the conical surface of the recess 53A is set from 80° to 115°. The lower center pin 52 and the lower receive member 54 contact in a similar manner to the upper center pin 51 and the upper receive member 53. As shown in FIG. 9, the center pins 51 and 52 are fit into holes 61 and 62 of the stator 60. The lower center pin 52 has a flange portion 52A for determining the axial position of the lower center pin 52 when the lower center pin 52 is fit into the hole 62.

Preferably, the receive members 53 and 54 are made of ruby or sapphire. Since ruby and sapphire have low coefficient of friction, the driving force for rotating the mirror holder 50 is relatively small. Further, since ruby and sapphire have high wear resistance, the rotation of the mirror holder 50 is stable for a long time.

Figure 11A:
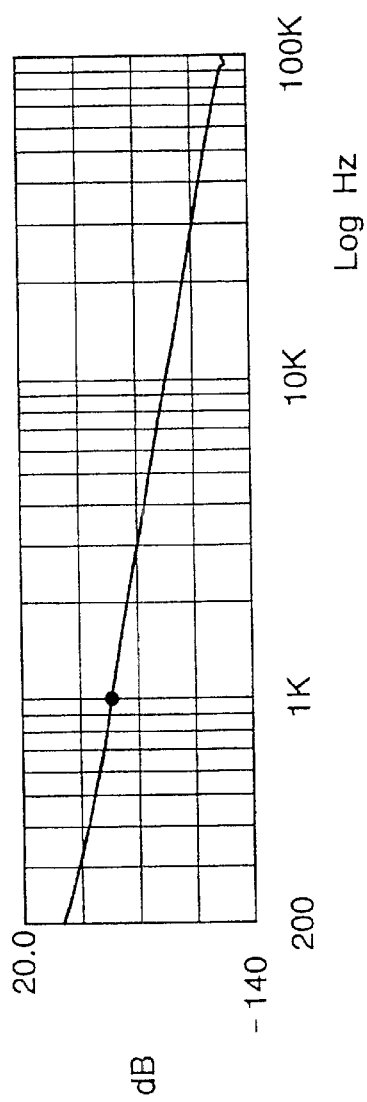
FIGS. 11A and 11B are Bode diagrams showing examples of amplitude/frequency characteristics and phase/frequency characteristics of the galvano mirror unit of the first embodiment.
Figure 11B:
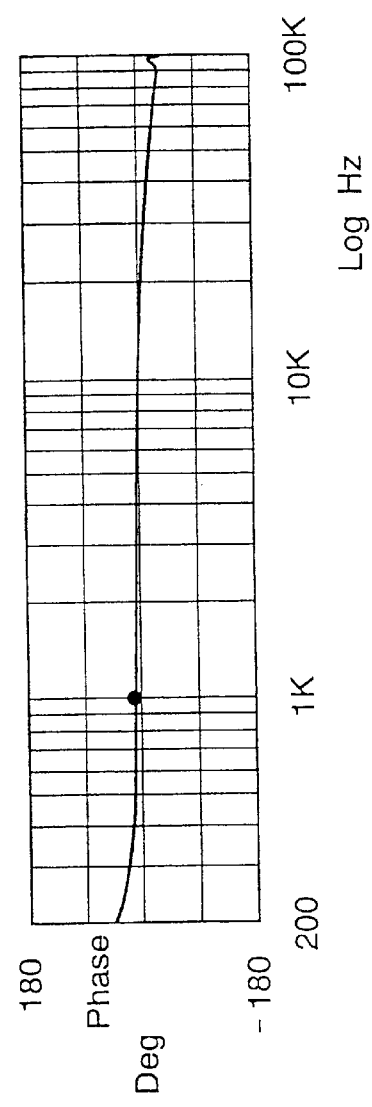

FIGS. 11A and 11B are Bode diagrams respectively showing examples of amplitude/frequency characteristics and phase/frequency characteristics of the galvano mirror unit of the first embodiment. FIGS. 11A and 11B are obtained by measuring responses (by means of a laser-Doppler vibration meter) of the galvano mirror 26 with respect to the frequency of the current in the driving coils 58 and 59. As seen from FIGS. 11A and 11B, there is no primary resonance frequency that causes an unstable rotation of the galvano mirror 26.

Figure 1:
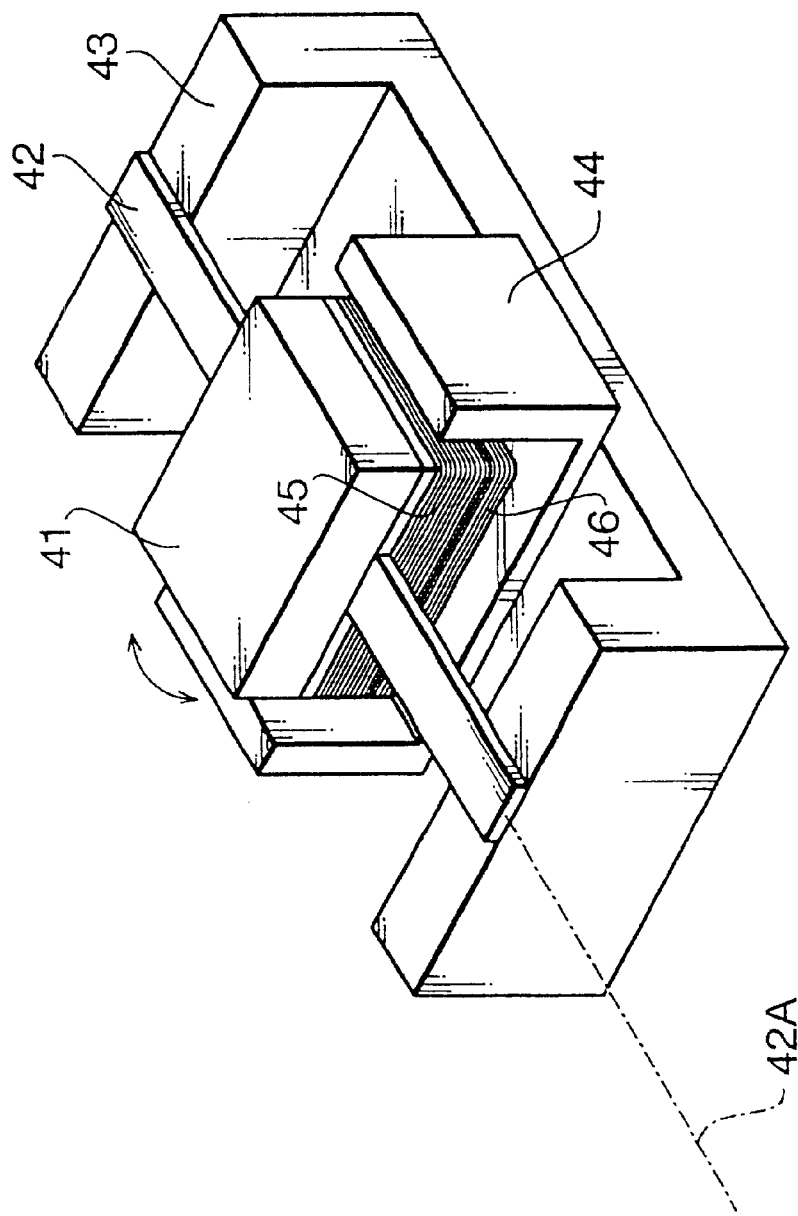
FIG. 1 is a perspective view of a conventional galvano mirror unit.

As constructed above, according to the first embodiment, the galvano mirror 26 is pivoted by the center pins 51 and 52 and the receive members 53 and 54. Thus, unlike a conventional galvano mirror in which a galvano mirror is supported by a spring mechanism (FIG. 1), there is no primary resonance frequency that causes an unstable rotation of the galvano mirror 26. Thus, it is possible to obtain a stable tracking operation.

Further, in the conventional spring-supported galvano mirror (FIG. 1), in order to lower the primary resonance frequency, it is necessary to lengthen the spring member. It may increase the size of the galvano mirror unit. However, in this embodiment, it is not necessary to increase the size of the galvano mirror unit, since there is no primary resonance frequency.

Second Embodiment

Figure 12:
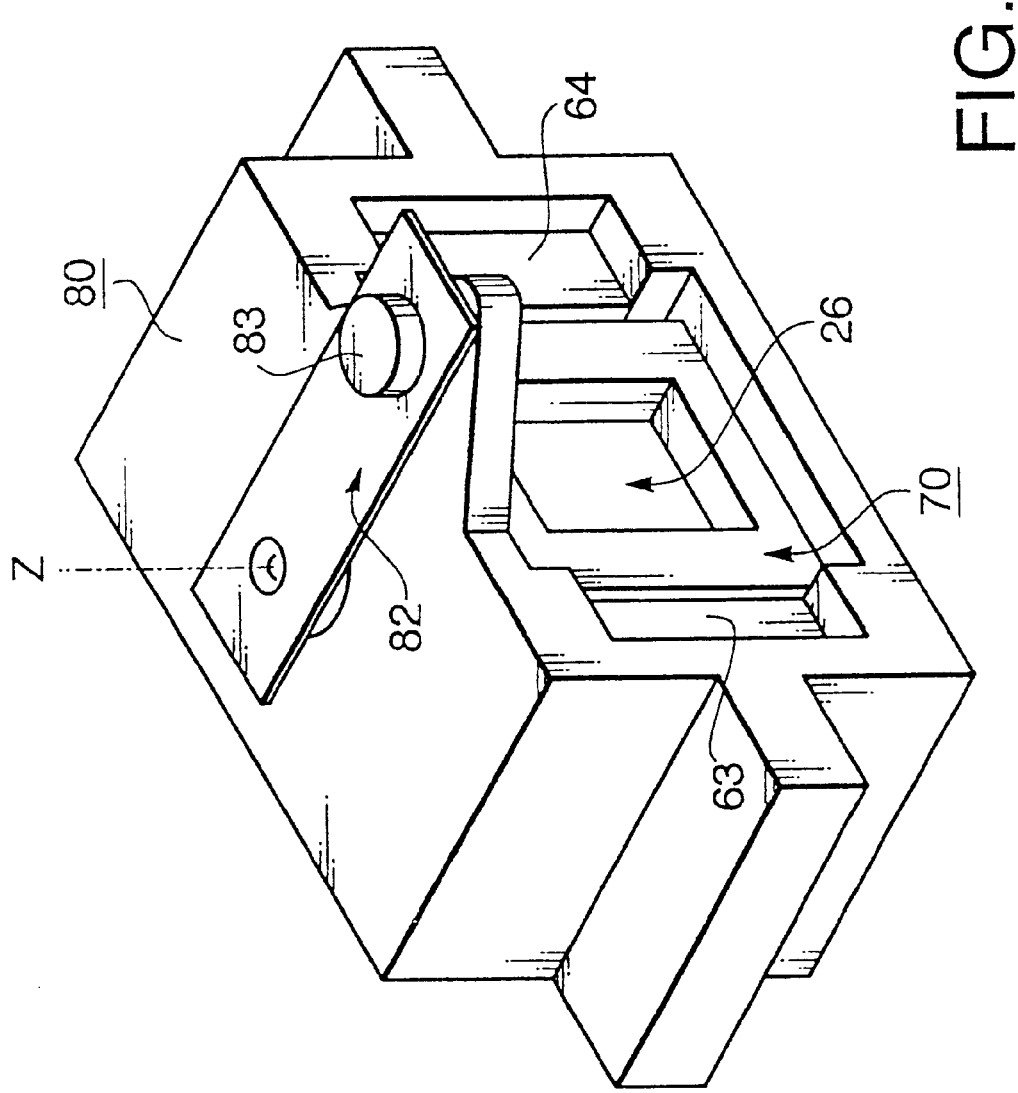
FIG. 12 is a perspective view of a galvano mirror unit of the second embodiment.
Figure 13:
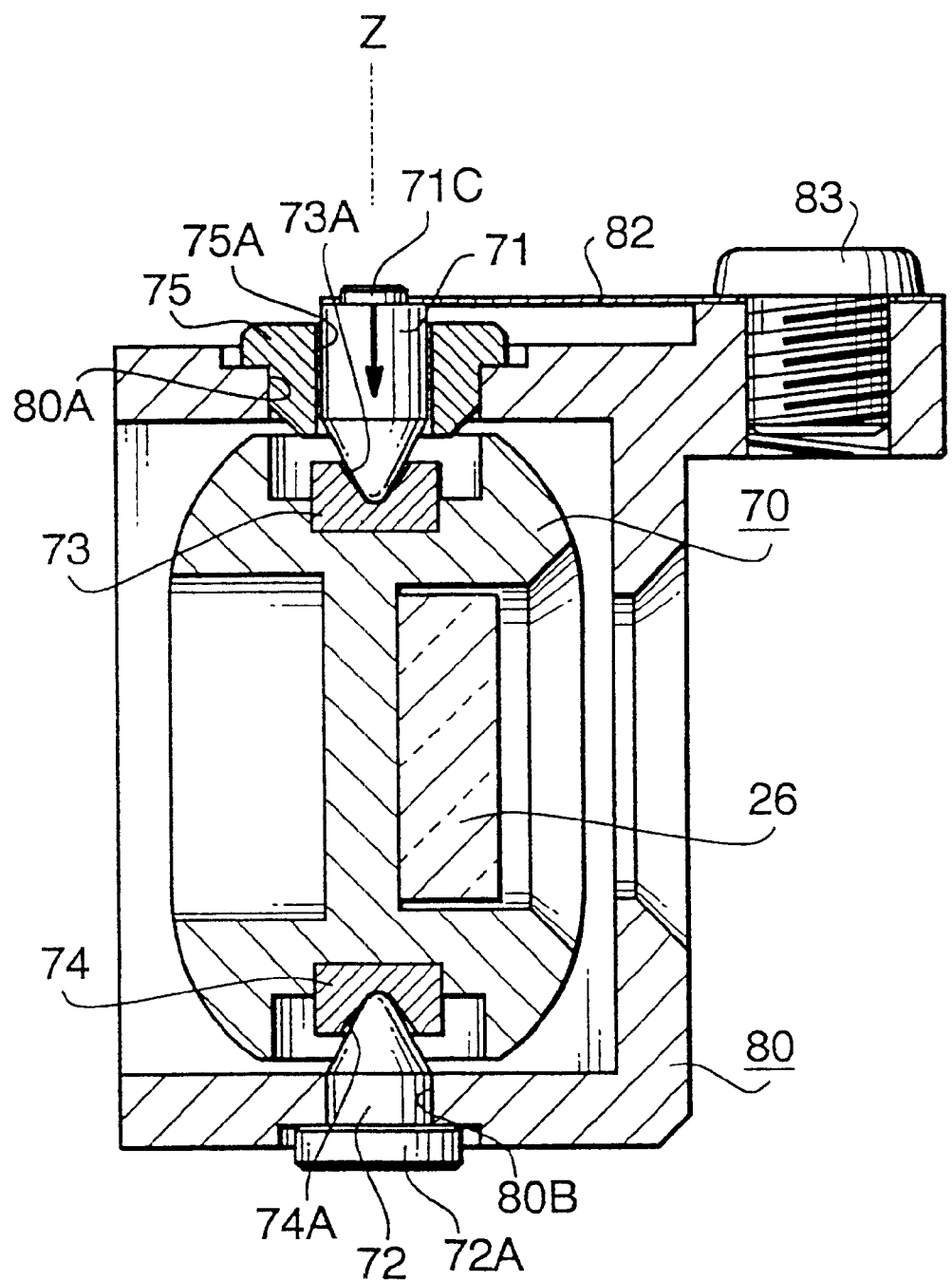
FIG. 13 is a longitudinal sectional view of the galvano mirror unit of FIG. 12.

FIGS. 12 and 13 are a perspective view and a sectional view of a galvano mirror unit according to the second embodiment. As shown in FIGS. 12 and 13, the galvano mirror 26 is mounted to a mirror holder 70 that is rotatably supported by a stator 80.

As shown in FIG. 13, in order to rotatably support the mirror holder 70, a pair of center pins 71 and 72 are provided to the stator 80 so that the center pins 71 and 72 vertically sandwich the mirror holder 70. The center pins 71 and 72 are aligned on a line defining the rotation axis Z of the mirror holder 70. A pair of receive members 73 and 74 are provided at the top and the bottom of the mirror holder 70, which receive the center pins 71 and 72, respectively.

Figure 14:
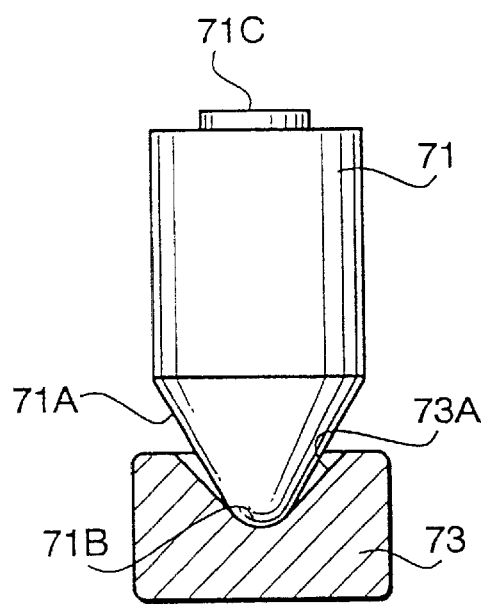
FIG. 14 is an enlarged view illustrating a center pin and a receive member of the second embodiment.

FIG. 14 is an enlarged view illustrating the upper center pin 71 and the upper receive member 73. The center pin 71 (72) contacts the receive member 73 (74) in a similar manner that the center pin 51 (52) contacts the receive member 53 (54) in the first embodiment (FIG. 10).

As shown in FIG. 13, the lower center pin 72 is fit into a hole 80B formed on the bottom of the stator 80. The lower center pin 72 has a flange portion 72A for determining the axial position of the lower center pin 72. The upper center pin 71 is inserted into a hole 80A formed on the top of the stator 80 via a bushing 75. The bushing 75 has a center hole 75A through which the upper center pin 71 is inserted. The outer diameter of the upper center pin 71 is smaller than the inner diameter of the hole 75A of the busing 75, so that the upper center pin 71 is axially movable in the busing 75.

Figure 15:
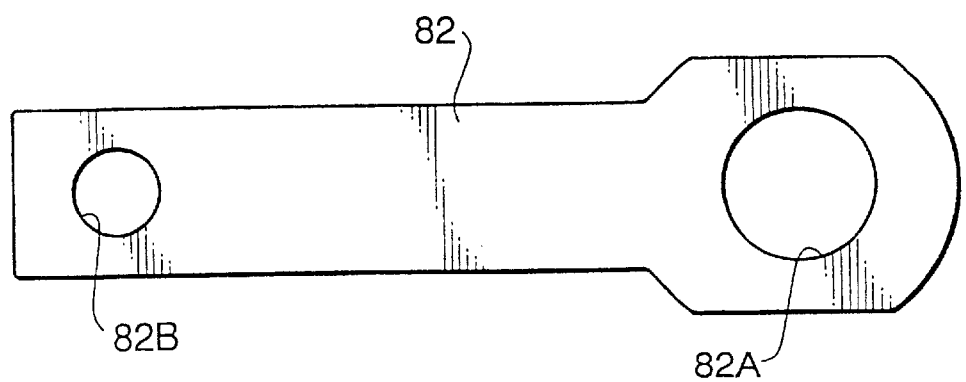
FIG. 15 is a plan view of the plate spring.

A plate spring 82 is provided at the top of the stator 80, which urges the upper center pin 71 downward. One end of the plate spring 82 is fixed to the stator 80 by means of a fixing screw. 83, while the other end of the plate spring 82 is placed on the upper center pin 71. Due to the biasing of the plate spring 82, the backlash between the center pin 71 (72) and the receive member 73 (74) can be eliminated. As shown in FIG. 15, the plate spring 82 has a first engaging hole 82A through which the fixing screw 83 is inserted and a second engaging hole 82B described below.

In order to prevent the inclination of the upper center pin 71, the upper center pin 71 is provided with a projection 71C at the top thereof. The protrusion 71C engages the second engaging hole 82B. Due to the engagement of the projection 71C and the second engaging hole 82B, the inclination of the upper center pin 71 (in the hole 75A of the busing 75) is prevented.

In the second embodiment, an arrangement (driving coils and driving magnets) for actuating the galvano mirror 26 is the same as the first embodiment (FIG. 7).

According to the second embodiment, due to the biasing of the plate spring 82, the backlash between the center pin 71 (72) and the receive member 73 (74) can be eliminated. Further, since the projection 71C of the upper center pin 71 engages the second engaging hole 82B of the plate spring 82, the inclination of the upper center pin 71 (in the hole 75A of the busing 75) is prevented. Therefore, the rotation of the galvano mirror 26 is stabilized.

Figure 16:
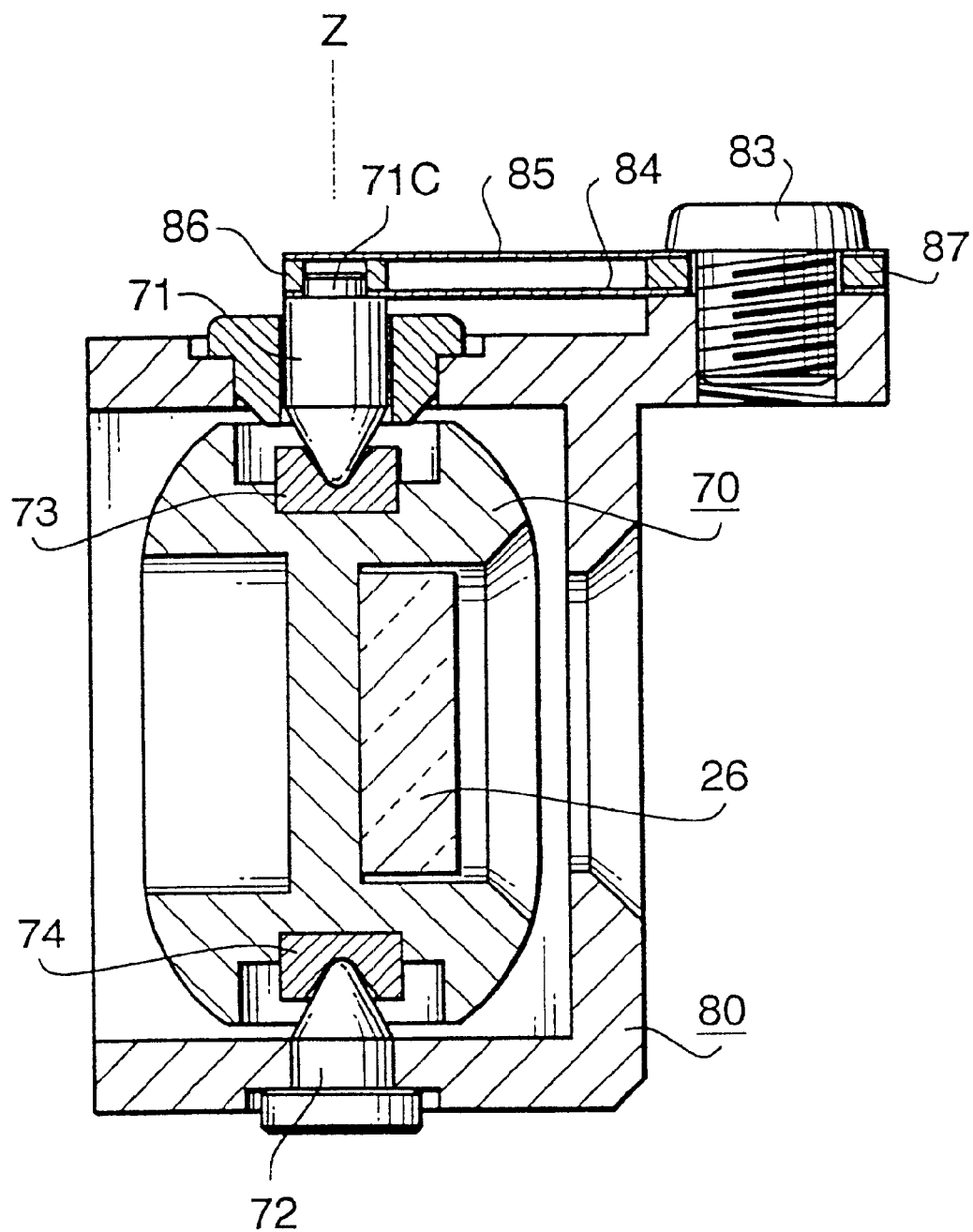
FIG. 16 is a longitudinal view of a galvano mirror unit of the first modification of the second embodiment.

The first modification of the second embodiment is described. FIG. 16 is a sectional view of a galvano mirror unit of the first modification of the second embodiment. In this modification, the upper center pin 71 is biased by a pair of plate springs 84 and 85 that are faced with each other. One end of the pair of the plate springs 84 and 85 are fixed to the top of the stator 80 (via the fixing screw 83), while the other end is placed on the upper center pin 71. Spacers 86 and 87 are sandwiched between the plate springs 84 and 85, so that the plate springs 84 and 85 are in parallel with each other. The spacers 86 and 87 are adhered to the plate springs 84 and 85. The lower plate spring 84 is similar to the plate spring 82 of the second embodiment (FIG. 15) and has an engaging hole which engages the projection 71C of the upper center pin 71. The upper plate 85 is different from the plate spring 82 in that the upper plate 85 has no engaging hole which engages the projection of the upper center pin 71. With this, the plate springs 84 and 85 act as integrally formed spring member.

According to the first modification of the second embodiment, since two plate springs 84 and 85 are used as a biasing member for biasing of the upper center pin 71, the rigidity of the biasing member is relatively high. Alternatively, it is possible to provide three or more plate springs.

Figure 17:
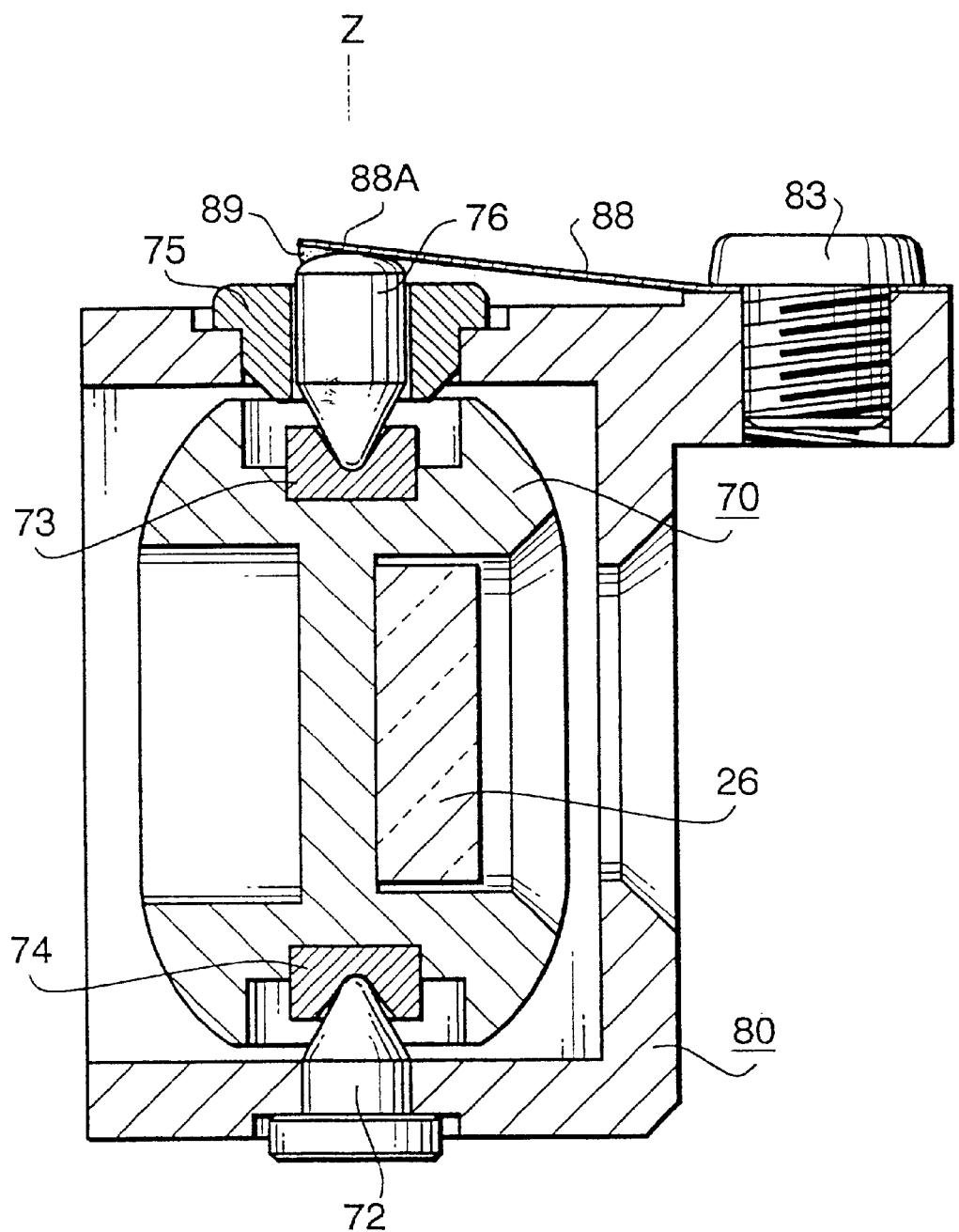
FIG. 17 is a longitudinal sectional view of a galvano mirror unit of the second modification of the third embodiment.

The second modification of the second embodiment is described. FIG. 17 is a sectional view of a galvano mirror unit of the second modification of the second embodiment.

In the second modification, an upper center pin 76 has a conical bottom portion 71A and a rounded top surface. The lower center pin 72 and the receive members 73 and 74 are the same as the second embodiment (FIG. 13).

A plate spring 88 is mounted to the top of the stator 80 via the screw 83 so that the plate spring 88 is inclined with respect to the rotation axis Z of the galvano mirror 26. There is a gap 89 between the round top surface of the upper center pin 76 and the distal end of the plate spring 88. An adhesive agent is applied to the gap between the upper center pin 76 and the plate spring 88, so that the upper center pins 76 is adhered to the plate spring 88.

It is possible to use the plate spring 82 of the second embodiment (FIG. 15) instead of the plate spring 88. In such case, it is also possible to supply adhesive through the engaging hole 82A of the plate spring 82.

According to the second modification of the second embodiment, since the upper center pin 76 is adhered to the plate spring 88, the deviation of the inclination of the upper center pin 76 (in the busing 75) is prevented. Therefore, the rotation of the galvano mirror 26 is stabilized.

Third Embodiment

Figure 18:
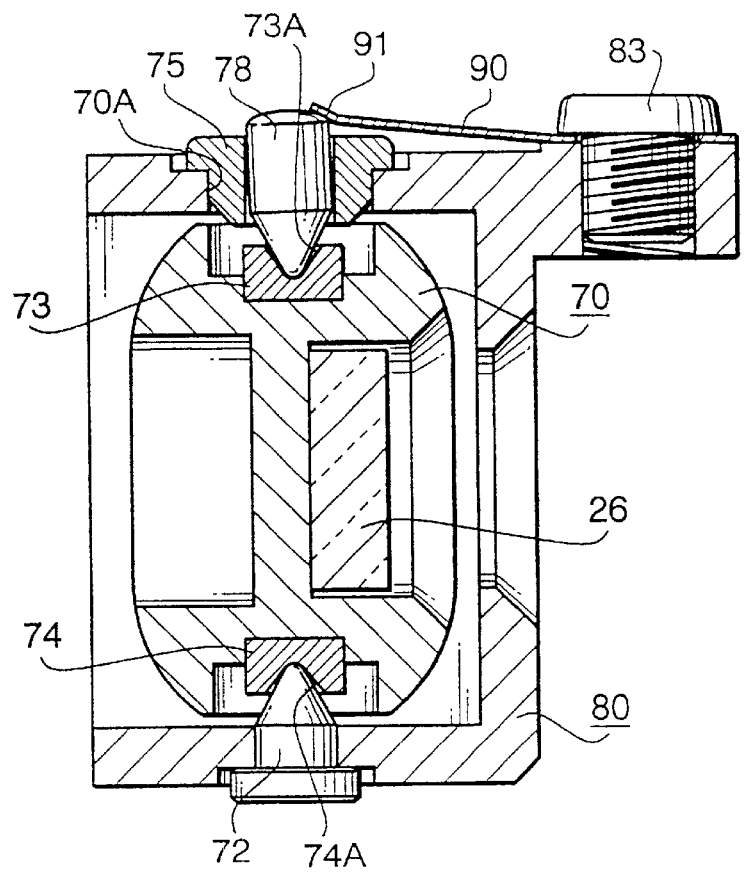
FIG. 18 is a longitudinal sectional view of a galvano mirror unit of the third embodiment.
Figure 19:
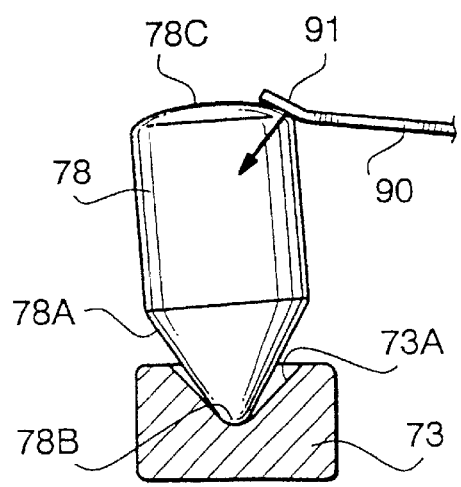
FIG. 19 is an enlarged view illustrating a center pin and a receive member of the galvano mirror unit of FIG. 18.

FIG. 18 is a sectional view of a galvano mirror unit according to the third embodiment. FIG. 19 is an enlarged view of an upper center pin 78 of the third embodiment. As shown in FIG. 19, the upper center pin 78 has a rounded top portion 78C and a conical bottom portion 78A. The apex 78B of the conical bottom portion 78A is rounded. As shown in FIG. 18, the upper center pin 78 is inserted into the bushing 75 mounted to the stator 80. The bushing 75 is the same as the second embodiment (FIG. 13), and has the hole in which the upper center pin 78 is movably supported therein. The center pin 78 (72) contacts the receive member 73 (74) in a similar manner that the center pin 51 (52) contacts the receive member 53 (54) in the first embodiment (FIG. 10).

Figure 20:
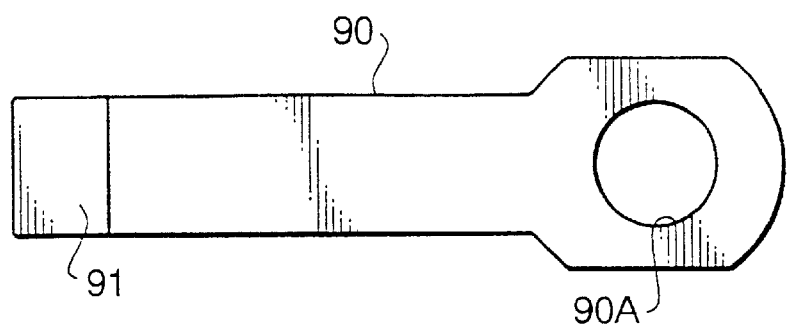
FIG. 20 is a plan view of a plate spring of the galvano mirror unit of FIG. 18.

A plate spring 90 is provided at the top of the stator 80, which biases the upper center pin 78 downward. One end of the plate spring 90 is fixed to the stator 80 (by a fixing screw 83), while the other end of the plate spring 90 is bent upward (to form a bent portion 91). The bent portion 91 contacts the front periphery of the top portion 78C of the upper center pin 78. With this, the plate spring 90 urges the upper center pin 78 diagonally downward as shown by an arrow in FIG. 19. Due to the diagonally downward force, the upper center pin 78 is inclined in a direction in which the top portion 78C of the upper center pin 78 is moved rearward. FIG. 20 is a plan view of the plate spring 90. As shown in FIG. 20, a screw hole 90A (through which the fixing screw 83 is inserted) is formed on an end of the plate spring 90, and the bent portion 91 is formed on the other end of the plate spring 90.

In the third embodiment, an arrangement (driving coils and driving magnets) for actuating the galvano mirror 26 is the same as the first embodiment (FIG. 7).

According to the third embodiment, due to the biasing of the plate spring 90, the backlash between the center pin 78 (72) and the receive member 73 (74) can be eliminated. Further, since the plate spring 90 biases the upper center pin 78 diagonally downward, the upper center pin 78 is inclined in a certain direction. Accordingly, the direction in which the upper center pin 78 is inclined (in the busing 75) is determined. Thus, the deviation of the inclination of the upper center pin 78 is prevented. Therefore, the rotation of the galvano mirror 26 is stabilized.

Figure 21:
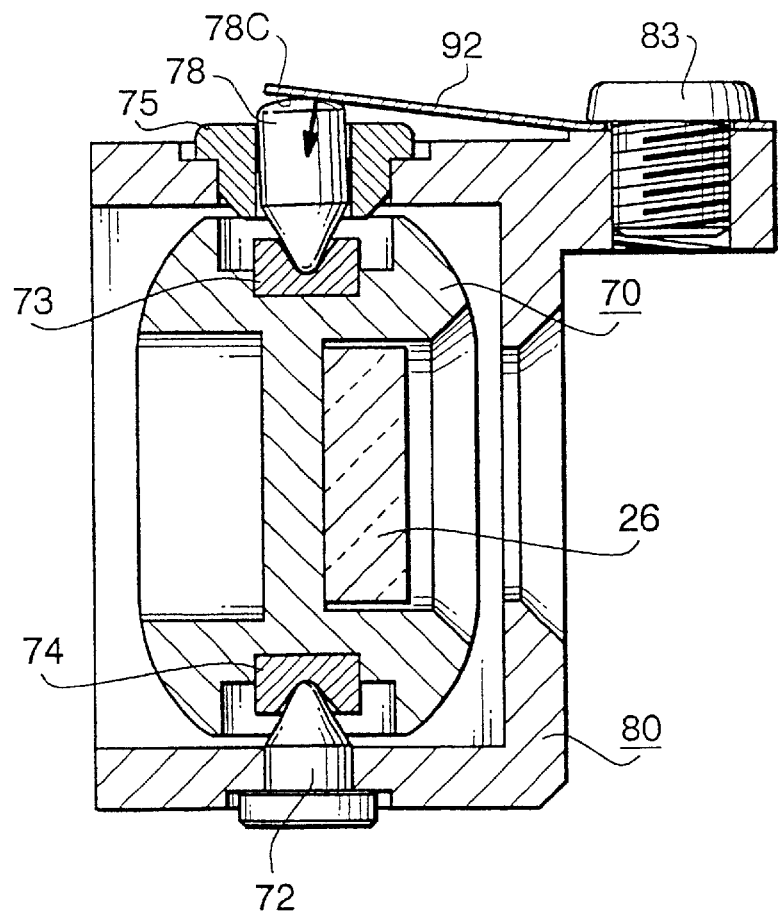
FIG. 21 is a longitudinal sectional view of a galvano mirror unit of the first modification of the third embodiment.

The first modification of the third embodiment is described. FIG. 21 is a sectional view of the galvano mirror unit of the first modification of the third embodiment. Unlike the plate spring 90 of the third embodiment, a plate spring 92 of the first modification has no bent portion. In order to incline the upper center pin 78, the plate spring 92 biases the periphery of the rounded top portion 78C of the upper center pin 78.

Accordingly, the direction in which the upper center pin 78 is inclined is determined. Thus, the deviation of the inclination of the upper center pin 78 is prevented. Therefore, the rotation of the galvano mirror 26 is stabilized.

Figure 22:
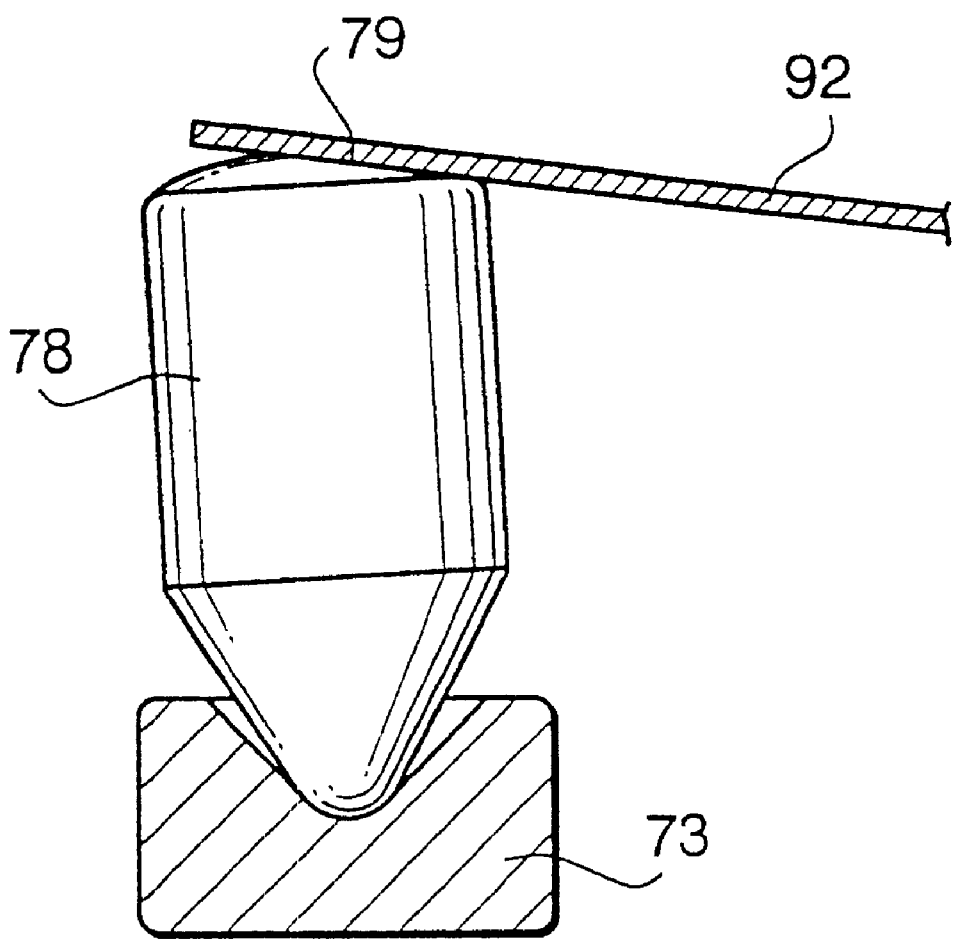
FIG. 22 is a perspective view showing a center pin and a plate spring of the second modification of the third embodiment.

The second modification of the third embodiment is described. FIG. 22 shows the upper center pin 78 and the plate spring 92 of the second modification. In this second modification, the upper center pin 78 is provided with a flat portion 79 at the rounded top portion. The plate spring 90 meets with the flat portion 79 of the upper center pin 78 by face-to-face contact.

With such an arrangement, since the plate spring 92 meets with the flat portion 79 by face-to-face contact, the upper center pin 78 is surely inclined. Thus, the contact of the plate spring 92 and the upper center pin 78 is further stabilized.

Fourth Embodiment

Figure 23:
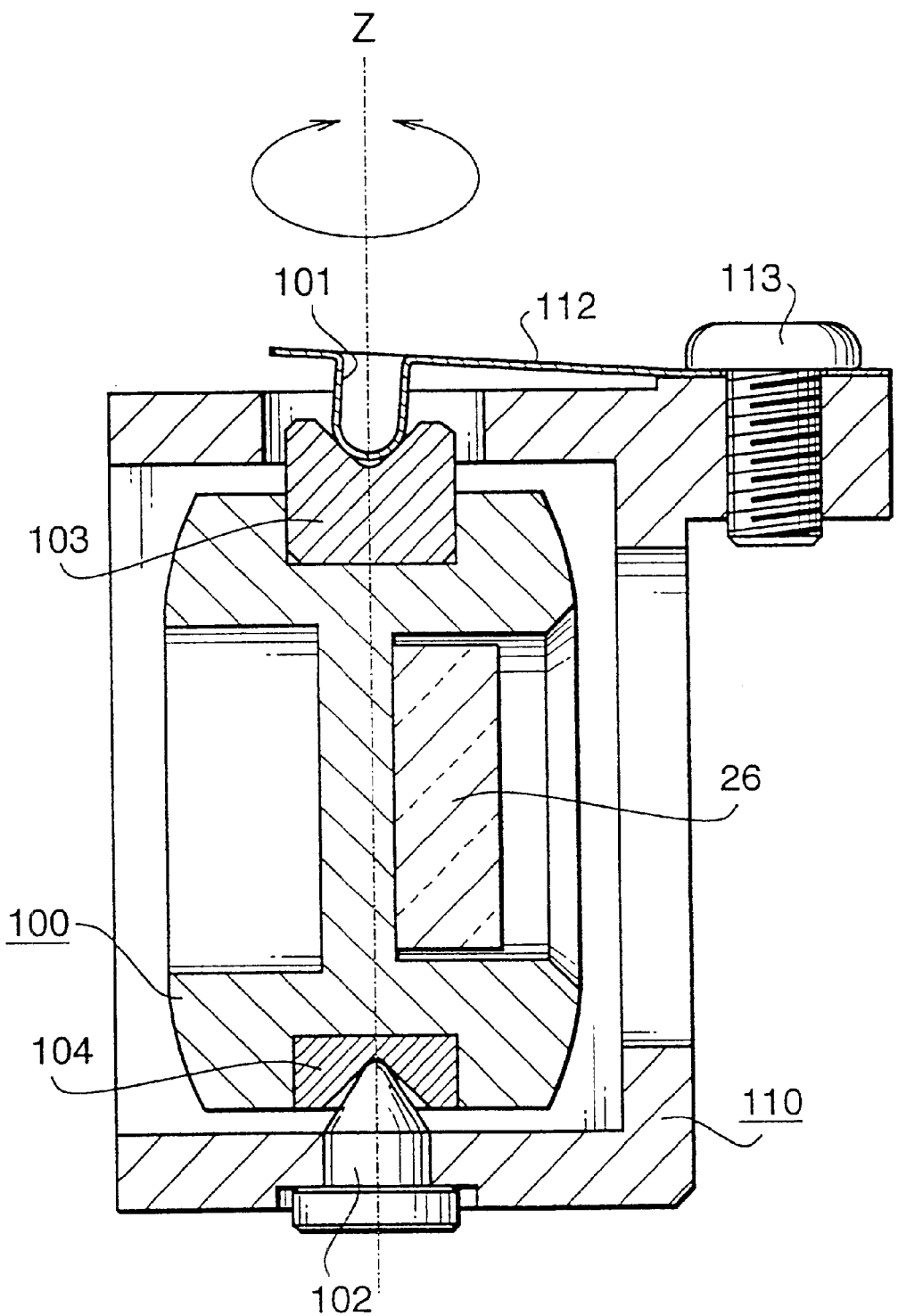
FIG. 23 is a longitudinal sectional view of a galvano mirror unit according to the fourth embodiment.

FIG. 23 is a sectional view of a galvano mirror unit according to the fourth embodiment. The galvano mirror 26 is mounted to a mirror holder 100 that is supported by a stator 110 so that the mirror holder 100 is rotatable about a rotation axis Z. In order to rotatably support the mirror holder 100, a pair of center pins 101 and 102 are provided to the stator 110 so that the center pins 101 and 102 vertically sandwich the mirror holder 100. The center pins 101 and 102 are aligned on a line defining the rotation axis Z of the mirror holder 100. A pair of receive members 103 and 104 are provided at the top and the bottom of the mirror holder 100, which respectively receive the center pins 101 and 102.

The lower center pin 102 is fit into a hole formed on the bottom of the stator 110. The lower center pin 102 includes a conical upper portion, with an apex thereof being rounded. The lower receive member 104 has a conical recess. The rounded apex of the lower center pin 102 contacts the conical recess of the lower receive member 104 The upper center pin 101 is unitarily formed with a plate spring 112 provided at the top of the stator 110. The plate spring 112 is fixed to the stator 110 (via a fixing screw 113) at an end thereof, and the upper center pin 101 is formed on the other end of the plate spring 112.

The upper center pin 101 has a cylindrical shape, a bottom portion thereof being rounded. The rounded bottom portion of the upper center pin 101 contacts the conical surface of the upper receive member 103. With this, the mirror holder 100 is pivoted by the center pins 101 and 102 and the receive members 103 and 104.

In the fourth embodiment, an arrangement (driving coils and driving magnets) for actuating the galvano mirror 26 is the same as the first embodiment (FIG. 7).

According to the fourth embodiment, due to the elastic force of the plate spring 112, the backlash between the center pin 101 (102) and the receive members 103 (104) can be eliminated. Further, since the upper center pin 101 is unitarily formed with the plate spring 112, the parts number can be reduced. Furthermore, since the upper center pin 101 is movable only in the axial direction, the inclination of the mirror holder 100 is prevented. Therefore, the rotation of the galvano mirror 26 is stabilized.

Figure 24:
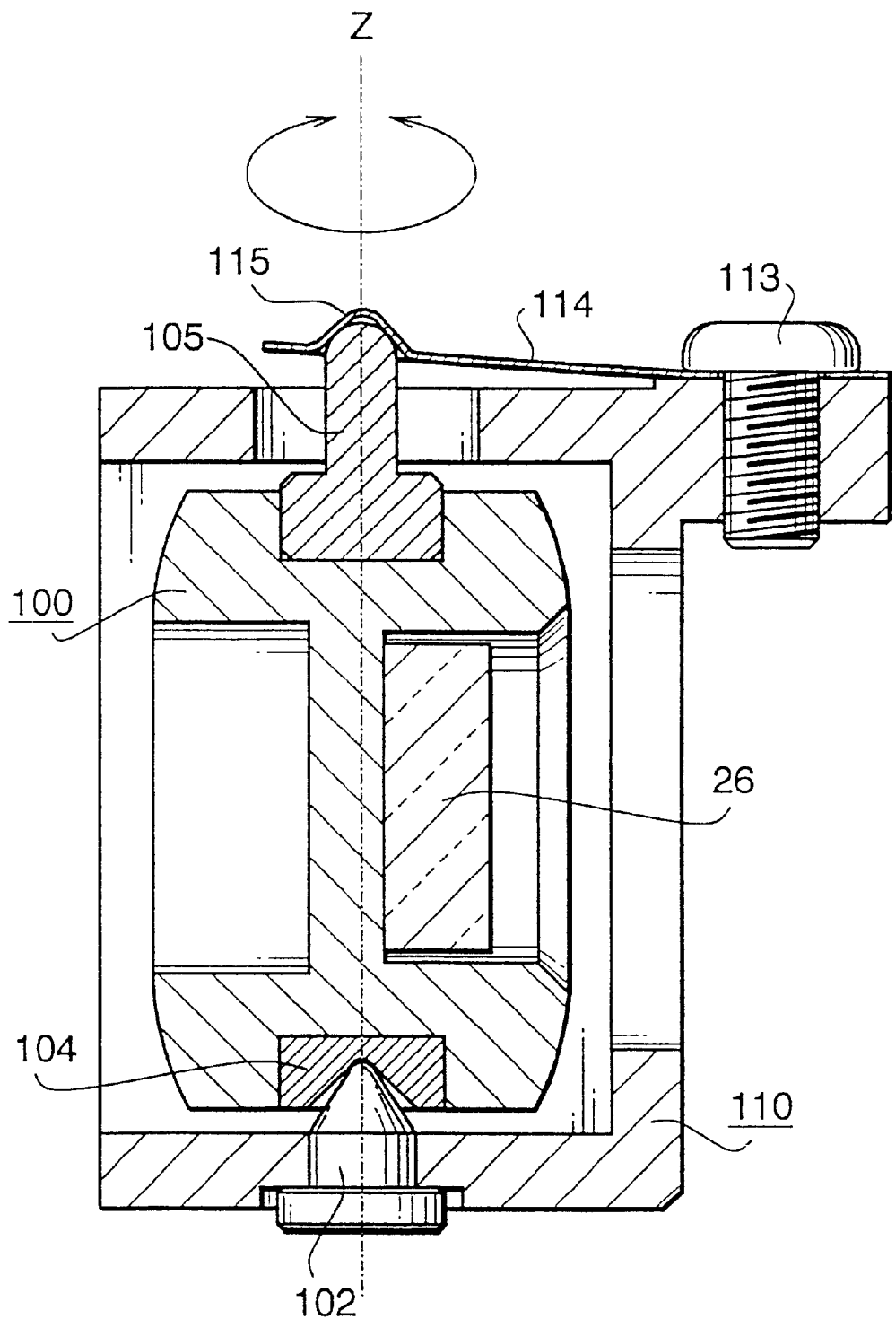
FIG. 24 is a longitudinal sectional view of s galvano mirror unit of the modification of the fourth embodiment.

FIG. 24 is a sectional view of a galvano mirror unit of the modification of the fourth embodiment. In this modification, an upper center pin 105 is fixed to the top of the mirror holder 100 and projects upward. The top portion of the upper center pin 105 is rounded. A plate spring 114 is provided at the top of the stator 110, which has an indentation 115 that receives the top portion of the upper center pin 105. The indentation 115 has a conical surface, and the rounded top portion of the upper center pin 105 contacts the conical surface of the indentation 115. The lower center pin 102 and the lower receive member 104 are the same as the fourth embodiment. With this, the mirror holder 100 is pivoted by the center pins 105 and 102, the indentation 115 (of the plate spring 114) and the receive member 104.

With such an arrangement, since the upper center pin 105 is received by the indentation 115 of the plate spring 114, it is not necessary to further provide a receive member that receives the upper center pin 105. Thus, the parts number can be reduced. Further, the inclination of the mirror holder 100 is prevented.

Fifth Embodiment

Figure 25:
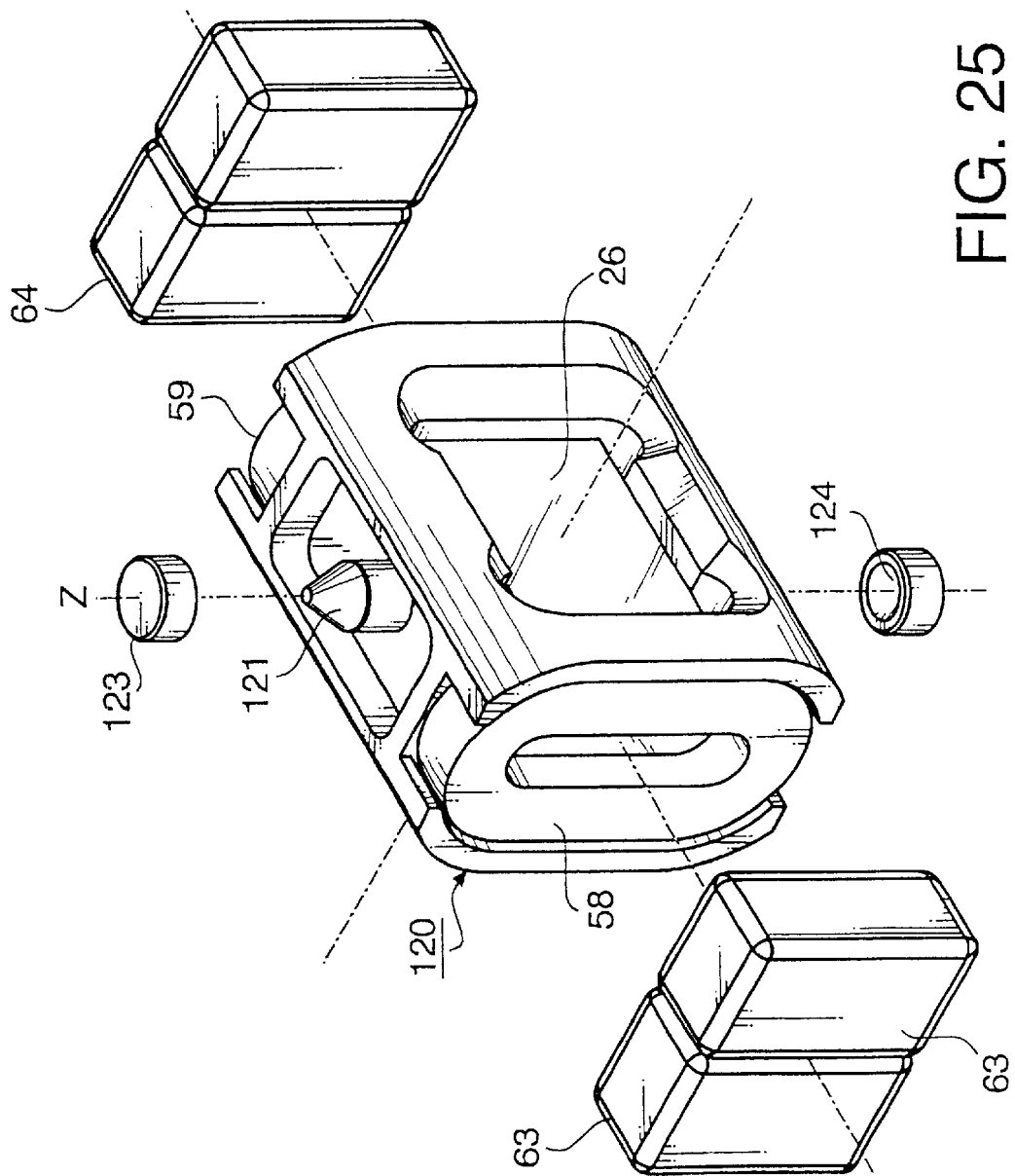
FIG. 25 is a perspective view of the galvano mirror unit of the fifth embodiment.
Figure 26:
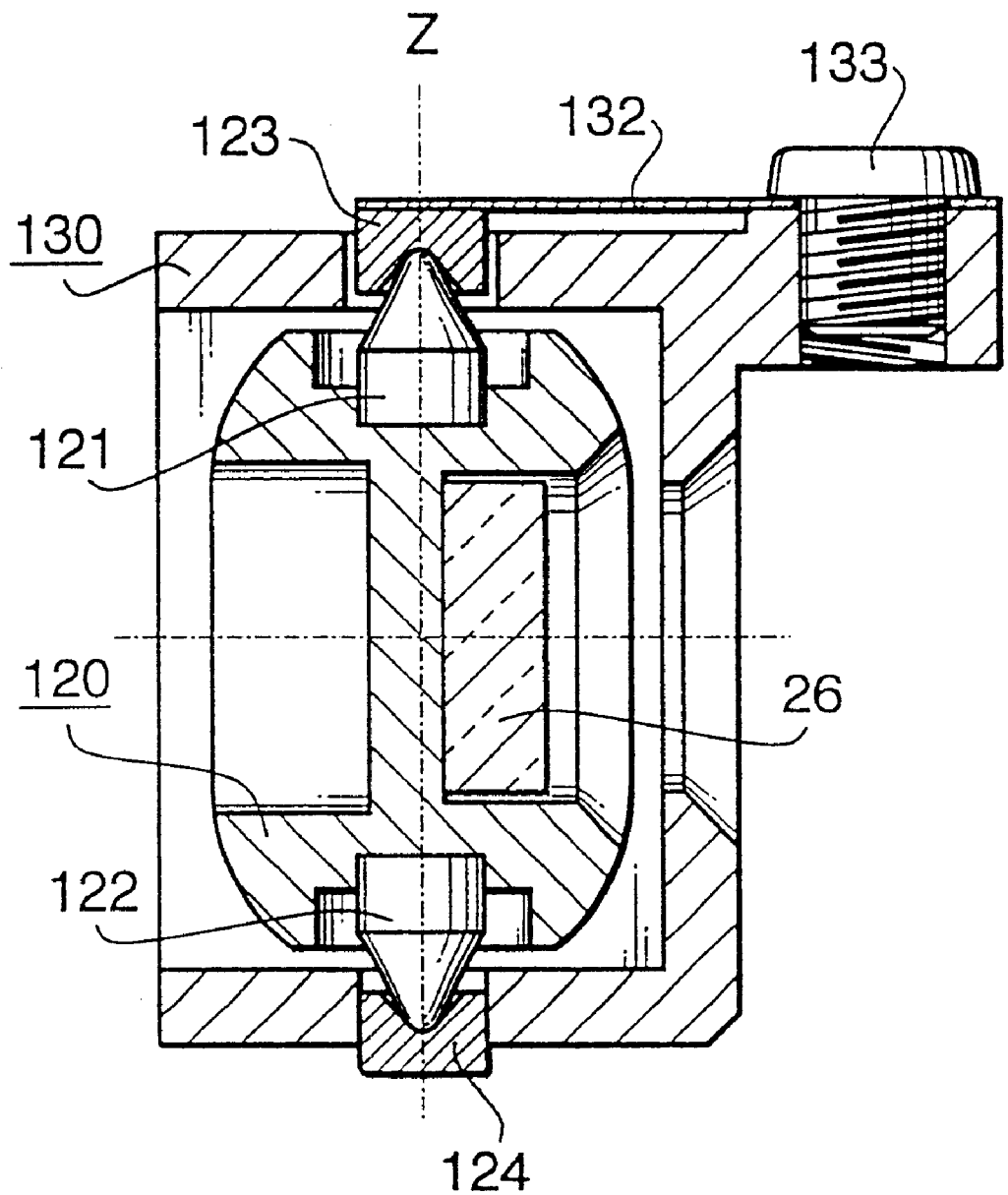
FIG. 26 is a longitudinal sectional view of the galvano mirror unit of FIG. 25.

FIGS. 25 and 26 are a perspective view and a sectional view of a galvano mirror unit according to the fifth embodiment. The galvano mirror 26 is mounted to a mirror holder 120 that is supported by a stator 130 so that the mirror holder 120 is rotatable about a rotation axis Z. In order to rotatably support the mirror holder 120, a pair of center pins 121 and 122 are provided at the top and bottom of the mirror holder 120. The center pins 121 and 122 are aligned on a line defining the rotation axis Z. The center pins 121 and 122 are received by receive members 123 and 124 provided to the top and the bottom of the stator 130. The lower receive member 124 is fitted into a hole formed on the bottom of the stator 130, while the upper receive member 121 is fixed to a plate spring 132 provided at the top of the stator 130. Each of the center pins 121 and 122 has a conical portion with an apex being rounded. Each of the receive members 123 and 124 has a recess with a conical surface. The rounded apex of the upper center pin 121 contacts the conical surface of the receive member 123, and the rounded apex of the lower center pin 122 contacts the conical surface of the receive member 124. With this, the center pins 121 and 122 are received by the receive members 123 and 124. Due to the elastic force of the plate spring 132, the backlash between the center pin 121 (123) and the receive member 122 (124) can be eliminated.

In the fifth embodiment, an arrangement (driving coils and driving magnets) for actuating the galvano mirror 26 is the same as the first embodiment (FIG. 7).

According to the fifth embodiment, since the upper receive member 123 is fixed to the plate spring 132, the inclination of the mirror holder 120 is prevented. Therefore, the rotation of the galvano mirror 26 is stabilized.

Sixth Embodiment

Figure 27:
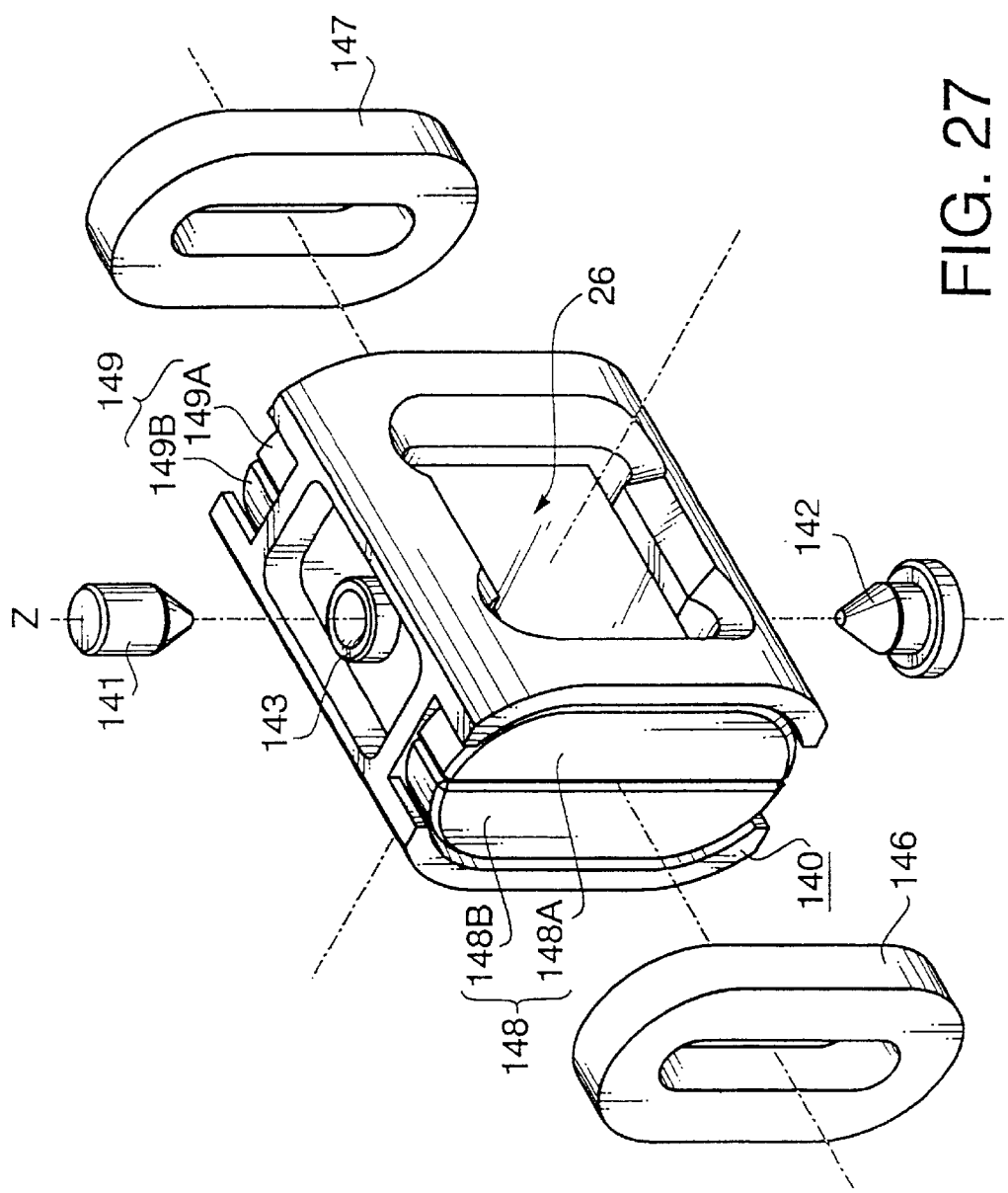
FIG. 27 is an exploded perspective view of a galvano mirror unit of the sixth embodiment.

FIG. 27 is an exploded perspective view of the galvano mirror unit according to the sixth embodiment. The galvano mirror 26 is mounted to a mirror holder 140 that is rotatable about the rotation axis A. The mirror holder 140 is pivoted by center pins 141 and 142 and receive members 143 and 144 (one receive member 144 is not shown) in a similar manner to the second embodiment (FIG. 13). The structure of the stator is the same as the stator 80 (FIG. 13) of the second embodiment. In the sixth embodiment, driving coils 146 and 147 are provided to the stator (not shown) and driving magnets 148 and 149 are provided to the mirror holder 140.

Figure 28:
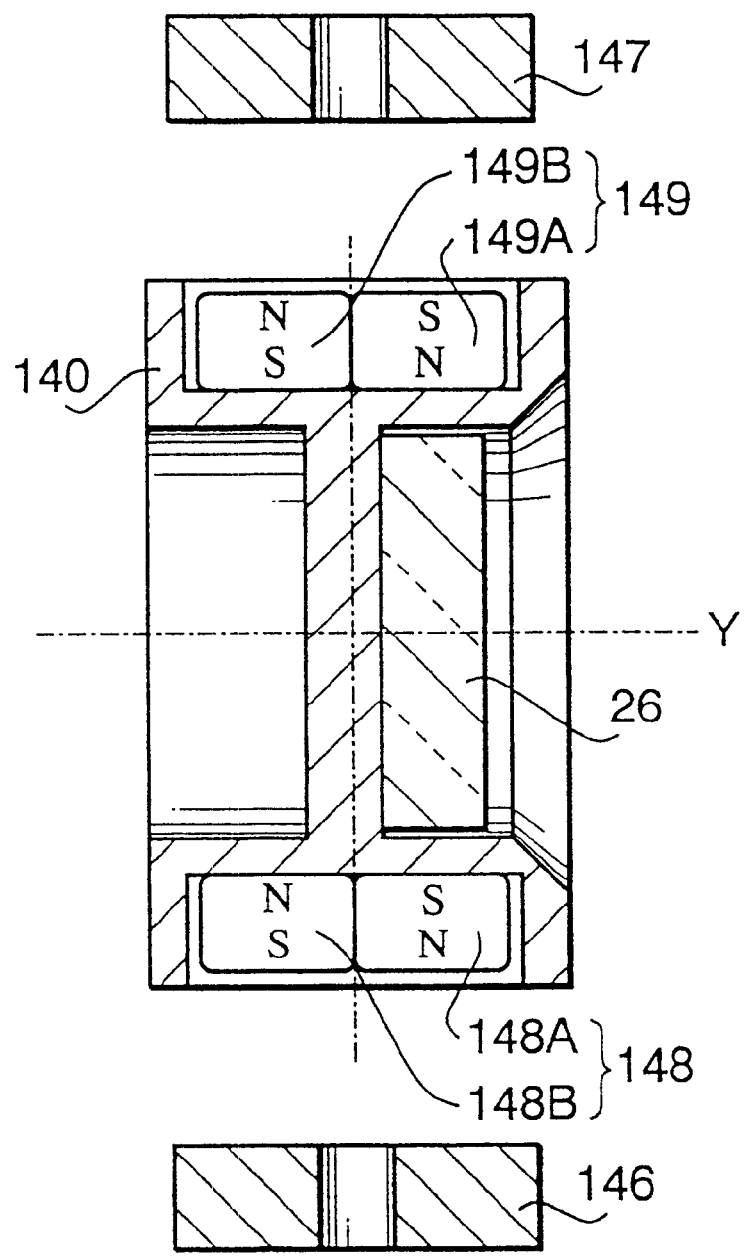
FIG. 28 is a horizontal view of the galvano mirror unit of FIG. 27.

FIG. 28 is a horizontal sectional view of the galvano mirror unit. The driving magnet 148 includes front and rear segments 148A and 148B. The segments 148A and 148B of the driving magnet 148 are magnetized in the opposite direction with each other. Particularly, the N-pole of the front segment 148A is faced with the driving coil 146, while the S-pole of the rear segment 148B is faced with the driving coil 146. Similarly, the driving magnet 149 includes front and rear segments 149A and 149B. The S-pole of the front segment 149A is faced with the driving coil 147, while the N-pole of the rear segment 149B is faced with the driving coil 147.

According to the sixth embodiment, since the driving coils 146 and 147 are not provided to the mirror holder 140 but provided to the stator (not shown), the arrangement for electrical connection (for supplying electricity to the driving coils 146 and 147) becomes simple.

Figure 29:
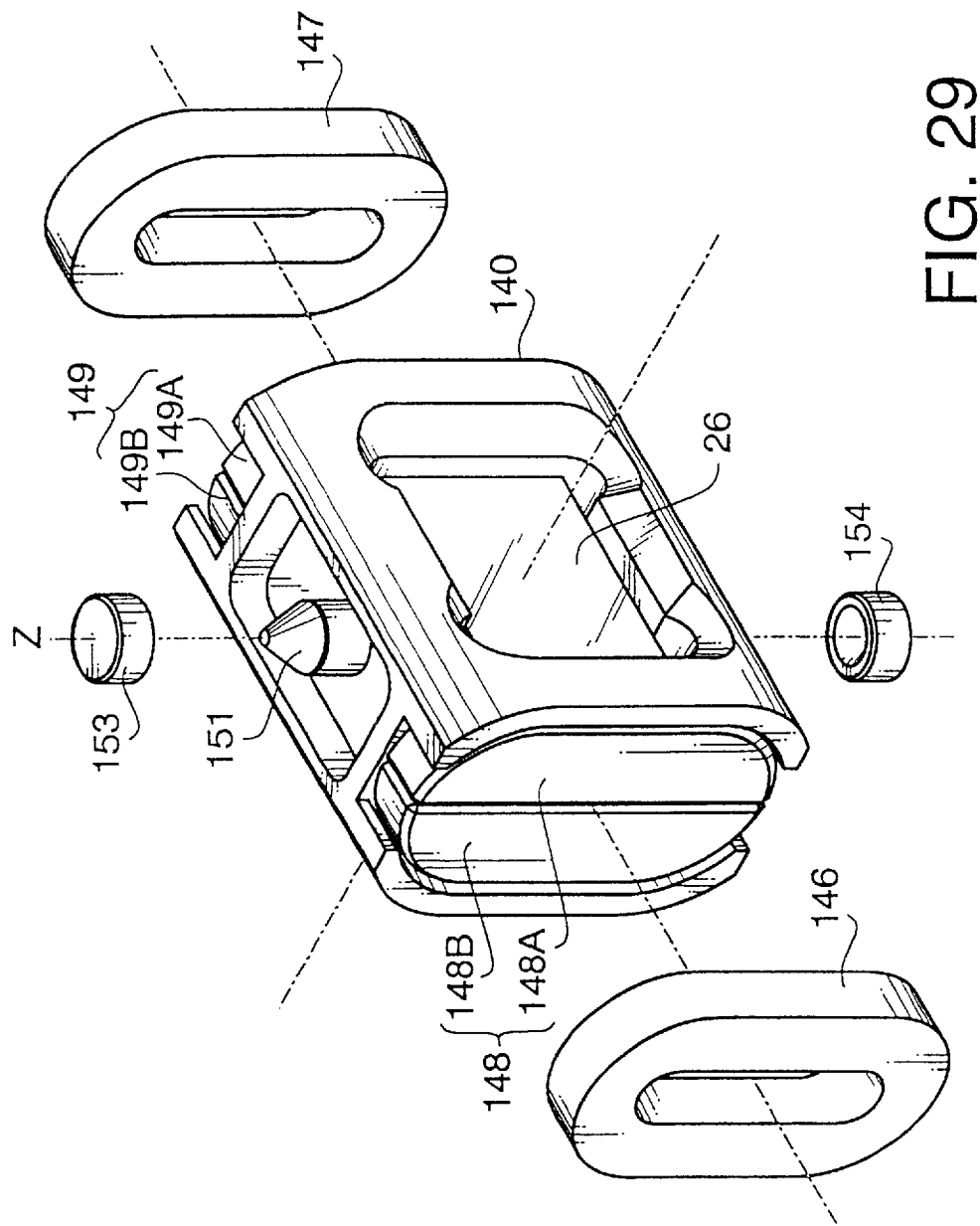
FIG. 29 is an exploded perspective view illustrating a modification of the sixth embodiment.

FIG. 29 shows a galvano mirror unit of the modification of the sixth embodiment. In this modification, the galvano mirror 26 is mounted to a mirror holder 140 that is rotatable about the rotation axis Z. The mirror holder 140 is pivoted by the center pins 151 and 152 (one center pin 152 is not shown) and the receive member 153 and 154 in a similar manner to the fifth embodiment (FIG. 25). The structure of the stator is the same as the stator 130 (FIG. 26) of the fifth embodiment. The center pins 151 and 152 are provided to the top and the bottom of the mirror holder 140, while receive member 153 and 154 are provided to the not shown stator. The center pin 151 (152) contacts the receive member 153 (154) in a similar manner to the fifth embodiment (FIG. 26).

With such an arrangement, like the sixth embodiment, the arrangement for electrical connection (for supplying electricity to the driving coils 146 and 147) becomes simple.

Seventh Embodiment

Figure 30:
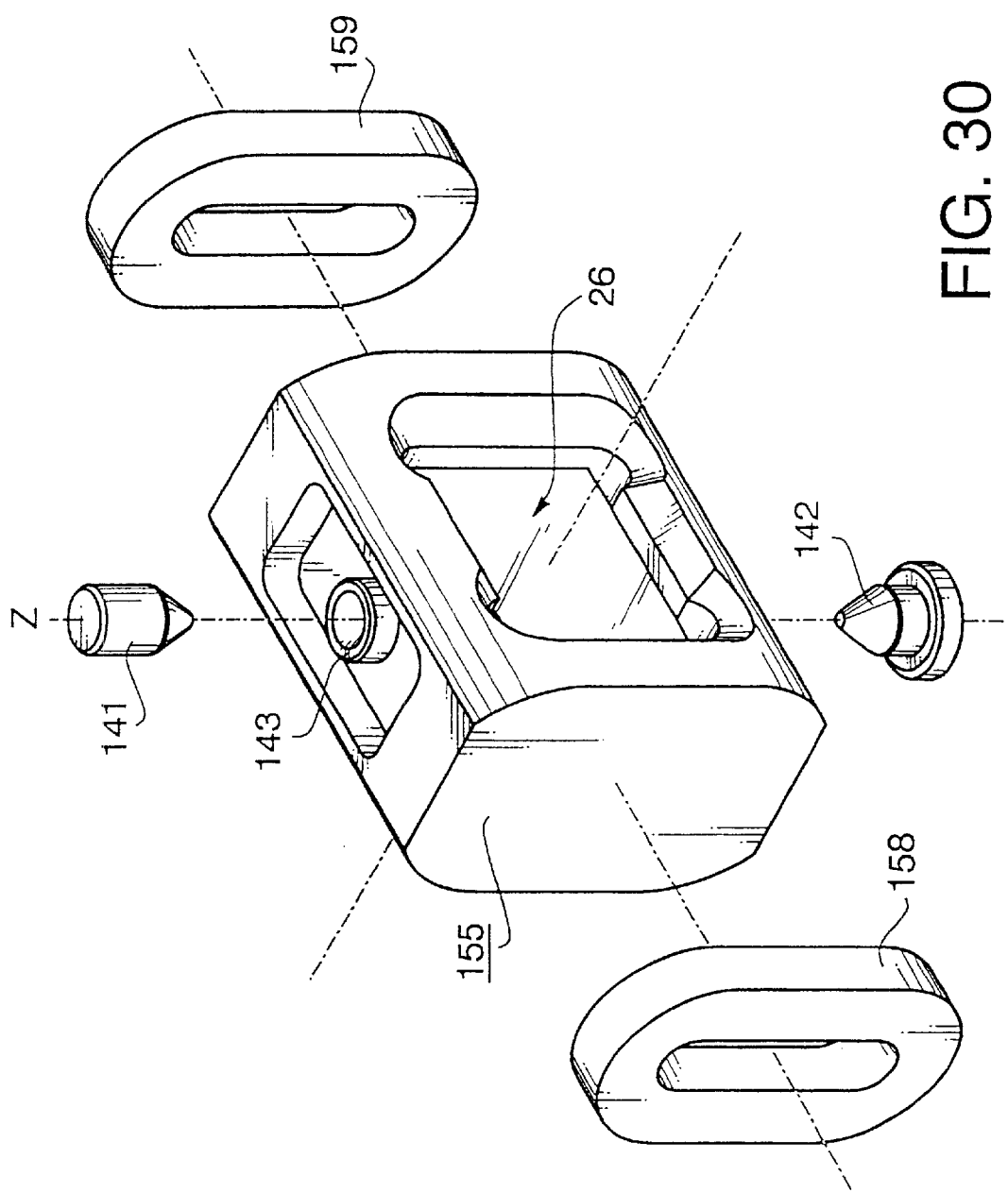
FIG. 30 is an exploded perspective view of a galvano mirror unit of the seventh embodiment.

FIG. 30 is a perspective view of a galvano mirror unit according to the seventh embodiment. The galvano mirror 26 is mounted to a mirror holder 155 that is made of a plastic magnet and is rotatable about the rotation axis Z. The mirror holder 155 is rotatably supported by a not shown stator via center pins 141 and 142 and receive members 143 and 144 (one receive member 144 is not shown) in a similar manner to the second embodiment (FIG. 13). The structure of the stator is same as that of the second embodiment (FIG. 13). A pair of driving coils 158 and 159 are provided to the stator so that the driving coils 158 and 159 are faced with the lateral side ends of the mirror holder 155.

Figure 31:
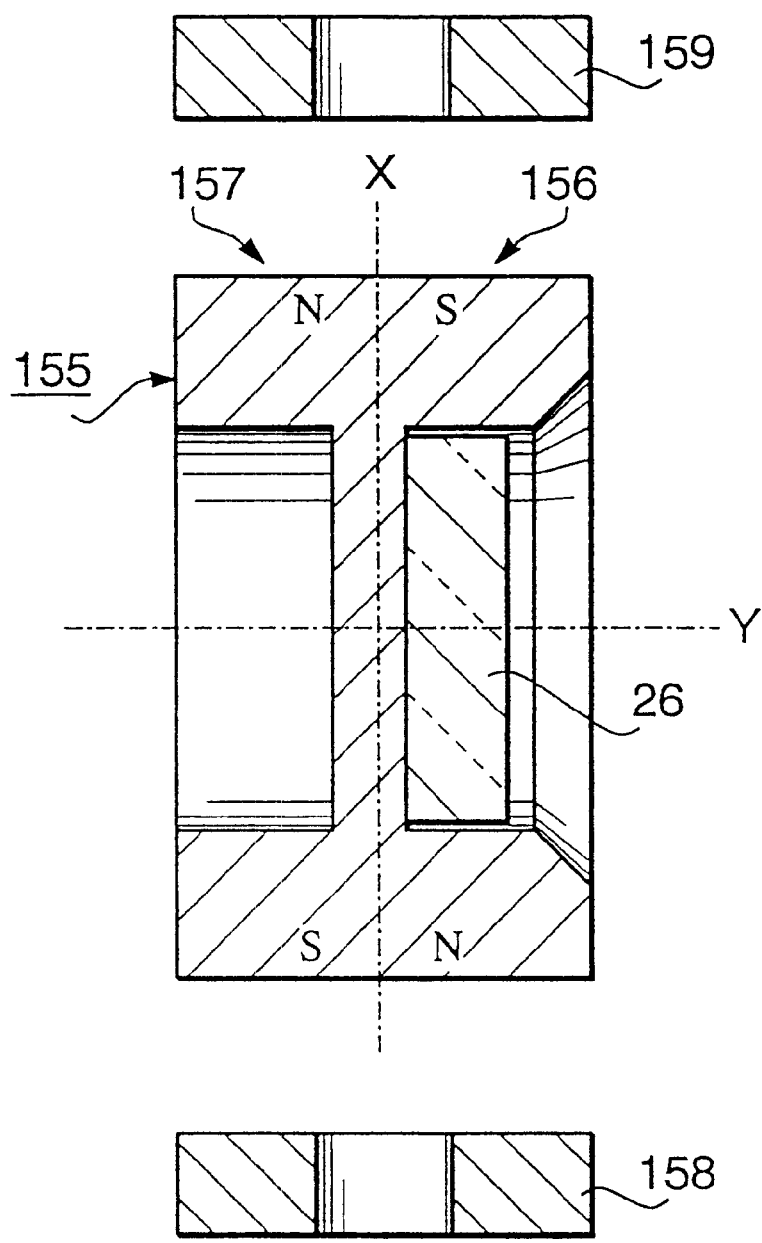
FIG. 31 is a horizontal sectional view of the galvano mirror unit of FIG. 30.

FIG. 31 is a horizontal sectional view of the galvano mirror unit 155. The mirror holder 155 includes front and rear sections 156 and 157. The sections 156 and 157 are magnetized in the opposite direction with each other. That is, N-pole of the front section 156 and S-pole of the rear section 157 are faced with the driving coil 158, while S-pole of the front section 156 and N-pole of the rear section 157 are faced with the driving coil 159. With this, when current flows in the driving coils 158 and 159, the mirror holder 155 is rotated by the electromagnetic induction generated by a magnetic field (caused by the mirror holder 155) and the current flow in driving coils 158 and 159.

According to the seventh embodiment, since it is not necessary to provide separate magnets to the mirror holder 155, the structure of the mirror holder 155 can be simplified.

Eighth Embodiment

Figure 32:
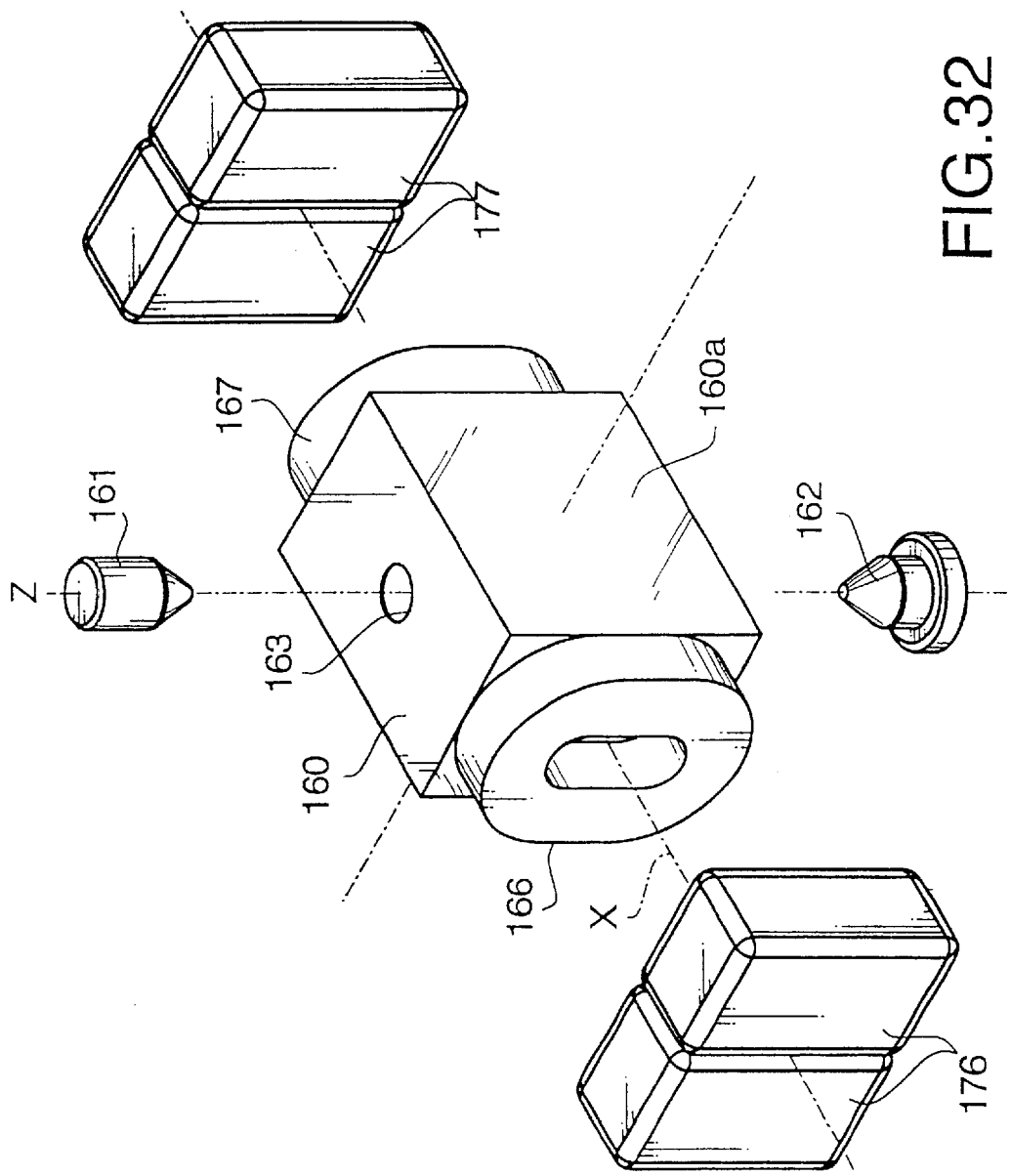
FIG. 32 is an exploded perspective view of a galvano mirror unit of the eighth embodiment.
Figure 33:
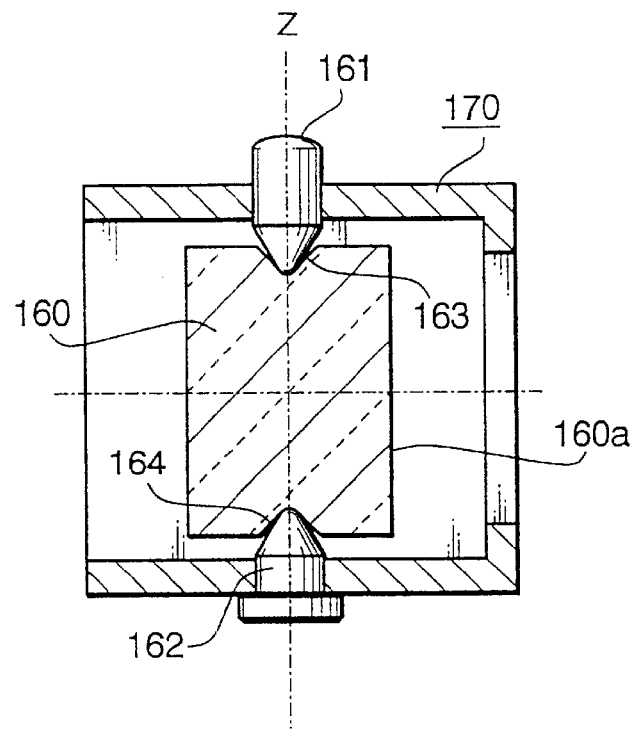
FIG. 33 is a longitudinal sectional view of a galvano mirror unit of FIG. 32.
Figure 34:
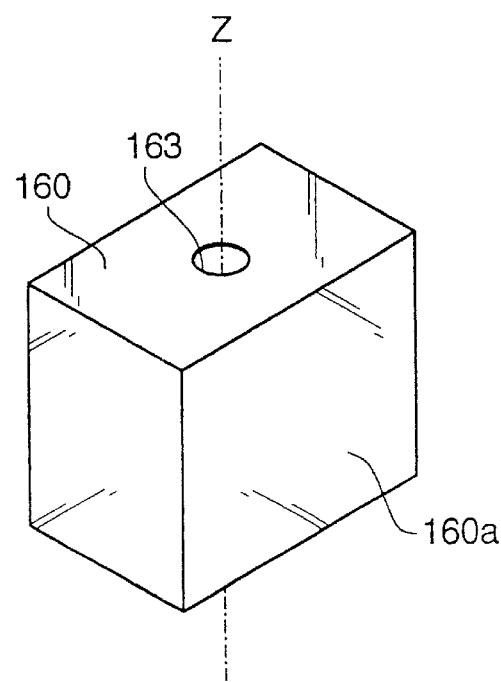
FIG. 34 is a perspective view of a galvano mirror of FIG. 32.

FIGS. 32 and 33 are a perspective view and a sectional view of a galvano mirror unit according to the eighth embodiment. FIG. 34 is a perspective view of a galvano mirror of the eighth embodiment. As shown in FIG. 34, in the eighth embodiment, a galvano mirror 160 is cubic-shaped, one surface thereof being a mirror surface 160A. As shown in FIG. 33, center pins 161 and 162 are provided to the stator 170 so that the galvano mirror 160 is sandwiched between the center pins 161 and 162. The center pins 161 and 162 are aligned on a line defining the rotation axis Z. As shown in FIG. 33, the center pins 161 and 162 are received by conical recesses 163 and 164 formed at the top and the bottom of the galvano mirror 160. Each of the center pins 161 and 162 has a conical portion with rounded apex. The rounded apexes of the center pins 161 and 162 respectively contact the conical surfaces of the recesses 163 and 164.

As shown in FIG. 32, driving magnets 176 and 177 are provided to the stator 170 (FIG. 33). Driving coils 166 and 167 are provided to the lateral side ends of the galvano mirror 160 so that the driving coils 166 and 167 are faced with the driving magnets 176 and 177. With this, when current flows in the driving coils 166 and 167, the galvano mirror 160 is rotated by the electromagnetic induction generated by a magnetic field caused by the driving magnets 176 and 177 and the current flow in driving coils 166 and 167.

According to the eighth embodiment, since it is not necessary to provide a mirror holder for holding the galvano mirror, the structure of the galvano mirror unit can be simplified.

Figure 35:
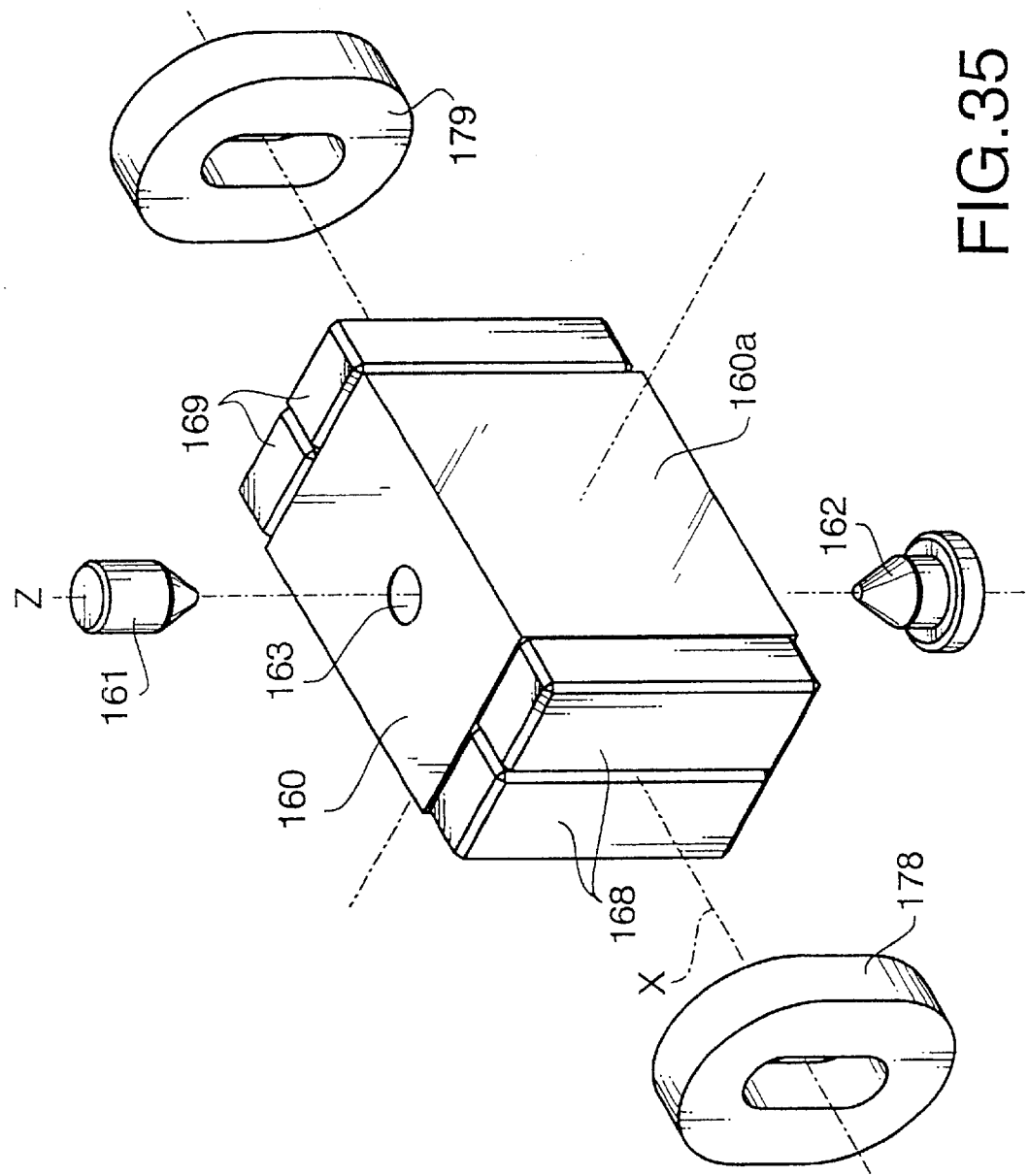
FIG. 35 is an exploded perspective view of a galvano mirror unit according to the modification of the eighth embodiment.

FIG. 35 is a galvano mirror unit of the modification of the eighth embodiment. In this modification, driving magnets 168 and 169 are provided to the lateral side ends of the galvano mirror 160. Driving coils 178 and 179 are provided to the stator (not shown) so that the driving coils 178 and 179 are faced with the driving magnets 168 and 169.

With such an arrangement, since the driving coils 178 and 179 are not provided to the galvano mirror 160 but provided to the stator, the arrangement for electrical connection (for supplying electricity to the 178 and 179) becomes simple. Accordingly, the structure of the galvano mirror unit can be further simplified.

Ninth Embodiment

Figure 36:
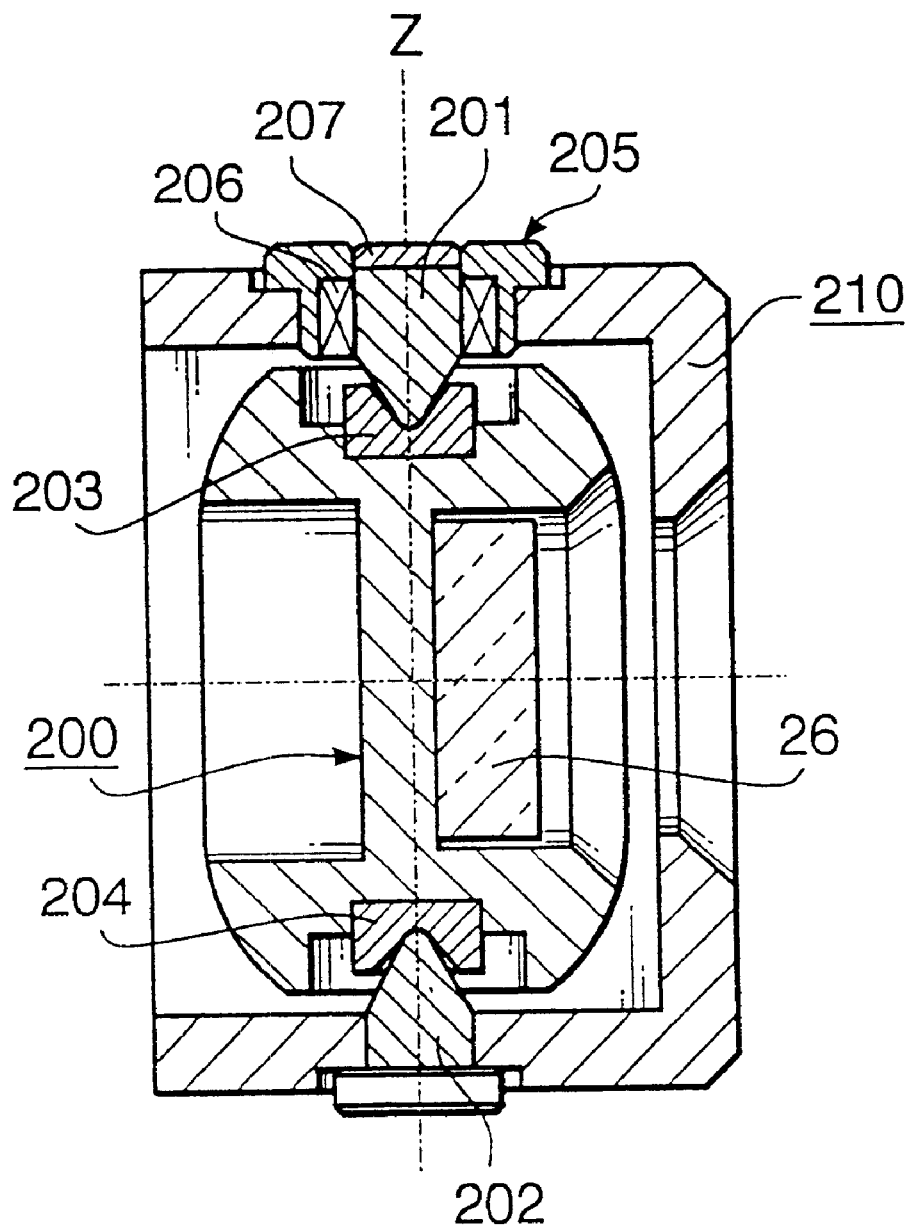
FIG. 36 is a longitudinal sectional view of the galvano mirror unit of FIG. 35.

FIG. 36 is a sectional view of a galvano mirror unit of according to the ninth embodiment. The galvano mirror 26 is provided to a mirror holder 200 that is rotatably supported by a stator 210. Center pins 201 and 202 are provided so that the mirror holder 200 is sandwiched by the center pins 201 and 202. The center pins 201 and 202 are aligned on a line defining the rotation axis Z. The center pins 201 and 202 are received by receive members 203 and 204 to the mirror holder 200. The upper center pin 201 is inserted into a bushing 205 provided to the top of the stator 210 so that the upper center pin 201 is axially movable in the busing 205. The bushing 205 is provided with a biasing magnet 206 at the inner surface thereof.

Figure 37:
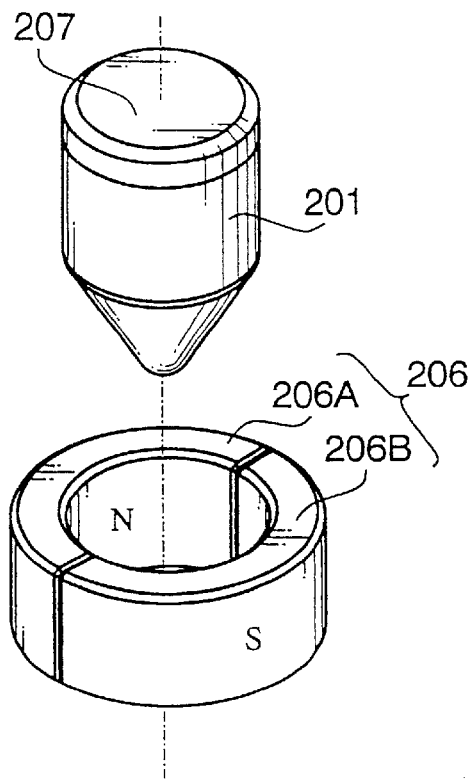
FIG. 37 is a perspective view of a center pin and magnet ring of the galvano mirror unit of FIG. 35.
Figure 38:
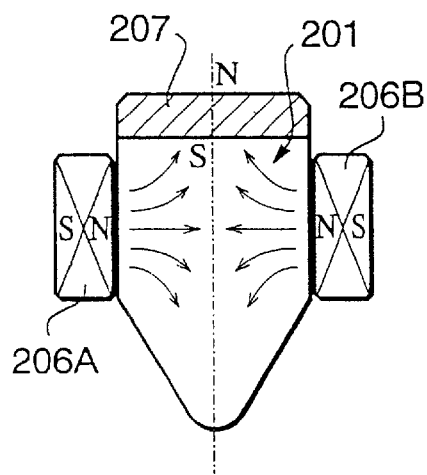
FIG. 38 is a longitudinal sectional view of the center pin and the magnet ring of FIG. 37.

FIGS. 37 and 38 are a perspective view and a sectional view of the upper center pin 201 and the biasing magnet 206. The biasing magnet 206 has a shape of a ring. The upper center pin 201 is made of nonmagnetic material such as nonmagnetic stainless steel or nonmagnetic ceramics. Further, the upper center pin 201 is provided with a magnet chip 207 at the top portion thereof. The magnet chip 207 is magnetized so that the top surface is N-pole and the bottom surface is S-pole. The biasing magnet 206 includes two half rings 206A and 206B. Each of the half rings 206A and 206B is magnetized so that inner surface thereof is N-pole and the outer surface thereof is S-pole. As shown in FIG. 38, the S-pole of the magnet chip 207 is attracted by the N-pole of inner surface of the biasing magnet 206. With this, the upper center pin 201 is urged downward. Thus, the backlash between the center pin 201 (202) and the receive member 203 (204) can be eliminated.

In the ninth embodiment, an arrangement (driving coils and driving magnets) for actuating the galvano mirror 26 is the same as the first embodiment (FIG. 7).

According to the ninth embodiment, since the biasing force can be obtained by the biasing magnet 206 and the magnet chip 207, it is not necessary to provide a separate spring member for biasing the upper center pin 201. Thus, the structure of the galvano mirror unit can be simplified. Alternatively, the magnet chip 207 can be made of ferromagnetic material.

Figure 39:
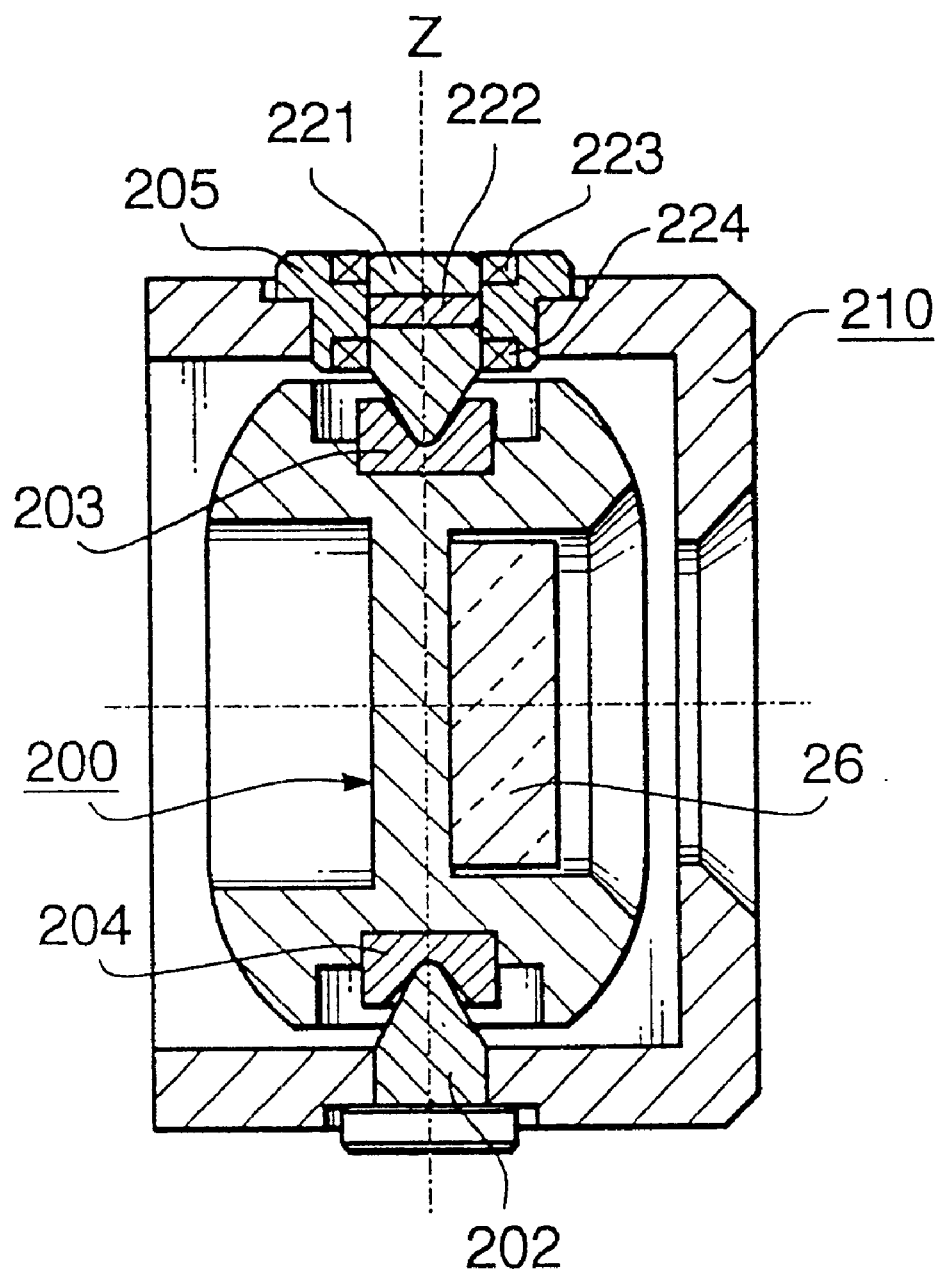
FIG. 39 is a longitudinal sectional view showing the modification of the galvano mirror unit of the ninth embodiment.

FIG. 39 shows the modification of the ninth embodiment. An upper center pin 221 of this modification is provided with a magnet chip 222 at the axially intermediate portion thereof. Further, two biasing magnets 223 and 224 are provided to the bushing 205 so that the magnet chip 222 is positioned between the biasing magnets 223 and 224.

Figure 40:
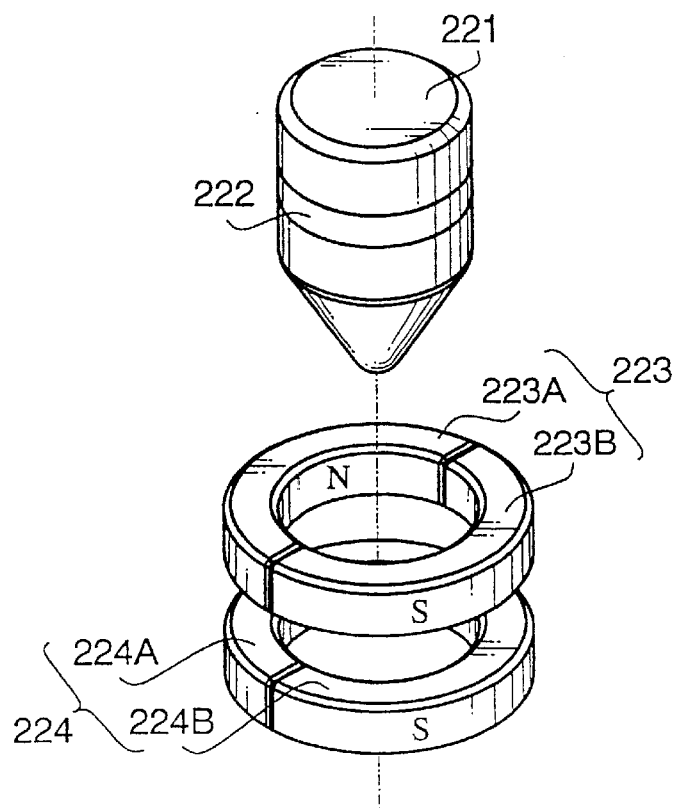
FIG. 40 is a perspective view of a center pin and magnet rings of the galvano mirror unit of FIG. 39.
Figure 41:
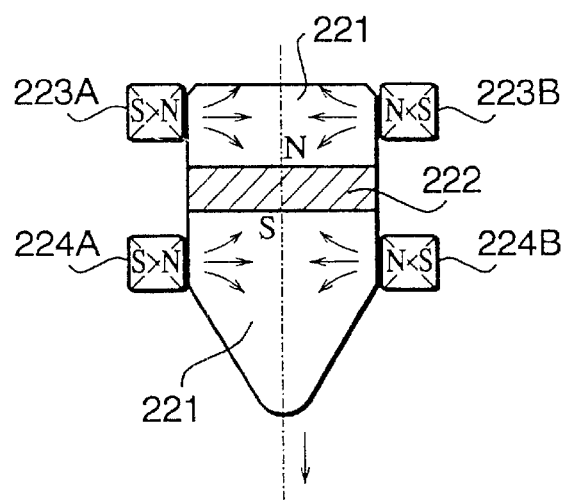
FIG. 41 is a longitudinal sectional view of center pin and magnet rings of FIG. 40.

FIGS. 40 and 41 are a perspective view and a sectional view of the upper center pin 221 and the biasing magnets 223 and 224. As shown in FIG. 40, the upper biasing magnet 223 has a shape of a ring and includes two half rings 223A and 223B. Each of half rings 223A and 223B is magnetized so that the inner surface thereof is N-pole and the outer surface thereof is S-pole. The structure of the lower biasing magnet 224 is the same as the biasing magnet 223. As shown in FIG. 41, the magnet chip 222 is magnetized so that the top surface thereof is N-pole and the bottom surface thereof is S-pole. With this, the magnet chip 222 is repulsed by the upper biasing magnet 223 and attracted by the lower biasing magnet 224. That is, the upper center pin 221 is urged downward. Thus, the backlash between the center pin 221 (202) and the receive member 203 (204) can be eliminated.

With such an arrangement, since the biasing force can be obtained by the biasing magnets 223 and 224 and the disk shaped magnet 222, a relatively large biasing force can be obtained. Alternatively, the magnet chip 222 can be made of ferromagnetic material.

Tenth Embodiment

Figure 42:
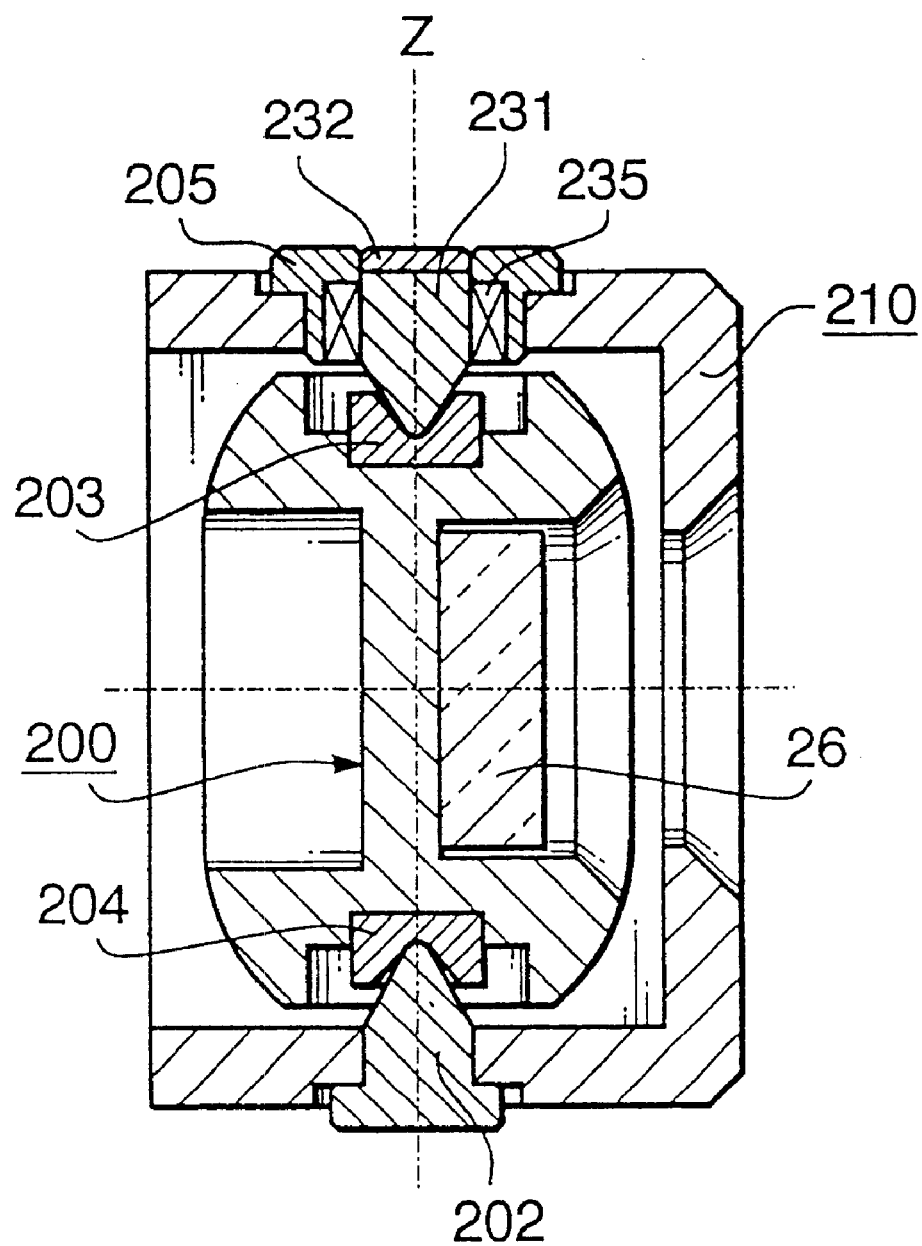
FIG. 42 is a longitudinal sectional view of a galvano mirror unit of the tenth embodiment.

FIG. 42 is a sectional view of a galvano mirror unit according to the tenth embodiment. In the tenth embodiment, a biasing coil 235 is employed for biasing a upper center pin 231 downward (instead of the biasing magnet 206 of the ninth embodiment). The mirror holder 200 and the stator 210 are the same as the ninth embodiment (FIG. 36). The mirror holder 200 is rotatably supported by the stator 210 via the center pins 231 and 202 and the receive member 203 and 204. The upper center pin 231 is supported by the bushing 205 mounted to the top of the stator 210, so that the upper center pin 231 is axially movable therein.

Figure 43:
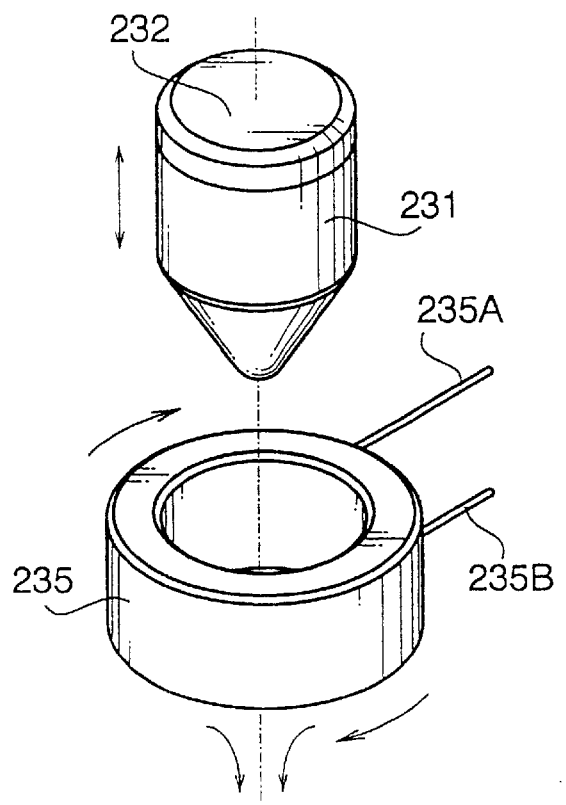
FIGS. 43 and 44 are a perspective view and a longitudinal sectional view of a center pin and a coil of the galvano mirror unit of FIG. 42.
Figure 44:
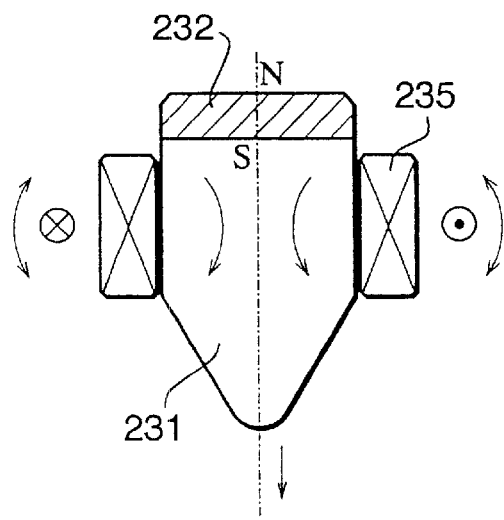

FIGS. 43 and 44 are a perspective view and a sectional view of the upper center pin 231 and the biasing coil 235. The upper center pin 231 is made from nonmagnetic material such as nonmagnetic stainless steel or nonmagnetic ceramics. Further, the upper center pin 231 is provided with a magnet chip 232 at the top portion thereof. The magnet chip 232 is magnetized so that the top surface thereof is N-pole and the bottom surface thereof is S-pole. The biasing coil 235 is provided to the bushing 205 (FIG. 42) so that the biasing coil 235 surrounds the upper center pin 231. The biasing coil 235 has lead wires 235A and 235B electrically connected to a not shown circuit. As shown in FIG. 44, when current flows in the biasing coil 235, a magnetic field (directed downward) is generated in the upper center pin 231. Due to the magnetic field directed downward, the S-pole of the magnet chip 232 is attracted downward. That is, the upper center pin 231 is biased downward. Therefore, the backlash between the center pin 231 (202) and the receive member 203 (204) can be eliminated.

In the tenth embodiment, an arrangement (driving coils and driving magnets) for actuating the galvano mirror 26 is the same as the first embodiment (FIG. 7).

According to the tenth embodiment, since the biasing force can be obtained by the biasing coil 235 and the upper center pin 231, it is not necessary to provide a separate spring member for biasing the upper center pin 231. Thus, the structure of the galvano mirror unit can be simplified. Further, since the biasing force can be adjusted by varying the current flow in the biasing coil 235, the friction produced when the mirror holder 200 is rotated can be adjusted after assembling the galvano motor unit.

Figure 45:
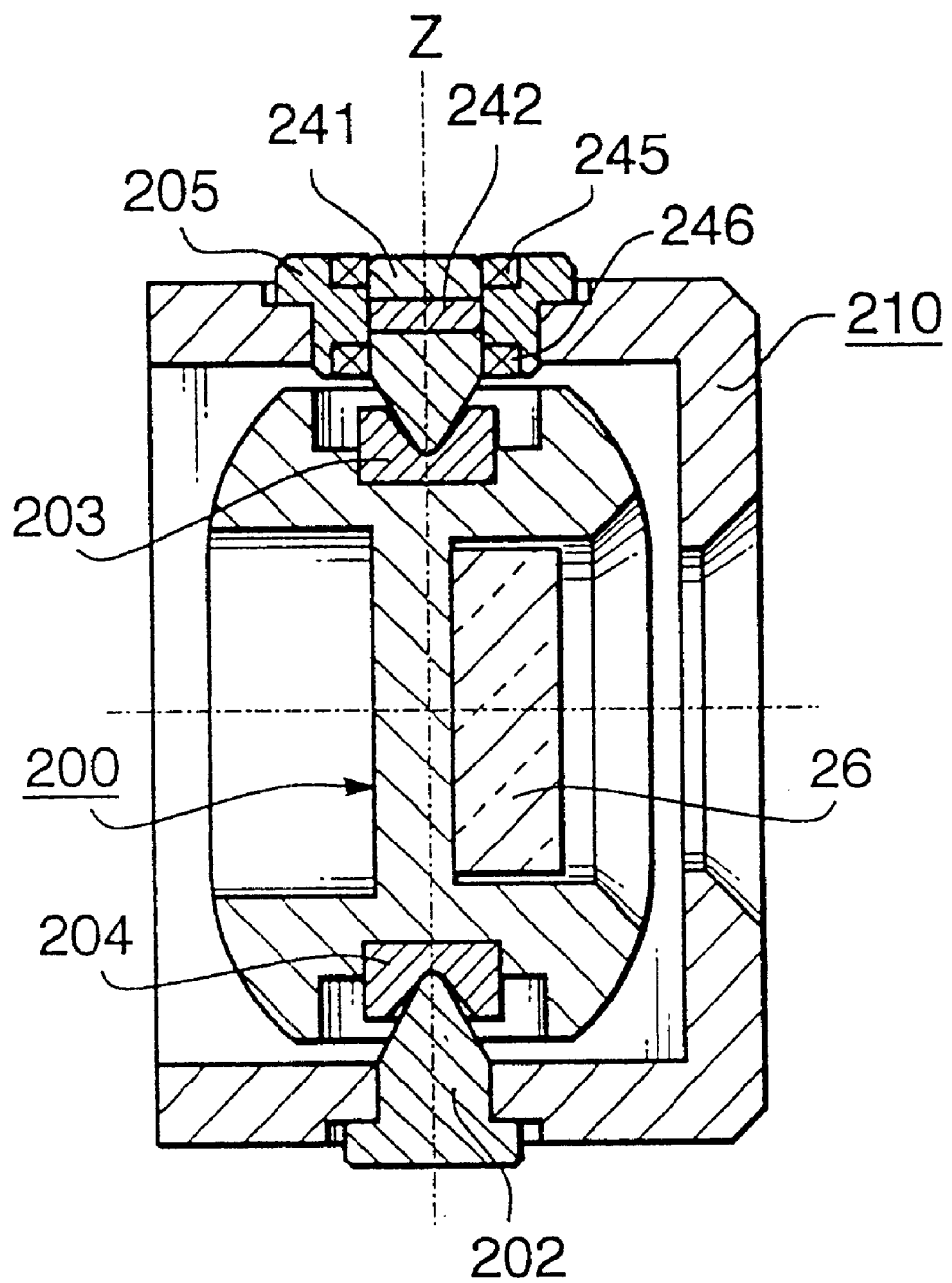
FIG. 45 is a longitudinal sectional view showing the modification of the galvano mirror unit of the tenth embodiment.

FIG. 45 shows the modification of the tenth embodiment. An upper center pin 241 of this modification is provided with a magnet chip 242 at the axially intermediate portion thereof. Further, two biasing coils 245 and 246 are provided to the bushing 205 so that the magnet chip 242 is positioned between the biasing coils 245 and 246. The magnet chip 242 is magnetized so that the top surface thereof is N-pole and the bottom surface thereof is S-pole.

Figure 46:
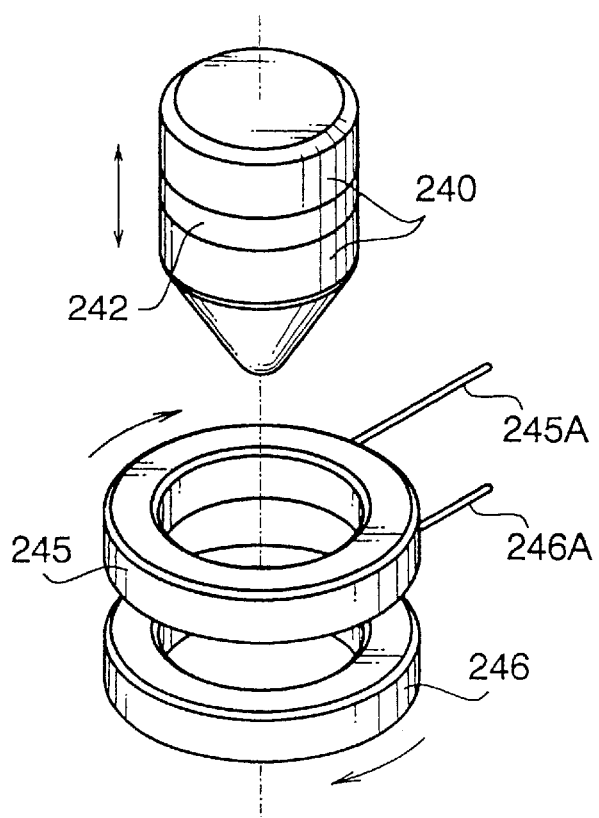
FIG. 46 is a perspective view of center pin and coils of the galvano mirror unit of FIG. 45.
Figure 47:
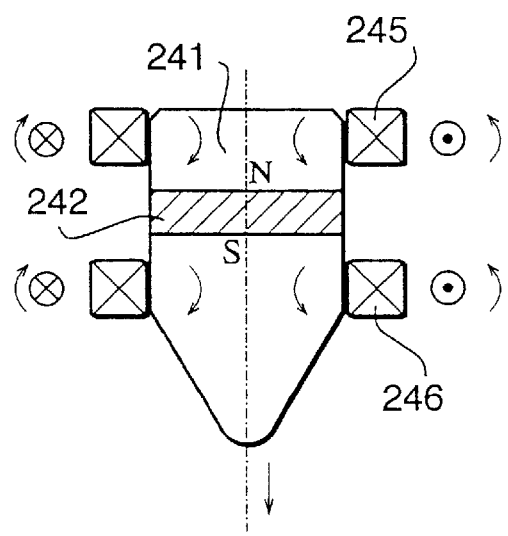
FIG. 47 is a longitudinal sectional view of center pin an coils of FIG. 46.

FIGS. 46 and 47 are a perspective view and a sectional view of the upper center pin 241 and the biasing coils 245 and 246. The biasing coils 245 and 246 have lead wires 245A and 246A electrically connected to a not shown circuit. When current flows in the biasing coils 245 and 246 in the same direction, a magnetic field (directed downward) is generated in the upper center pin 241. Due to the magnetic field directed downward, the S-pole of the magnet chip 242 is repulsed by the upper magnetic field caused by the current in the biasing coil 245 and is attracted by the lower magnetic field caused by the current in the biasing coil 246. That is, the upper center pin 241 is urged downward. Thus, that the backlash between the center pin 241 (202) and the receive member 203 (204) can be eliminated.

With such an arrangement, since the biasing force can be obtained by the biasing coils 245 and 246 and the upper center pin 241, it is not necessary to provide a separate spring member. Thus, the structure of the galvano mirror unit can be simplified. Further, the friction produced when the mirror holder 200 is rotated can be adjusted after assembling the galvano motor unit.

Eleventh Embodiment

Figure 48:
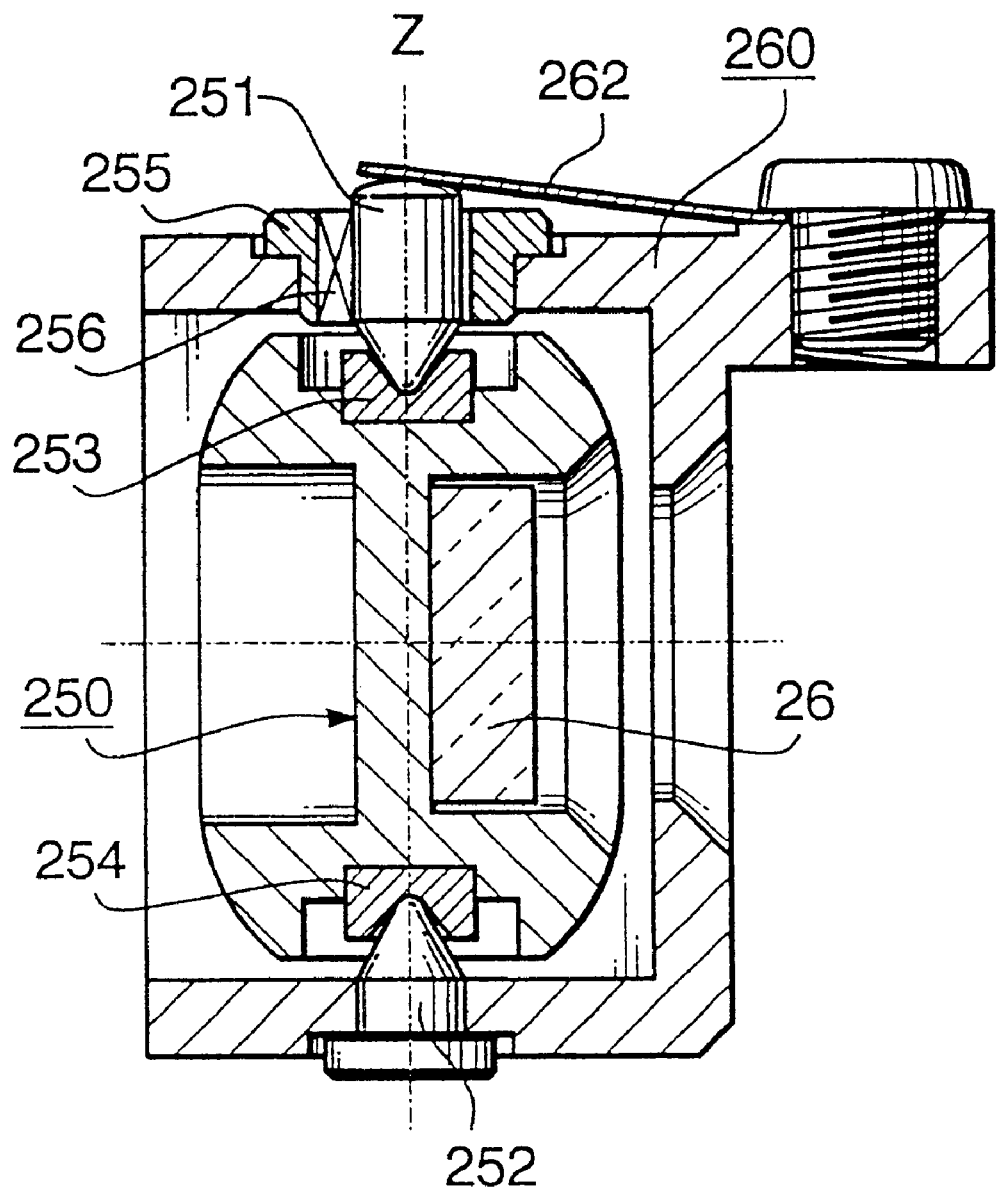
FIG. 48 is a longitudinal sectional view of a galvano mirror unit of the eleventh embodiment.

FIG. 48 is a sectional view of the galvano mirror unit of the eleventh embodiment. The galvano mirror 26 is mounted to a mirror holder 250 that is rotatably supported by a stator 260. Center pins 251 and 252 are provided to the stator 260 so that the center pins 251 and 252 vertically sandwiches the mirror holder 250. The center pins 251 and 252 are aligned on a line defining the rotation axis Z. The center pins 251 and 252 are received by receive members 253 and 254 provided at the top and the bottom of the mirror holder 250. The upper center pin 251 is inserted into a bushing 255 provided to the top of the stator 250 so that the upper center pin 251 is axially movable in the busing 255. Further, a plate spring 262 is provided to the stator 260, which urges the upper center pin 251 downward. One end of the plate spring 262 is fixed to the front end of the stator 260, while the other end of the plate spring 262 contacts the top portion of the upper center pin 251. With this, the upper center pin 251 is rotatably supported by the stator 260 via the center pins 251 and 252 and the receive member 253 and 254.

Figure 49:
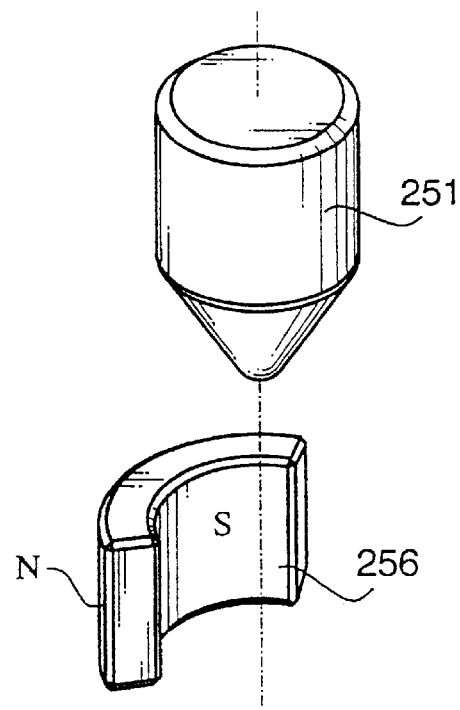
FIG. 49 is a perspective view of a center pin and a magnet of the galvano mirror unit of FIG. 48.
Figure 50:
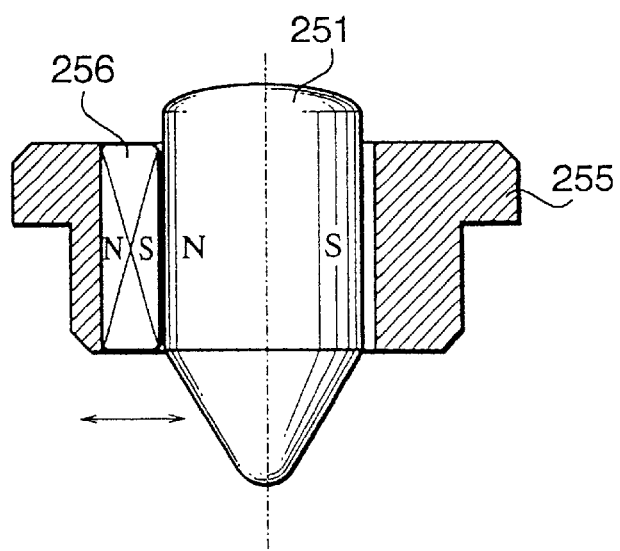
FIG. 50 is a longitudinal sectional view of the center pin and the magnet of FIG. 49.

In order to prevent the deviation of the inclination of the upper center pin 251 (in the bushing 255), an offset magnet 256 is provided to the rear side of the bushing 255. FIGS. 49 and 50 are a perspective view and a sectional view of the upper center pin 251 and the offset magnet 256. The offset magnet 256 is a magnet having a shape of an arc. The upper center pin 251 is made of ferromagnetic material (such as ferromagnetic stainless steel). Due to the offset magnet 256, the upper center pin 251 is attract rearward. With such an arrangement, since the center pin 251 is biased downward by the plate spring 262, the backlash between the center pin 251 (252) and the receive member 253 (254) can be eliminated. Further, since the upper center pin 251 is urged rearward by the offset magnet 256, so that direction of the inclination of the upper center pin 251 (in the bushing 255) is determined.

In the eleventh embodiment, an arrangement (driving coils and driving magnets) for actuating the galvano mirror 26 is the same as the first embodiment (FIG. 7).

According to the eleventh embodiment, since the offset magnet 256 and the plate spring 262 urge the upper center pin 251 rearward, the deviation of the inclination of the upper center pin 251 is prevented. Thus, the rotation of the galvano mirror 26 is stabilized.

Figure 51:
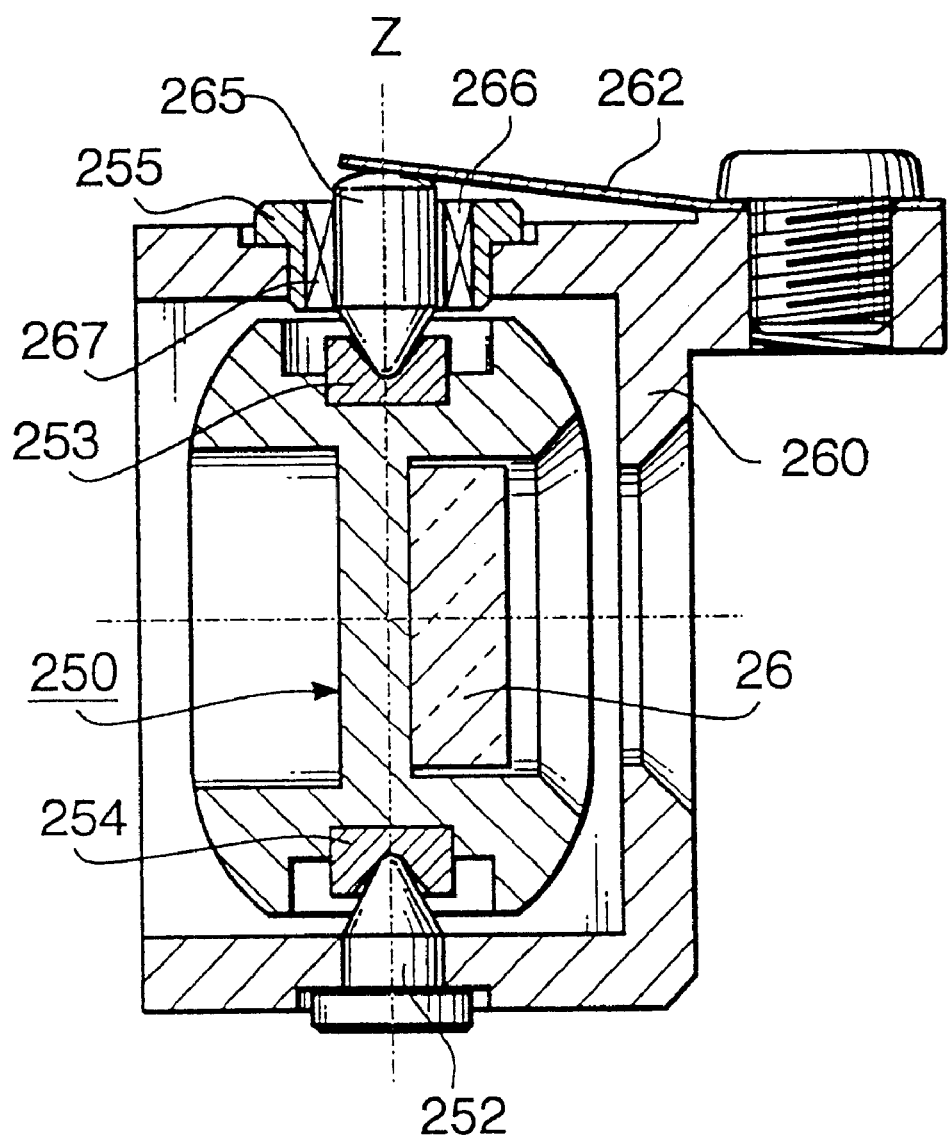
FIG. 51 is a longitudinal sectional view of a galvano mirror unit according to a modification of the eleventh embodiment.

FIG. 51 is a sectional view of a galvano mirror unit according to a modification of the eleventh embodiment. In this modification, an upper center pin 265 is made of magnet. Further, front and rear offset magnets 266 and 267 are provided at front and rear sides of the bushing 255.

Figure 52:
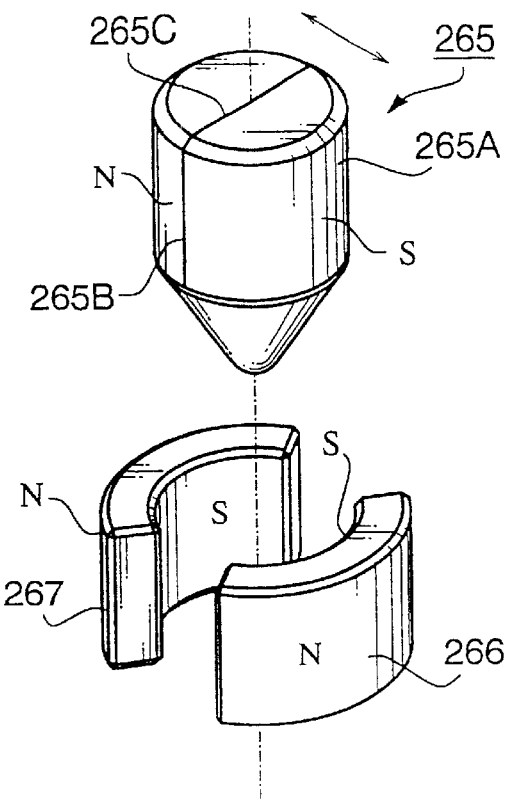
FIG. 52 is a perspective view of magnets and a center pin of the galvano mirror unit of FIG. 51.
Figure 53:
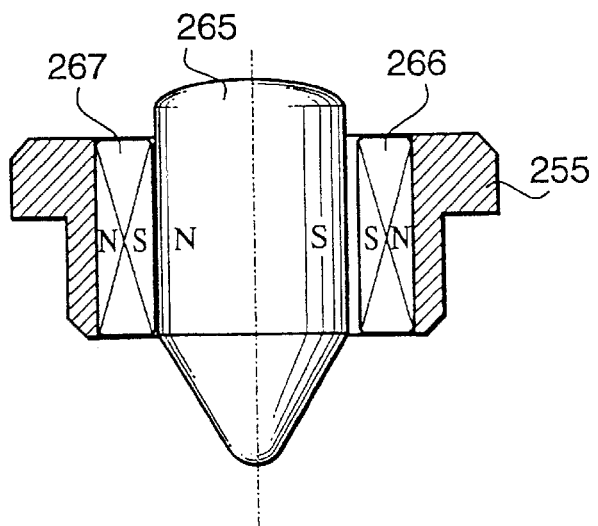
FIG. 53 is a longitudinal sectional view of the magnets and the center pin of FIG. 52.

FIGS. 52 and 53 are a perspective view and a sectional view of the offset magnets 266 and 267 and the upper center pin 265. The upper center pin 265 includes front and rear sections 265A and 265B divided by a plane 265C including the axis of the upper center pin 265. The front and rear sections 265A and 265B are S-pole and N-pole. Each of the front and rear offset magnets 266 and 267 has a shape of an arc. Further, each of the front and rear offset magnets 266 and 267 is magnetized so that the inner surface thereof is S-pole and the outer surface thereof is N-pole. As shown in FIG. 53, the N-pole of the upper center pin 265 is faced with the S-pole of the rear offset magnet 267, while the S-pole of the upper center pin 265 is faced with the S-pole of the front offset magnet 266. Accordingly, the upper center pin 265 is repulsed by the front offset magnet 267 and attracted by the rear offset magnet 266, so that the upper center pin 265 is urged rearward. Thus, the deviation of the inclination of the mirror holder 100 is prevented, so that the rotation of the galvano mirror 26 is stabilized.

Twelfth Embodiment

Figure 54:
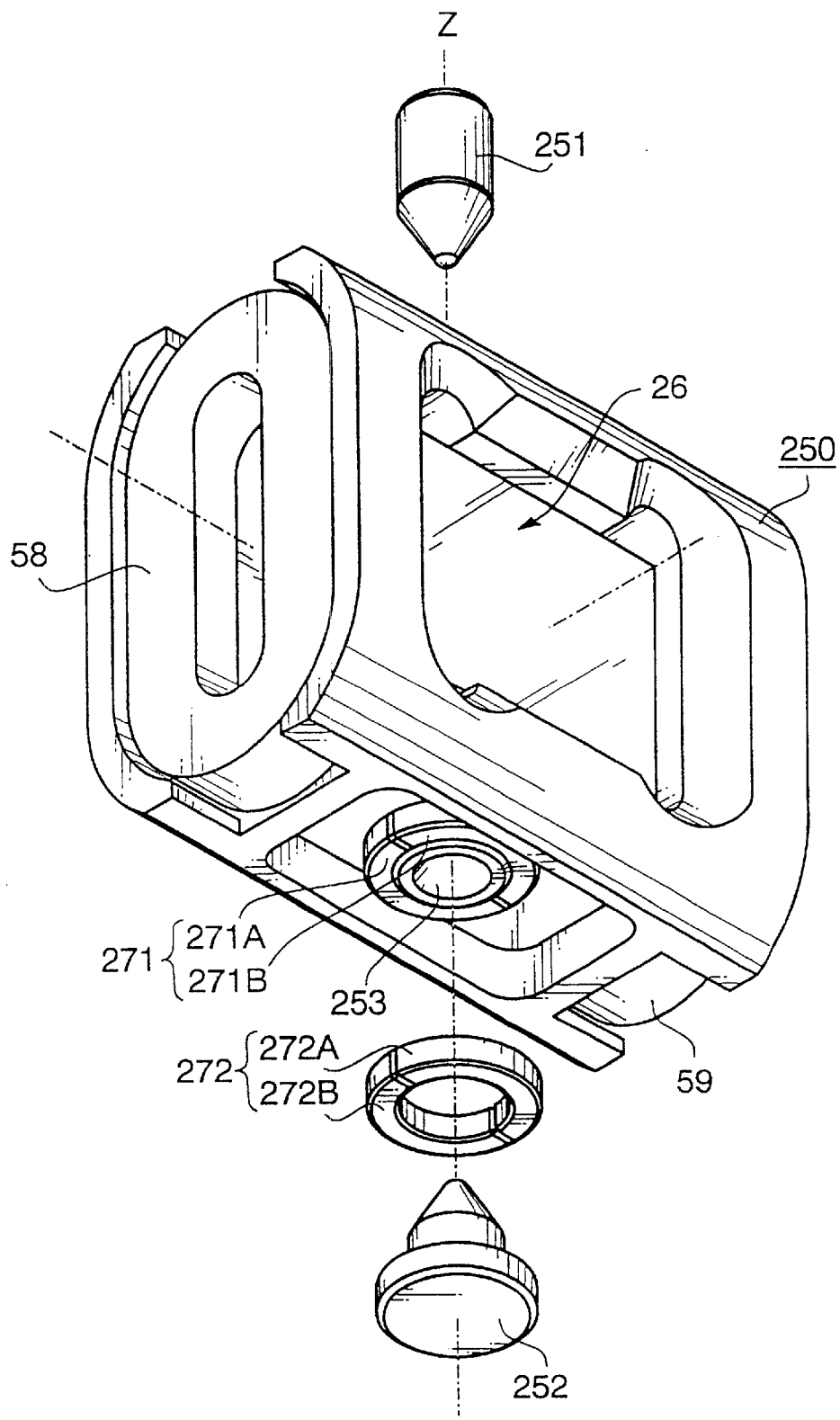
FIG. 54 is a perspective view of a galvano mirror unit of twelfth embodiment.
Figure 55:
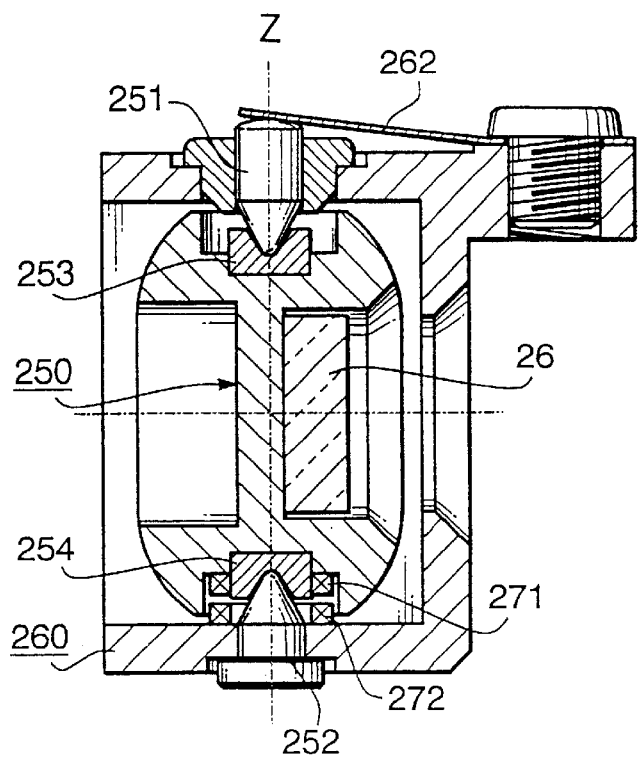
FIG. 55 is a longitudinal sectional view of the galvano mirror unit of FIG. 54.

FIGS. 54 and 55 are a perspective view and a sectional view of a galvano mirror unit of the twelfth embodiment. In the twelfth embodiment, the galvano mirror 26 is mounted to a mirror holder 250. The mirror holder 250 is rotatably supported by a stator 260 via the center pins 251 and 252 and the receive members 253 and 254 that are same as the eleventh embodiment (FIG. 48).

Figure 56:
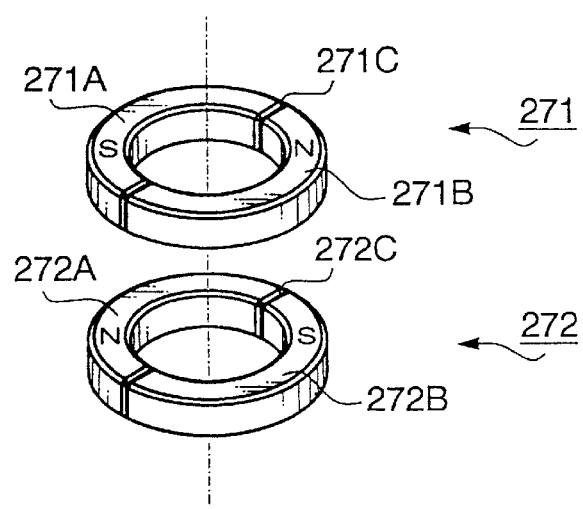
FIG. 56 is a perspective view of magnet rings of FIG. 55.

In order to urge the mirror holder 250 to its neutral position, two positioning magnets 271 and 272 are respectively provided around the lower receive member 254 and the lower center pin 252. Each of the positioning magnets 271 and 272 has a shape of a ring. The upper positioning magnet 271 is provided to the mirror holder 250 and the lower positioning magnet 272 is provided to the stator 260 so that the positioning magnets 271 and 272 are faced with each other. FIG. 56 is a perspective view of the positioning magnets 271 and 272. The upper positioning magnet 271 includes two front and rear sections 271A and 271B which are S-pole and N-pole, respectively. The lower positioning magnet 272 includes front and rear sections 272A and 272B which are N-pole and S-pole, respectively.

With this, the rotational neutral position of the mirror holder 250 is obtained when the N-pole of the upper positioning magnet 271 is faced with the S-pole of the lower positioning magnet 272 (that is, the S-pole of the upper positioning magnet 271 is faced with the N-pole of the lower positioning magnet 272). When the mirror holder 250 rotates from the neutral position, the N-pole of the upper positioning magnet 271 is partially faced with the N-pole of the lower positioning magnet 272 (that is, the S-pole of the upper positioning magnet 271 is partially faced with the S-pole of the lower positioning magnet 272). It causes a repulsive force that urges the mirror holder 250 to the neutral position.

In the twelfth embodiment, an arrangement (driving coils and driving magnets) for actuating the galvano mirror 26 is the same as the first embodiment (FIG. 7).

According to the twelfth embodiment, the galvano mirror is urged to its rotational neutral position without providing a separate spring member.

Thirteenth Embodiment

Figure 57:
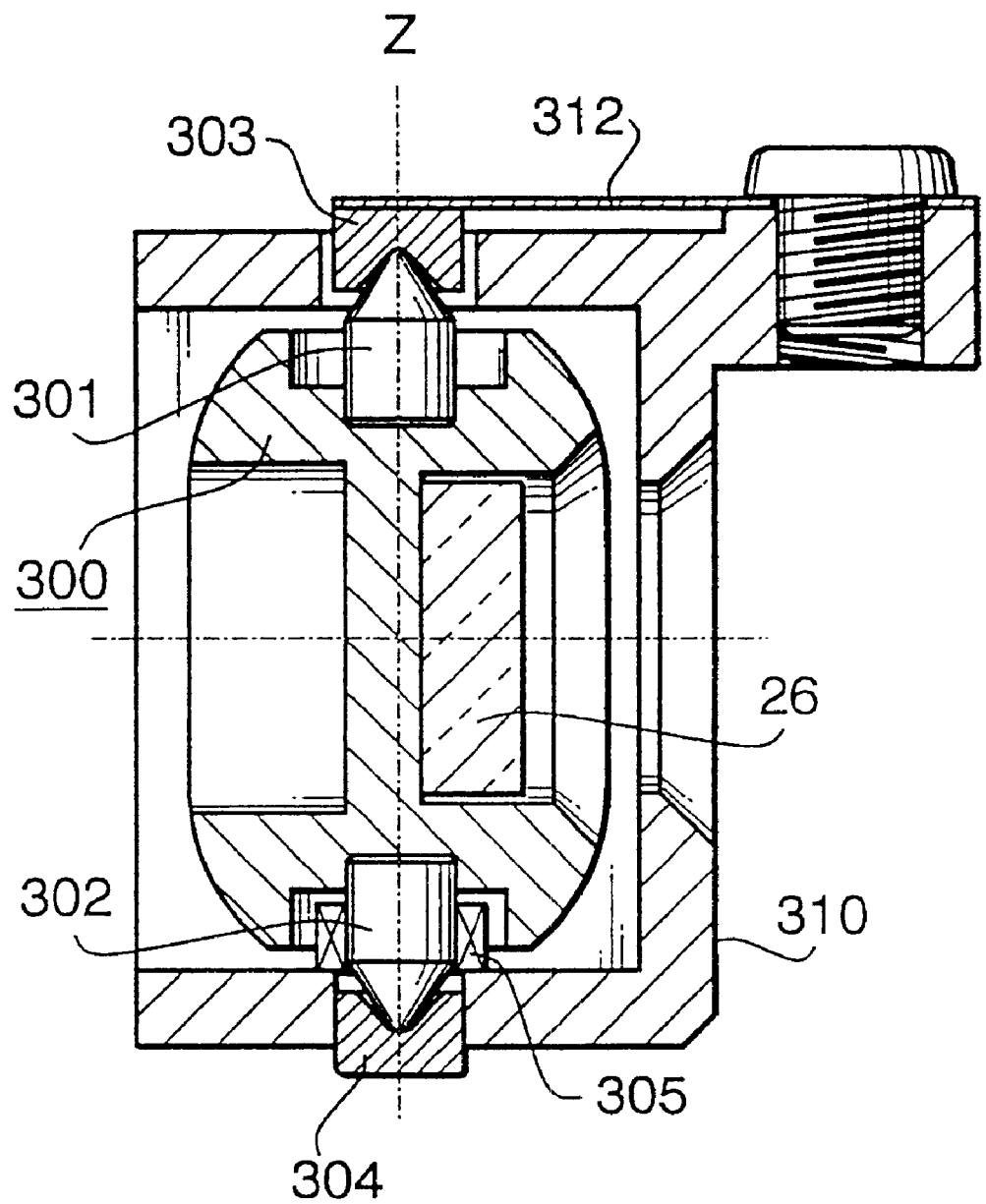
FIG. 57 is a longitudinal sectional view of the galvano mirror unit of the thirteenth embodiment.

FIGS. 57 and 58 are a perspective view and a sectional view of a galvano mirror unit of the thirteenth embodiment. The galvano mirror 26 is mounted to a mirror holder 300 that is supported by a stator 310. In order to rotatably support the mirror holder 300, a pair of center pins 301 and 302 are provided at the top and bottom of the mirror holder 300. The center pins 301 and 302 are received by receive members 303 and 304 provided to the top and the bottom of the stator 310. The lower receive member 304 is fitted into a hole of the stator 310, while the upper receive member 303 is fixed to a plate spring 312 provided at the top of the stator 310. In order to urge the mirror holder 300 to its neutral position, a positioning magnet 305 is provided around the lower center pin 302.

FIG. 58 is a perspective view of the lower center pin 302 and the lower positioning magnet 305. FIGS. 59A and 59B are a plan view and a sectional view of the lower center pin 302 and the positioning magnet 305. The lower center pin 302 includes front and rear sections 302A and 302B divided by a plane 302C including the center axis of the lower center pin 302. The front and rear sections 302A and 302B are respectively S-pole and N-pole. The positioning magnet 305 has a shape of a ring and includes front and rear half-ring 305A and 305B. The front half-ring 305A is magnetized so that the inner surface thereof is N-pole and the outer surface thereof is S-pole, while the rear half-ring 305B is magnetized so that the inner surface thereof is S-pole and the outer surface thereof is N-pole.

With this, the rotational neutral position of the mirror holder 300 is obtained when the N-pole of the lower center pin 302 is faced with the S-pole of the positioning magnet 305 (that is, the S-pole of the lower center pin 302 is faced with the N-pole of the positioning magnet 305). When the mirror holder 300 rotates from the neutral position, the N-pole of the lower center pin 302 is partially faced with the N-pole of the positioning magnet 305 (that is, the S-pole of the lower center pin 302 is partially faced with the S-pole of the positioning magnet 305). It causes a repulsive force that urges the mirror holder 300 to the neutral position.

In the thirteenth embodiment, an arrangement (driving coils and driving magnets) for actuating the galvano mirror 26 is the same as the first embodiment (FIG. 7).

According to the thirteenth embodiment, the galvano mirror is urged to its rotational neutral position without providing a separate spring member.

Figure 60:
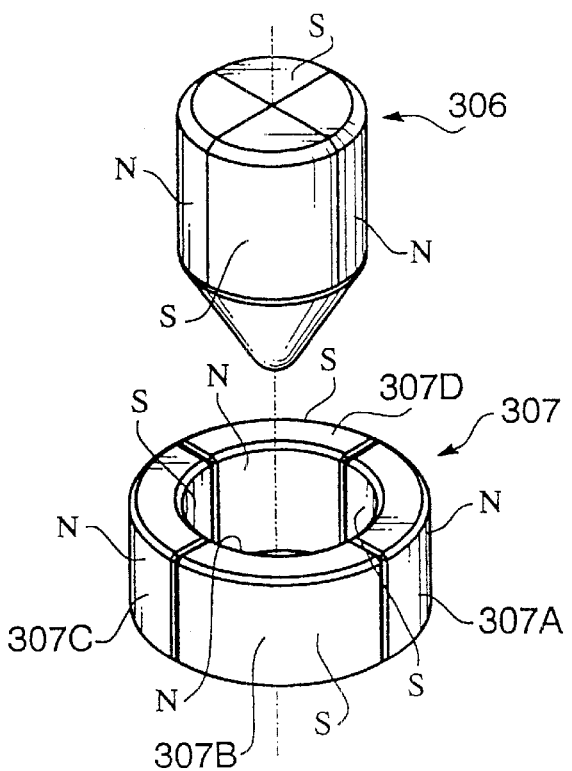
FIG. 60 is a perspective view showing a center pin and a magnet ring of the modification of thirteenth embodiment.
Figure 61A:
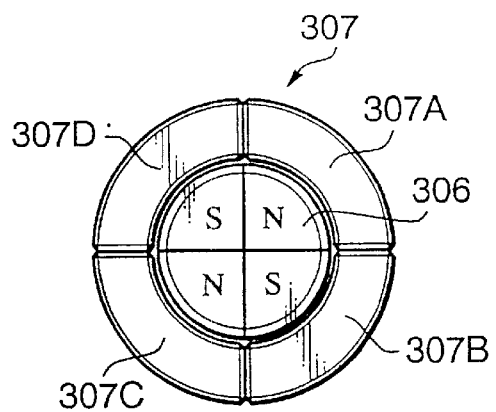
FIGS. 61A and 61B are a plan view and a sectional view of the center pin and the magnet ring of FIG. 60.
Figure 61B:
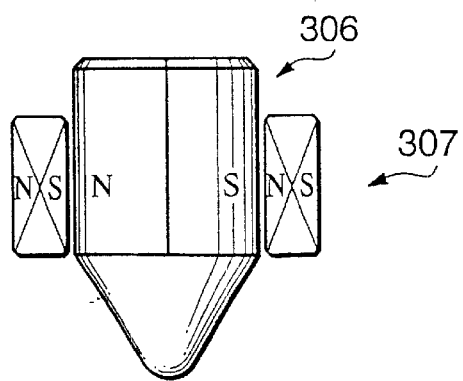

FIG. 60 shows the modification of thirteenth embodiment. In the modification, a lower center pin 306 includes four sections divided by two planes that perpendicularly cross with each other at the axis of the lower center pin 306. The four sections are S-pole, N-pole, S-pole and N-pole (along the circumference of the lower center pin 306). The positioning magnet 307 has a shape of ring and includes four arc-shaped portions 307A,. 307B, 307C and 307D, a center angle of each arc-shaped portion being 90 degree.

With this, the rotational neutral position of the mirror holder 300 is obtained when the N-poles of the lower center pin 306 are faced with the S-poles of the positioning magnet 307 (that is, the S-poles of the lower center pin 306 are faced with the N-poles of the positioning magnet 307). When the mirror holder 300 rotates from the neutral position, the N-poles of the lower center pin 306 are partially faced with the N-poles of the positioning magnet 307 (that is, the S-poles of the lower center pin 306 are partially faced with the S-poles of the positioning magnet 307). It causes a repulsive force that urges the mirror holder 300 to the neutral position.

With such an arrangement, the galvano mirror is urged to the rotational neutral position without providing a separate spring member.

Although the structure and operation of a galvano mirror unit is described herein with respect to the preferred embodiments, many modifications and changes can be made without departing from the spirit and scope of the invention. Particularly, the embodiments can be embodied in any kind of optical disk drive and are not limited to the optical disk drive using the Near Field Recording technology.

The present disclosure relates to subject matters contained in Japanese Patent Application Nos. HEI 09-172059, HEI 09-172061 and HEI 09-172062, filed on Jun. 27, 1997, Japanese Patent Application No. HEI 09-314336 filed on Oct. 30, 1997, Japanese Patent Application Nos. HEI 09-316081 and HEI 09-316082 filed on Oct. 31, 1997, Japanese Patent Application Nos. HEI 09-322126 and HEI 09-322127 filed on Nov. 8, 1997, Japanese Patent Application Nos. HEI 09-326938 and HEI 09-326939 filed on Nov. 12, 1997, and Japanese Patent Application Nos. HEI 10-120122 and HEI 10-120123 filed on Apr. 14, 1998 which are expressly incorporated herein by reference in their entirety.

What is claimed is:

1. A galvano mirror unit comprising:

a galvano mirror;

a rotor to which said galvano mirror is mounted;

a stator that rotatably supports said rotor about a rotation axis;

first and second center pins provided to said stator;

first and second receive members provided to said rotor, said first and second receive members respectively receiving said first and second center pins;

a biasing magnet provided to said stator so that said biasing magnet is located around said first center pin; and a magnetic chip provided to a predetermined portion of said first center pin, wherein, due to the magnetic force generated by said biasing magnet and said magnetic chip, said first center pin is biased to said first receive member.

2. The galvano mirror unit according to claim 1, said biasing magnet comprising a ring-shaped magnet.

3. The galvano mirror unit according to claim 1, wherein said biasing magnet is located between said magnetic chip and said first receive member in the direction of said rotation axis, and wherein said biasing magnet attracts said magnetic chip thereby to bias said first center pin.

4. The galvano mirror unit according to claim 1, wherein said biasing magnet comprising two ring-shaped magnets disposed in the direction of said rotation axis.

5. The galvano mirror unit according to claim 4, wherein said magnetic chip is located between said two ring-shaped magnets in the direction of said rotation axis.

6. The galvano mirror unit according to claim 5, wherein said magnetic chip attracts one of said ring-shaped magnets and repulses the other of said ring-shaped magnets.

7. A galvano mirror unit comprising:

a galvano mirror;

a rotor to which said galvano mirror is mounted;

a stator that rotatably supports said rotor about a rotation axis;

first and second center pins provided to said stator;

first and second receive members provided to said rotor, said first and second receive members respectively receiving said first and second center pins;

a biasing coil provided to said stator, said biasing coil being arranged to surround said first center pin; and a magnetic chip provided to a predetermined portion of said first center pin, wherein, by allowing current to flow in said biasing coil, said first center pin is biased to said first receive member.

8. The galvano mirror unit according to claim 7, wherein said biasing coil is located between said magnetic chip and said first receive member in the direction of said rotation axis.

9. The galvano mirror unit according to claim 8, wherein a biasing force can be adjusted by varying current flow in said biasing coil.

10. The galvano mirror unit according to claim 7, wherein said first center pin is made of non-magnetized material.

11. A galvano mirror unit comprising:

a galvano mirror;

a rotor to which said galvano mirror is mounted;

a stator that rotatably supports said rotor about a rotation axis;

first and second center pins provided to said stator;

first and second receive members provided to said rotor, said first and second receive members respectively receiving said first and second center pins;

two biasing coils provided to said stator, said biasing coils being arranged to surround said first center pin; and a magnetic chip provided to a predetermined portion of said first center pin, wherein, by allowing current to flow in said biasing coils, said first center pin is biased to said first receive member.

12. The galvano mirror unit according to claim 11, wherein said magnetic chip is located between said two biasing coils.

13. A galvano mirror unit comprising:

a galvano mirror;

a rotor to which said galvano mirror is mounted;

a stator that rotatably supports said rotor about a rotation axis;

first and second center pins provided to said stator, said first center pin being made of a magnetized member, said first center pin being provided in a hole of said stator so that said first center pin is movable in the direction of said rotation axis;

first and second receive members provided to said rotor, said first and second receive members respectively receiving said first and second center pins; and an offset magnet provided to said stator, said offset magnet attracting said first center pin in a predetermined direction, thereby to prevent the deviation of the inclination of said first center pin in said hole.

14. The galvano mirror unit according to claim 13, said offset magnet comprising an arc-shaped magnet, said arc-shaped magnet being faced with a side of said first center pin.

15. The galvano mirror unit according to claim 13, said offset magnet comprising first and second magnets, wherein said first magnet is faced with a side of said first center pin, while said second magnet is faced with the other side of said first center pin.

16. The galvano mirror unit according to claim 15, wherein said first center pin includes two sections that can be divided by a plane including an axis of said first center pin, said two sections having different poles with each other.

17. The galvano mirror unit according to claim 15, each of said first and second magnets is arc-shaped.

18. A galvano mirror unit comprising:

a galvano mirror;

a rotor to which said galvano mirror is mounted;

a stator that rotatably supports said rotor about a rotation axis;

first and second center pins provided to said stator;

first and second receive members provided to said rotor, said first and second receive members respectively receiving said first and second center pins; and first positioning magnet provided to said rotor;

second positioning magnet provided to said stator, each of said first and second positioning magnets including a portion of N-pole and a portion of S-pole, wherein a neutral position of said rotor is obtained by the attraction of said first and second positioning magnets.

19. The galvano mirror unit according to claim 18, said first positioning magnet comprising a ring-shaped magnet, said ring-shaped magnet surrounding said first center pin.

20. The galvano mirror unit according to claim 18, said second positioning magnet comprising a ring-shaped magnet, said ring-shaped magnet surrounding said first receive member.

21. The galvano mirror unit according to claim 18, said first and second positioning magnet are faced with each other.

22. A galvano mirror unit, comprising:

a galvano mirror;

a rotor to which said galvano mirror is mounted;

a stator that rotatably supports said rotor about a rotation axis;

first and second center pins provided to said rotor, said first center pin including a portion of N-pole and a portion of S-pole;

first and second receive members provided to said stator, said first and second receive members respectively receiving said first and second center pins; and a positioning magnet provided to said stator, said positioning magnet including a portion of N-pole and a portion of S-pole, wherein a neutral position of said rotor, obtained by the attraction of said first center pin and said positioning magnet, is a rotational neutral position.

23. The galvano mirror unit according to claim 22, said first center pin including two sections of N-pole and two sections of S-pole, said positioning magnet including two sections of N-pole and two sections of S-pole.

24. The galvano mirror unit according to claim 22, said first center pin including four sections of N-pole and four sections of S-pole, said positioning magnet including four sections of N-pole and four sections of S-pole.

25. The galvano mirror unit of claim 22, wherein said portion of N-pole and said portion of S-pole are divided by a plane including an axis of said first center pin.

26. The galvano mirror of claim 22, wherein said positioning magnet surrounds said first center pin.

* * * * *